US009754025B2

(12) United States Patent
Roswell

(10) Patent No.: US 9,754,025 B2
(45) Date of Patent: *Sep. 5, 2017

(54) ANALYZING CAPTURED SOUND AND SEEKING A MATCH BASED ON AN ACOUSTIC FINGERPRINT FOR TEMPORAL AND GEOGRAPHIC PRESENTATION AND NAVIGATION OF LINKED CULTURAL, ARTISTIC, AND HISTORIC CONTENT

(71) Applicant: TunesMap Inc., Pacific Palisades, CA (US)

(72) Inventor: Gilbert Marquard Roswell, Pacific Palisades, CA (US)

(73) Assignee: TUNESMAP INC., Pacific Palisades, CA (US)

( * ) Notice: Subject to any disclaimer, the term of this patent is extended or adjusted under 35 U.S.C. 154(b) by 236 days.

This patent is subject to a terminal disclaimer.

(21) Appl. No.: 14/536,104

(22) Filed: Nov. 7, 2014

(65) Prior Publication Data
US 2015/0067512 A1    Mar. 5, 2015

Related U.S. Application Data

(63) Continuation-in-part of application No. 13/975,176, filed on Aug. 23, 2013, now abandoned, which is a
(Continued)

(51) Int. Cl.
*G06F 7/00* (2006.01)
*G06F 17/30* (2006.01)
(Continued)

(52) U.S. Cl.
CPC ...... *G06F 17/30743* (2013.01); *G06F 3/0481* (2013.01); *G06F 3/04842* (2013.01);
(Continued)

(58) Field of Classification Search
CPC ............. G06F 3/0481; G06F 3/04842; G06Q 30/0631; G06Q 30/0641; H04L 12/1813
(Continued)

(56) References Cited

U.S. PATENT DOCUMENTS

| 8,116,516 B2 | 2/2012 | Rhoads |
| 8,116,746 B2 | 2/2012 | Lu et al. |

(Continued)

OTHER PUBLICATIONS

Wang, Avery. "An Industrial Strength Audio Search Algorithm." ISMIR. 2003.*

(Continued)

*Primary Examiner* — Mariela Reyes
*Assistant Examiner* — Mohsen Almani
(74) *Attorney, Agent, or Firm* — Perkins Coie LLP

(57) ABSTRACT

Collections of music and other items, related by time, location, genre, and artist, and that are registered in a data model to provide a foundation for their curatorship, discovery, and procurement are accessed by analyzing captured sound and seeking a match based on an acoustic fingerprint. As a result of said match, a map through the history and culture of music is created for display. The map is created in an embodiment by a series of choices, where a choice is a combination of any of time, place, genre, and artist. Both expert and regular individual curators can define the maps; or the maps can be defined algorithmically. Based upon said matches, one or more animated murals depicting a fundamental combination of any of time, place, genre, and artist are provided to a user via a user interface for the navigation of music, its history, and culture.

26 Claims, 98 Drawing Sheets

Related U.S. Application Data continuation of application No. 12/855,612, filed on Aug. 12, 2010, now Pat. No. 8,533,175.

(60) Provisional application No. 61/902,127, filed on Nov. 8, 2013, provisional application No. 61/233,639, filed on Aug. 13, 2009.

(51) Int. Cl.
  *G06F 3/0481* (2013.01)
  *G06F 3/0484* (2013.01)
  *H04L 12/18* (2006.01)
  *G06Q 30/06* (2012.01)

(52) U.S. Cl.
  CPC ..... *G06F 17/3089* (2013.01); *G06Q 30/0631* (2013.01); *G06Q 30/0641* (2013.01); *H04L 12/1813* (2013.01)

(58) Field of Classification Search
  USPC ......................................................... 707/710
  See application file for complete search history.

(56) References Cited

U.S. PATENT DOCUMENTS

| | | |
|---|---|---|
| 8,117,193 B2 | 2/2012 | Svendsen et al. |
| 8,121,342 B2 | 2/2012 | Davis et al. |
| 8,121,830 B2 | 2/2012 | Srinivasan et al. |
| 8,121,843 B2 | 2/2012 | Rhoads et al. |
| 8,122,257 B2 | 2/2012 | Rhoads et al. |
| 8,126,200 B2 | 2/2012 | Rhoads |
| 8,131,749 B2 | 3/2012 | Sayfan |
| 8,150,096 B2 | 4/2012 | Alattar |
| 8,151,113 B2 | 4/2012 | Rhoads |
| 8,155,582 B2 | 4/2012 | Rhoads et al. |
| 8,161,071 B2 | 4/2012 | LaJoie et al. |
| 8,165,341 B2 | 4/2012 | Rhoads |
| 8,170,273 B2 | 5/2012 | Sharma et al. |
| 8,175,730 B2 | 5/2012 | Dittmar et al. |
| 8,180,844 B1 | 5/2012 | Rhoads et al. |
| 8,185,507 B1 | 5/2012 | Kaminski, Jr. |
| 8,185,579 B2 | 5/2012 | Svendsen |
| 8,200,602 B2 | 6/2012 | Farrelly |
| 8,200,976 B2 | 6/2012 | Rhoads et al. |
| 8,205,237 B2 | 6/2012 | Cox |
| 8,224,022 B2 | 7/2012 | Levy et al. |
| 8,255,693 B2 | 8/2012 | Rhoads |
| 8,285,595 B2 | 10/2012 | Svendsen |
| 8,285,776 B2 | 10/2012 | Svendsen |
| 8,290,423 B2 | 10/2012 | Wang |
| 8,307,092 B2 | 11/2012 | Svendsen |
| 8,312,168 B2 | 11/2012 | Rhoads et al. |
| 8,315,554 B2 | 11/2012 | Levy et al. |
| 8,327,266 B2 | 12/2012 | Svendsen |
| 8,332,478 B2 | 12/2012 | Levy et al. |
| 8,355,667 B2 | 1/2013 | Witzman |
| 8,359,205 B2 | 1/2013 | Srinivasan et al. |
| 8,370,952 B1 | 2/2013 | Wieder |
| 8,379,908 B2 | 2/2013 | Davis et al. |
| 8,396,800 B1 | 3/2013 | Wieder |
| 8,396,951 B2 | 3/2013 | Svendsen et al. |
| 8,407,287 B2 | 3/2013 | Wiener et al. |
| 8,422,490 B2 | 4/2013 | Svendsen et al. |
| 8,429,205 B2 | 4/2013 | Rhoads |
| 8,434,024 B2 | 4/2013 | Curtis |
| 8,442,264 B2 | 5/2013 | Rhoads et al. |
| 8,458,184 B2 | 6/2013 | Dorogusker et al. |
| 8,468,357 B2 | 6/2013 | Roberts et al. |
| 8,484,227 B2 | 7/2013 | Svendsen |
| 8,484,311 B2 | 7/2013 | Svendsen et al. |
| 8,488,836 B2 | 7/2013 | Brunk et al. |
| 8,489,598 B2 | 7/2013 | Rhoads et al. |
| 8,508,357 B2 | 8/2013 | Srinivasan et al. |
| 8,509,397 B2 | 8/2013 | Chen et al. |
| 2002/0112237 A1 | 8/2002 | Kelts |
| 2002/0120395 A1 | 8/2002 | Smith |
| 2004/0093236 A1 | 5/2004 | Chacker |
| 2005/0252362 A1 | 11/2005 | McHale et al. |
| 2006/0195516 A1 | 8/2006 | Beaupre |
| 2006/0238379 A1 | 10/2006 | Kimchi et al. |
| 2007/0061363 A1 | 3/2007 | Ramer et al. |
| 2008/0294663 A1 | 11/2008 | Heinley et al. |
| 2009/0083281 A1 | 3/2009 | Sarig et al. |
| 2010/0223223 A1 | 9/2010 | Sandler et al. |

OTHER PUBLICATIONS

Jankun-Kelly, T. J., and Kwan-Liu Ma. "MoireGraphs: Radial focus+ context visualization and interaction for graphs with visual nodes." Information Visualization, 2003. INFOVIS 2003. IEEE Symposium on. IEEE, 2003.*

"Acoustic fingerprint", Wikipedia, retrieved online from url http://en.wikipedia.org/wiki/Asoustic_finterprint; last modified on Aug. 15, 2013, 4 pages.

"Memory Lane", retrieved online Apr. 1, 2011 from url: http://www.classmates.com/?, 4 pages.

Casey, et al., "Content-Based Music Information Retrieval: Current Directions and Future Challenges", Proceedings of the IEEE; Apr. 2008, pp. 668-696.

Govaerts, et al., "A Web-based Approach to Determin the Origin of an Artist", 10th Int'l Society for Music Information Retrieval Conference (ISMIR), Oct. 2009, pp. 261-266.

Yixing Sheng, "A Recorder and Analyzer of Users' Behaviour on a Web Community Site", The University of Bath, May 2007, 122 pages.

* cited by examiner

Core Elements: (100)
- Time
- Location
- Genre
- Artist

Primary Elements: (101)
- Curator
- Community
- Culture
- Content
- Shopping

Supporting Elements: (102)
- Tagging (Weight/relevance, appear in all)
- Music Ontology (categories for drill down filtering)
- Random Selection for unspecified categories
- Content Category web interface (per supported source web site)
- TunesMural
- Musical Earth (Mapping Module)
- MediaPlayer Integration
- User Account Management
- Personal TunesMap
- Home Page
- Network View (Mapping Module)
- Curator Page
- PlayList Publishing
- Ranking Facility
- City Page
- Location Page
- Artist Page
- Culture Page
- Tour
- Content Search
- User Profile
- iTunes Integration (general external media)
- iPhone Integration (general mobile device)
- Game Consol Integration
- Album
- Song
- Art
- Film & TV
- Fashion
- Literature
- Landmark
- News
- Comedy
- Content Registration
- Search Phrase Category Analysis
- User State (Categorical Context)
- PlayList
- World Event
- Cover Flow Carousel
- Recommendation
- Blog
- Search
- User Profile
- Feed (external site sharing)
- Widget/Plug-in (external site sharing)
- Interview

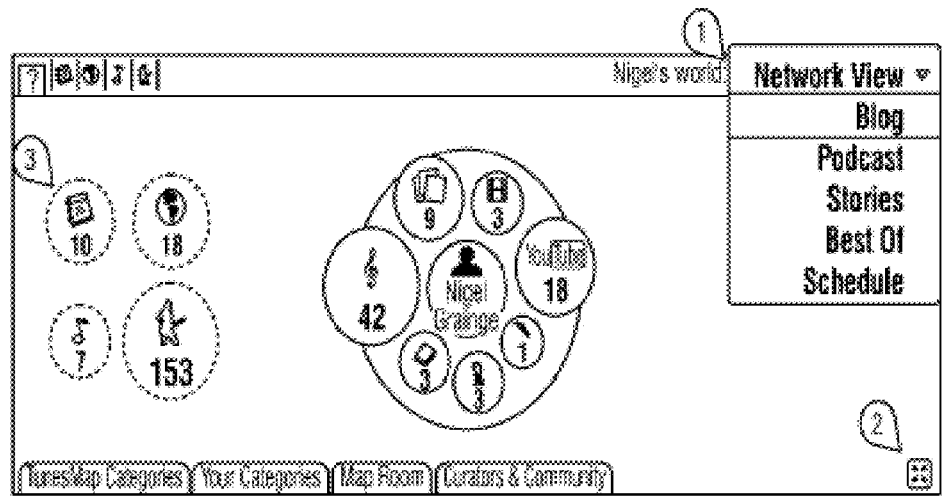
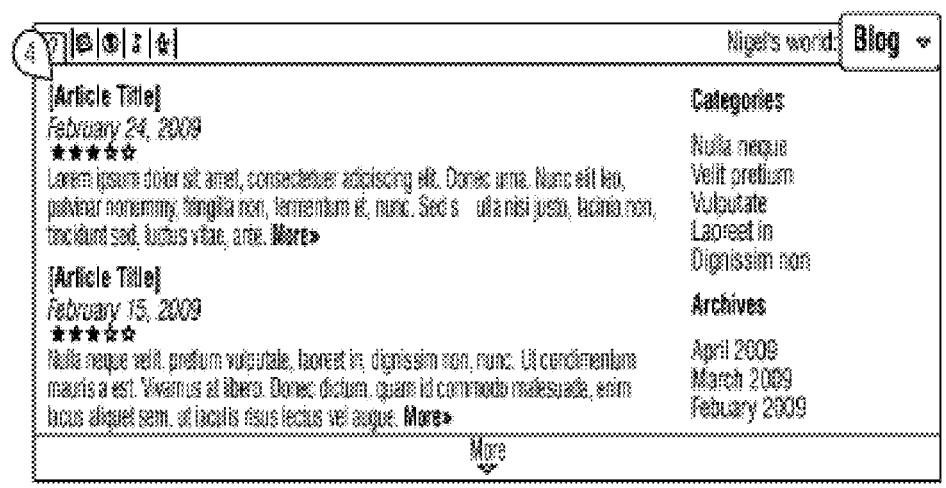
FIGURE 10D

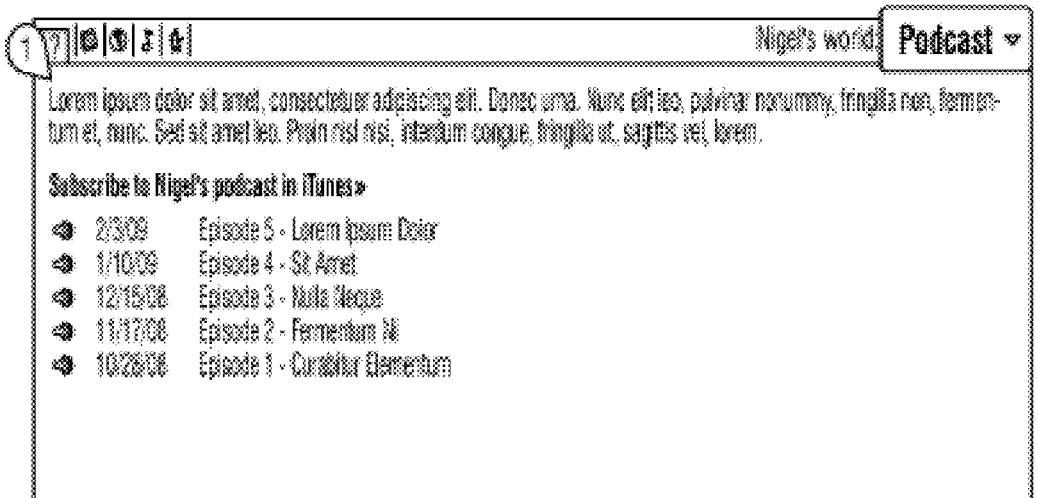
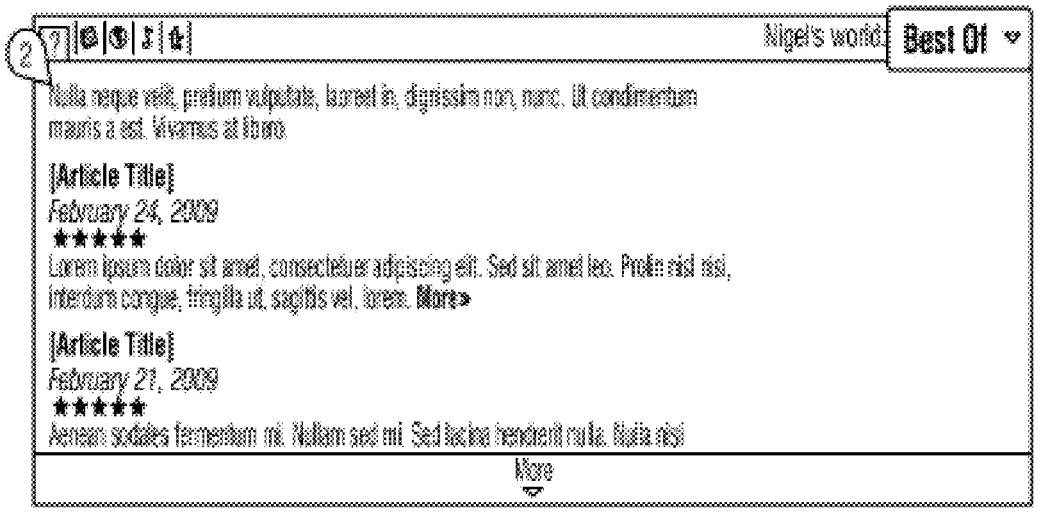
FIGURE 10E

ANALYZING CAPTURED SOUND AND SEEKING A MATCH BASED ON AN ACOUSTIC FINGERPRINT FOR TEMPORAL AND GEOGRAPHIC PRESENTATION AND NAVIGATION OF LINKED CULTURAL, ARTISTIC, AND HISTORIC CONTENT

CROSS REFERENCE TO RELATED APPLICATIONS

This application claims priority to U.S. provisional patent application Ser. No. 61/902,127, filed Nov. 8, 2013, and is a continuation-in-part of U.S. patent application Ser. No. 13/975,176, filed Aug. 23, 2013, which is a continuation of U.S. patent application Ser. No. 12/855,612, filed Aug. 12, 2010, issued on Sep. 10, 2013 as U.S. Pat. No. 8,533,175, which claims priority to U.S. provisional patent application Ser. No. 61/233,639, filed Aug. 13, 2009, each of which is incorporated herein in its entirety by this reference thereto.

FIELD

The invention relates to information search and retrieval using the World Wide Web. More specifically, the invention relates to analyzing captured sound and seeking a match based on an acoustic fingerprint for temporal and geographic presentation and navigation of linked cultural, artistic, and historic content.

BACKGROUND

Developments in technology over the last twenty years have had a profound impact on music, particularly popular music, and how it is produced, marketed, distributed, and consumed. The trend is towards Web-based digital formats, such as MPEG-3 acquired from such Web sites as Apple iTunes, Rhapsody, Napster, etc., and away from traditional brick and mortar record stores. In the process, the human element of the music store staff, knowledgeable guides to help locate and recommend music, has been lost. A further effect of the move to digital, Web-based downloads is that the packaging of a work of music, with cover art, liner notes, lyric sheets, etc. has also been largely lost. The individual components (songs) of a given collection might even be obscured.

Social networking Web sites, such as MySpace, Facebook, and Twitter and the phenomenon of Web logging (blogs) further set the stage for network-based communities related by common interests. However, no such site exists which brings together the elements of music culture required to preserve and navigate its rich history and diverse character effectively.

There is great value for learning and for growing communities by connecting those individuals having specific interests to experts in the field, as well as to each other. This principle is evidenced by traditional museums and by social networking sites for the expression of subjective tastes and opinions and by group collaboration sites, such as Wikipedia, producing significant bodies of objective knowledge. It has not however been applied to the general navigation, discovery, and sharing of music and music history and culture through communities of common interests seeded and led by expert curatorship.

Rather than contribute to the dissipation and loss of music culture, technology should be used to preserve and enrich it. A large body of recorded music exists since the invention of the phonograph. Collections of music recordings, photographs, videos, personal accounts, artifacts, memorable, etc. exist in private, public, and commercial hands. While many music download sites exist, and manufactures of portable music storage and playback devices, such as the iPod, provide various services to describe, search, recommend, and catalog music, there is no such service or methodology that provides a comprehensive facility to capture, preserve, and navigate the rich body of materials which exist. To do so requires that the fundamental nature of music phenomenon be understood and its essential underlying relationships be employed to create an intuitive user interface for its navigation with optimized data system architecture for its storage and retrieval.

The commercial music industry has been adversely affected by the World Wide Web. Challenges to conventional sales and marketing of recorded music exist in the areas of copyright protection and distribution that the industry is still coping with. An apparatus to make the substantial catalogs of music and related materials, such as interviews, artifacts, video clips, etc. possessed by various institutions available for general discovery and potential sale by an integrated, guided musical navigation system which address licensing concerns provides a much needed outlet for both the music materials and the persons and institutions owning them.

There is a fundamental relationship between works of music and the artists that create them, and the time, location, genre, and cultural climate in which they are conceived and produced. These elements provide the best possible classification and search criteria for creating a comprehensive apparatus for the cataloging, search, and discovery of music, its history, and the culture that inspired it. No such facility, service, or apparatus today exists which applies this principle of organization.

SUMMARY

Collections of music and other items, related by time, location, genre, and artist, and that are registered in a data model to provide a foundation for their curatorship, discovery, and procurement are accessed by analyzing captured sound and seeking a match based on an acoustic fingerprint. As a result of said match, a map through the history and culture of music is created for display. The map is created in an embodiment by a series of choices, where a choice is a combination of any of time, place, genre, and artist. Both expert and regular individual curators can define the maps; or the maps can be defined algorithmically. Based upon said matches, one or more animated murals depicting a fundamental combination of any of time, place, genre, and artist are provided to a user via a user interface for the navigation of music, its history, and culture. Integration with hand held GPS enabled devices provides users with knowledge of music events and history relative to their present location.

An embodiment of the invention relates to the effective organization of music by bringing together time, place, genre, and artist with curator and community commentary and recommendations, cultural events and elements, media content, and a facility for procurement of related materials. The consistent focus of these fundamental elements of music and principles of organization provides a unique user experience that is a key aspect of the current invention.

Collections of music and music related items, such as podcasts, photos, news articles clips, stories, memorabilia, etc. are registered and made available through the system by the persons or institutions which own them. The materials are related fundamentally by classification of time, location, genre, and artist. A unique and novel data model based on this fundamental relationship provides the foundation for the curatorship, discovery and potential procurement of the music related materials registered by the system. This enables not only the preservation of the culture and histories inherent in these collections, but also a long tail market for the sale of items that are available for procurement.

Individual tastes, preferences, and interests lead to different choices in navigation. A series of choices, where a choice is a combination of time, place, genre, and artist, represents a map or guided tour through the history and culture of music in a presently preferred embodiment of the invention. These maps contribute to the body of related materials for a given combination and are published as links on external Web sites. Both expert and regular individual curators define them. They are the subject of sharing and group evaluation and ranking as are the curators themselves. These maps through music, its history, and culture are a reflection of the curators who create them, and are a distinct and novel feature of the invention.

Animated murals depicting a fundamental combination of time, place, genre, and artist provides a unique visual experience and user interface for the navigation of music, its history, and culture. These murals are made available as embedded objects on external sites such as MySpace, Facebook, Twitter, etc. and provide a distinctive expression of music to those external Web pages. Thus, an embodiment of the invention includes a social networking aspect as it relates to the user and their ability to share their music culture through Facebook, Twitter, or any other social networking sites.

Integration with handheld GPS-enabled devices, such as Apple's iPhone, provides users of the system with knowledge of music events and history relative to their present location. This enables a first hand discovery of music history points of interest in not only the virtual world of media content displayed on a computer, but also in the physical world where the user is guided to the actual places of interest.

The invention is not limited to music and other embodiments of the invention apply the herein disclosed teachings to, for example but not by way of limitation, fashion, film, art, news, comedy, books, healthcare, environmental issue, and the like.

Other embodiments of the invention allow a user's voice to trigger the creation of a map, as described above. For example, the user can trigger the creation of a map by saying "What song is playing?"; "Take me to that scene."; or "Take me to New York in 1977."

DRAWINGS

FIG. 3 is a schema that lists the elements of the invention in three categories, used consistently in the preferred embodiments, shown as top level data model classifications;

FIGS. 10A-10H illustrate a curator function according to the invention;

DESCRIPTION

Collections of music and other items, related by time, location, genre, and artist, and that are registered in a data model to provide a foundation for their curatorship, discovery, and procurement are accessed by analyzing captured sound and seeking a match based on an acoustic fingerprint. As a result of said match, a map through the history and culture of music is created for display. The map is created in an embodiment by a series of choices, where a choice is a combination of any of time, place, genre, and artist. Both expert and regular individual curators can define the maps; or the maps can be defined algorithmically. Based upon said matches, one or more animated murals depicting a fundamental combination of any of time, place, genre, and artist are provided to a user via a user interface for the navigation of music, its history, and culture. Integration with hand held GPS enabled devices provides users with knowledge of music events and history relative to their present location.

Other embodiments of the invention allow a user's voice to trigger the creation of a map, as described above. For example, the user can trigger the creation of a map by saying "What song is playing?"; "Take me to that scene."; or "Take me to New York in 1977."

Figure 1:
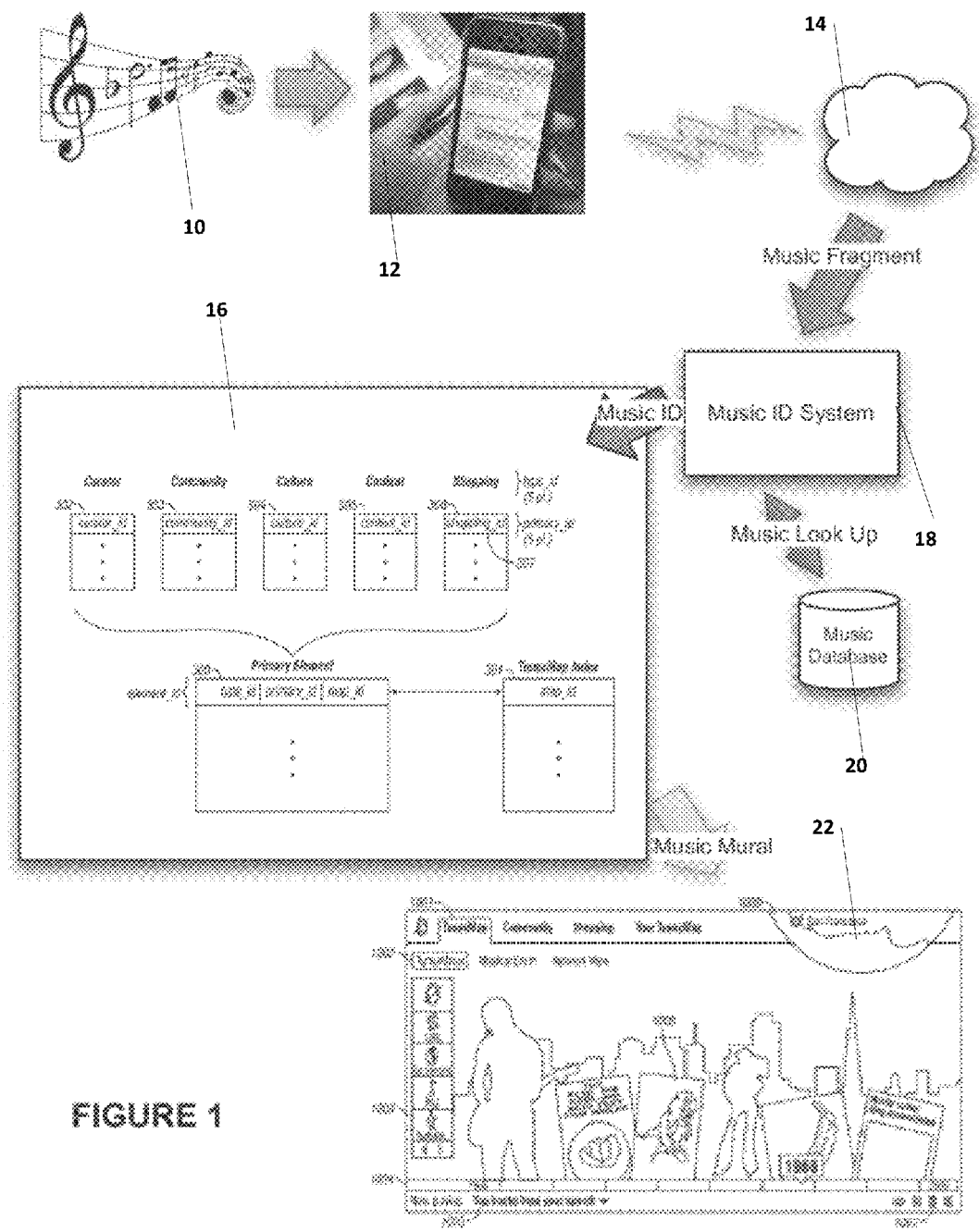
FIG. 1 is a block schematic diagram showing an architecture for analyzing captured sound and seeking a match based on an acoustic fingerprint for temporal and geographic presentation and navigation of linked cultural, artistic, and historic content according to the invention.

FIG. 1 is a block schematic diagram showing an architecture for analyzing captured sound and seeking a match based on an acoustic fingerprint for temporal and geographic presentation and navigation of linked cultural, artistic, and historic content according to the invention. In FIG. 1, a fragment of a song or other musical composition 10 is captured by a device 12, such as a smart phone, i.e. an iPhone.

For purposes of the discussion herein, the capture of a music fragment is considered to a be a search. That is, the music fragment comprises a query and takes the place of, or is used in conjunction with, a conventional text-based query when performing a search in accordance with the invention.

The captured music fragment is communicated to a music ID system 18 for analyzing captured sound and determining an acoustic fingerprint, for example via the Internet 14. The music ID system accesses a music database 20 to identify the song from the captured fragment. Music identification information, i.e. the search query, such as artist or song title, is provided to a map generation system 16 that applies the music identification information to create primary data model abstractions that relate items of interest such as knowledge, media, articles for purchase, or other music related materials to a map index based upon the recognized music fragment. A map mural 22 is then generated depicting the fundamental relationship of music in an interactive animated user interface.

Acoustic Fingerprint

A key aspect of the invention is the generation of an acoustic fingerprint of a song fragment. An acoustic fingerprint is a condensed digital summary, deterministically generated from an audio signal, that can be used to identify an audio sample or quickly locate similar items in an audio database.

A robust acoustic fingerprint algorithm must take into account the perceptual characteristics of the audio. If two files sound alike to the human ear, their acoustic fingerprints should match, even if their binary representations are quite different. Acoustic fingerprints are not bitwise fingerprints, which must be sensitive to any small changes in the data. Acoustic fingerprints are more analogous to human fingerprints where small variations that are insignificant to the features the fingerprint uses are tolerated. One can imagine the case of a smeared human fingerprint impression which can accurately be matched to another fingerprint sample in a reference database: acoustic fingerprints work in a similar way.

Perceptual characteristics often exploited by audio fingerprints include average zero crossing rate, estimated tempo, average spectrum, spectral flatness, prominent tones across a set of bands, and bandwidth.

Most audio compression techniques (AAC, MP3, YVMA, Vorbis) make radical changes to the binary encoding of an audio file, without radically affecting the way it is perceived by the human ear. A robust acoustic fingerprint allows a recording to be identified after it has gone through such compression, even if the audio quality has been reduced significantly.

There are many techniques for generating acoustic fingerprints which may be used in connection with various embodiments of the invention herein. The following is a list of some acoustic fingerprinting products.

Proprietary

All Media Guide's LASSO is a commercial service that uses acoustic fingerprinting, and other techniques, to recognize music. (U.S. Pat. No. 7,277,766).

Audible Magic Corporation is a commercial venture that provides electronic media identification and copyright management solutions using proprietary acoustic fingerprinting technology (U.S. Pat. No. 5,918,223).

AudioiD is a commercial technology for automatically identifying audio material using acoustic fingerprints. It was developed by the German Fraunhofer institute.

Axwave's Gsound uses acoustic fingerprinting to identify music, film, and TV from cell phones or from computers. It work by sending simple wave files to the servers.

BMAT Vericast is a global music identification service that monitors millions of songs over 2000 radios and televisions across more than 50 countries worldwide. The solution provides real time recognition and auditable reporting based on an audio fingerprint that is resistant to signal alterations, such as voice over, broadcast mastering, or noisy channel degradation.

YouTube's Content ID is able to identify an audio/visual part of copyrighted content.

Gracenote's MusicID is a commercial product that uses acoustic fingerprinting along with other methods to identify music.

Midomi is a commercial service that can match music clips, as well as identifying a song that is sung or hummed.

Moodagent is a commercial service from Syntonetic that combines digital signal processing and AI techniques to create music profiles that incorporate characteristics such as mood, emotion, genre, style, instrument vocals, orchestration, production, and beat/tempo.

SoundHound is an acoustic fingerprint-based service for Web and mobile platforms (Android, iOS, Windows Phone) that allows songs or hummed tunes to be identified using the Midomi service.

Shazam, an acoustic fingerprint-based service that allows songs to be identified via a cell phone.

Tunatic by Wildbits is an application that allows identifying music while being played, analyzing the songs, and comparing the song with information on a server.

Open Source

MusicBrainz, a free and open content project for a music database that uses AcoustID's free database of audio fingerprints, which aims to map its fingerprints to the MusicBrainz database. MusicBrainz also used MusicIP's Open Fingerprint architecture for fingerprinting and the AmpliFIND (formerly MusicDNS) service for identifying audio files since 2006, but is phasing out AmpliFIND in favor of the open source AcoustID, after AmpliFIND was acquired by Gracenote in 2011.

Last.fm's acoustic fingerprinting application was released in 2007. The technology is now included in the Last.fm client software.

AcoustID is an open source project that aims to create a free database of audio fingerprints with mapping to the MusicBrainz metadata database and provides a Web service for audio file identification using this database.

Echoprint is an open source music fingerprint and resolving framework powered by the Echo Nest.

Figure 2:
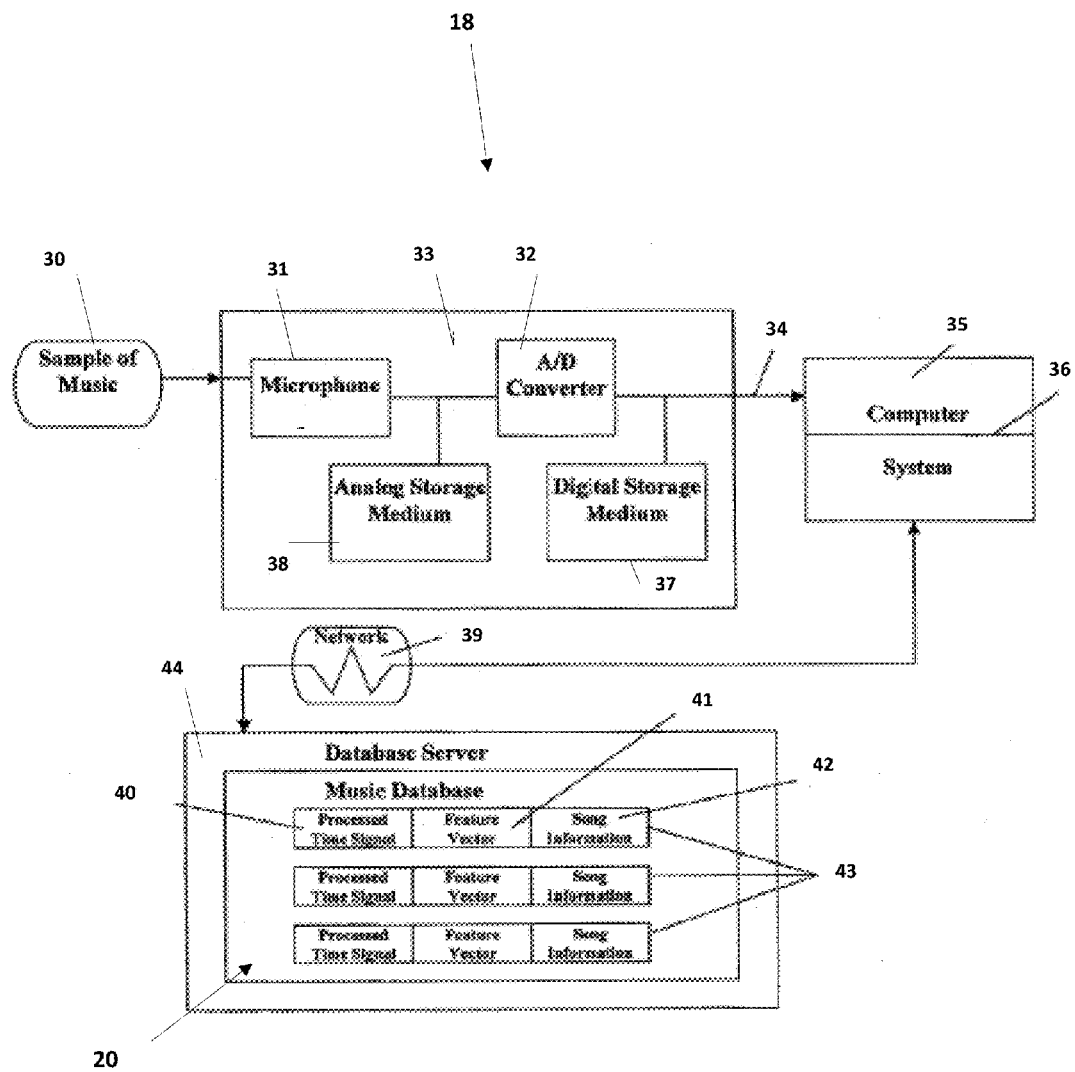
FIG. 2 is a block schematic diagram showing a mechanism for analyzing captured sound and determining an acoustic fingerprint according to the invention.

FIG. 2 is a block schematic diagram showing a mechanism 18 for analyzing captured sound and determining an acoustic fingerprint according to an embodiment of the invention. Those skilled in the art will appreciate that other techniques may be used to identify a song fragment to generate an acoustic fingerprint for identification of the song fragment for use in generating a map or mural as described herein.

In FIG. 2, a capture device 33 is used to record a sample of music, or audio data, 30 from various devices capable of receiving and transmitting audio signals, including, for example, radios, televisions, multimedia computers, and handheld devices, such as an iPhone. The capture device may include a microphone 31 and an A/D converter 32.

Additionally, the capture device may include an optional analog storage medium 38 and an optional digital storage medium 37. The capture device may be a custom made device. Alternatively, some or all components of the capture device may be implemented through the use of audio tape recorders, laptop or handheld computers, cell phones, watches, cameras, and MP3 players equipped with microphones.

The sample of music is recorded by the capture device in the form of an audio signal using the microphone. The A/D converter unit converts the audio signal of the recorded sample to a sample time signal 34. Alternatively, the audio signal of the recorded sample may be stored in the optional analog storage medium. The capture device transmits the sample time signal to a digital processing system, such as a computer system 35. Alternatively, the sample time signal may be stored in the optional digital storage medium for uploading to the computer system at a later time. The computer system is capable of processing the sample time signal into a compressed form to produce a processed sample time signal 36. Alternatively, the sample time signal may be processed by a separate processor unit before being transmitted to the computer system. The computer system is also capable of accessing a remote database server 44 that includes a music database 20. The computer system may communicate with the database server through a network 39, such as for example, the Internet, by conventional land-line or wireless means. Additionally, the database server may communicate with the computer system. Alternatively, the database server may reside in a local storage device of computer system.

The music database includes a plurality of songs, where each song may be represented by a database entry 43. The database entry for each song is comprised of a processed time signal 40, a feature vector 41, and song information 42. The processed time signal for each song can represent the entire song. The song information may include, for example, song title, artist, and performance. Additionally, the song information may also include price information and other related commercial information.

The feature vector for a song in the music database is determined by generating a spectrogram of the processed time signal for the song and then extracting features from the spectrogram. Various techniques related to discrete-time signal processing are well known in the art for generating the spectrogram. Alternatively, the feature vector for a song may be extracted from the original, unprocessed time signal for the song. The features are represented by numeric values, and loosely represent specific perceptual musical characteristics, such as, for example, pitch, tempo, and purity. In one embodiment of the invention, the feature vector for each song in the database includes five feature components derived from the projection of a spectrogram in the time (X) and frequency (Y) axes. The first feature is the Michelson contrast in the X direction, which represents the level of beat contained in a song sample. The second feature represents the amount of noise in the Y direction, or the purity of the spectrum. The third feature is the entropy in the Y direction, which is calculated by first normalizing the Y projection of the spectrogram to be a probability distribution and then computing the Shannon entropy. The fourth and fifth features are the center of mass and the moment of inertia, respectively, of the highest three spectral peaks in the Y projected spectrogram. The fourth and fifth features roughly represent the tonal properties of a song sample. Features representing other musical characteristics may also be used in the feature vectors.

The sample of music is converted into the sample time signal and transmitted to the computer system. The computer system processes the sample time signal to produce a processed sample time signal. The computer system applies a signal matching technique with respect to the processed sample time signal and the processed time signals of the music database to select a song corresponding to the best match. The song information corresponding to the selected song is input as a query to a map generation module.

Map

Upon receiving song information corresponding to the selected song as an input query, the map generation module creates a map. A map is the implementation of a set of user interface features and abstractions and physical design organization principles exposing the fundamental relationship of music as defined herein; time, location, genre, and artist. The song information received from the music recognition is received by the user interface as a navigation query. The user interface abstractions include an animated mural, filter bar, network relationships view, music annotated maps, and a music GPS. In addition to this broad and general definition, specific user interface elements will be presented as a preferred embodiment whose representation is taken to be representative but not limiting to the general definition.

The discussion herein relates to embodiments of the invention that concern music. The invention is not limited to music and other embodiments of the invention apply the herein disclosed teachings to, for example but not by way of limitation, fashion, film, art, news, comedy, books, healthcare, environmental issue, and the like. However, fundamental to the invention is the initial determination of an acoustic fingerprint from an audio fragment which, in the presently preferred embodiment of the invention, is a sample of a piece of music, such as a popular song. Other embodiments of the invention may develop an acoustic fingerprint from other audio sources. For example, a famous speech, e.g. Martin Luther King's I Have A Dream speech; film dialog, e.g. Humphrey Bogart's lines from the film Casablanca; or sounds, e.g. the sound of a space shuttle taking off or the song of a sparrow, may be recognized and used as an input query to generate a map or mural. As such, the invention is not limited to music fragments, but can encompass any audio information.

The fundamental relationship of music provides not only the basis for navigation at the conceptual level but also the physical design of the implementation for optimization of the delivery apparatus. The delivery apparatus constitutes a transformation of the input fundamental relationship values to a unique and novel corresponding presentation of music, its history, and culture.

A unique and novel feature of the invention is that all content is registered with the system though an act of curatorship. The human element of story telling, and deliberate association of music and music related materials and items, enables a high standard of quality and consistency in the resulting experience. The map curators have a rank and include professional expert curators employed by the map organization, as well as ordinary users. Groups of curators with common interests form communities.

Elements

FIG. 3 is a schema that names the physical components of a presently preferred embodiment of the invention, i.e. the core elements 100, primary elements 101, and supporting elements 102, as implemented by an Object/Relational Model Data Base Management System (ORM/DBMS) under an application execution environment with persistence and presentation layers. The named elements represent not only physical design structures for the definition of a relational database storage and retrieval system, but also the user-facing business logic and Graphical User Interface (GUI) components that implement the functionality described herein. The general implementation of the underlying architecture upon which the invention may be built is described in the prior art as a Model View Controller (MVC) design. A realization of the physical design structures and functionality required to implement the invention is possible with standard Web application frameworks, such as Ruby on Rails for example, with supporting standard SQL relational database applications, such as Oracle for example, with embedded user interface technologies, such as Adobe Flash for example. A number of frameworks exist in the prior art which can provide the foundation. Specific examples are provided only to clarify how one reasonably skilled in the art can realize the invention and do not limit the scope of the invention to any particular embodiment.

Core Element Relation

Figure 4:
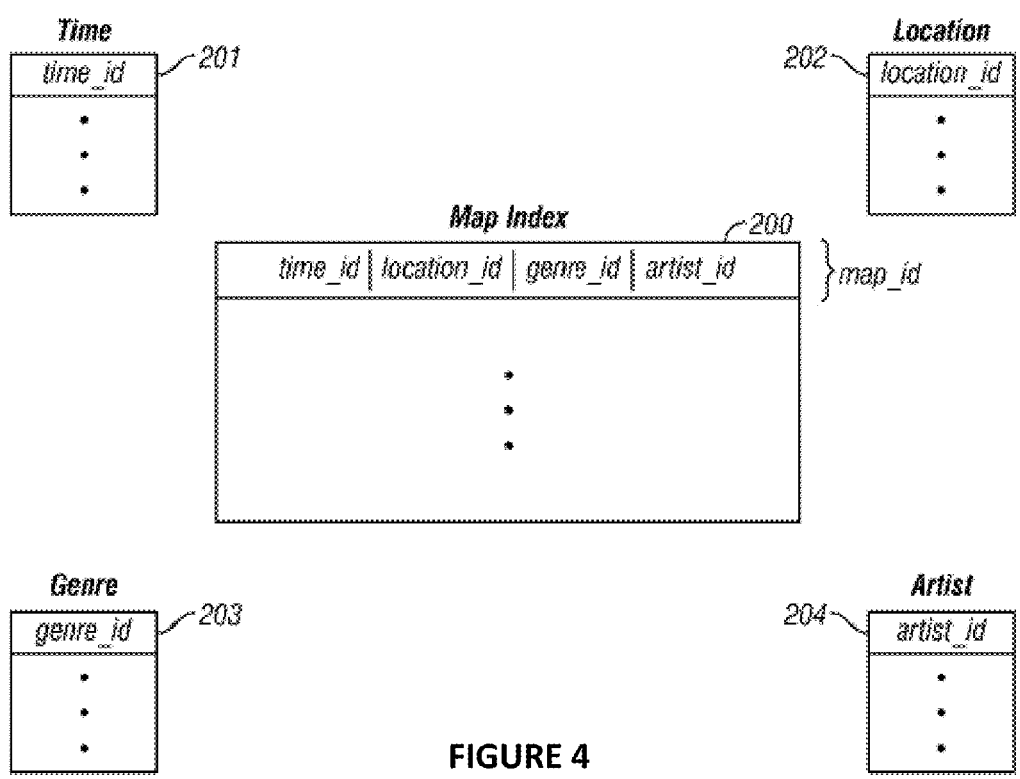
FIG. 4 illustrates a map index defining the fundamental relationship of music, its history, and culture according to the invention.

FIG. 4 shows the fundamental relationship of music as defined in a presently preferred embodiment of the invention, and provides the basis for the conceptual, navigational, and physical organization of music-related materials. This fundamental relationship between the four core elements is referred to herein as the Map Index 200. All descriptions of music, its history, and culture are registered in the system, along with a time 201, location 202, genre 203, and artist 204. Each of the core elements has a unique numeric id, maintained by the underlying relational database management system. The unique numeric id is used as the foreign key in referencing the Map Index 200 and relating the corresponding core elements. Hence, each combination of one numeric id from each of the core elements 201-204 corresponds to a unique map_id of the Map Index 200. The assignment of a single unique numeric id to each combination of core elements optimizes the mapping of higher level abstractions to the subject relationship with reduction of four-to-one the number of required index operations. At the same time, the partition of the Map Index into the four core elements provides four core filters for data object search and retrieval. For example, optimized responses to user interactions include selecting all higher level abstractions with the same map_id, or all map_id with the same time_id. In all, in the presently preferred embodiment there are fifteen possible filter options available from the four core elements of the Map Index, excluding the empty set; all four, any one, any two, or any three core elements specified with the remaining core elements of the map_id allowed to take on any value. For example, select all map_id with time_id=4.

Primary Element Relation

Figure 5:
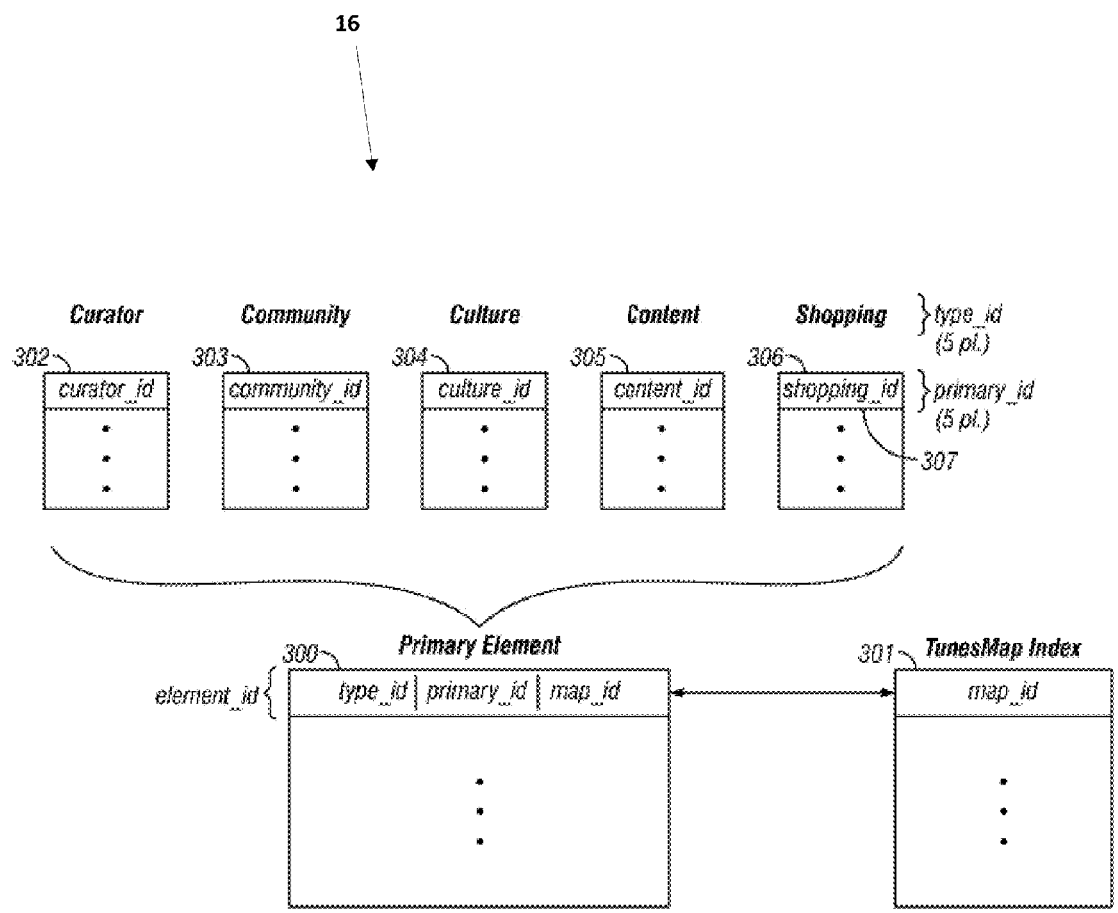
FIG. 5 illustrates primary data model abstractions designed to relate items of interest such as knowledge, media, articles for purchase, or other music related materials to a map index according to the invention.

While the fundamental relationship of music is implemented by the core elements, 201-204 of the Map index 200, a set of primary elements 302-306 shown in FIG. 5 establish the next higher level of abstraction for the classification and organization of music, its history and culture. In this embodiment, each data object is related to one of the five primary category types, i.e. curator 302, community 303, culture 304, content 35, and shopping 306. The combination of a primary type id 307 with a map_id 301 establishes a primary element 300. The primary element defines a collection of music related data objects as associated with a specific time, location, genre, and artist by way of the map_id. The primary element enables selection of all the primary types available for a given map_id, or all the map_id available for a given primary type. It further enables the selection of all the map_id for a specific instance of any one of the primary categories. For example, the cultural events for a given year, are selected from the primary elements with a map_id with the given year and primary type_id for culture, all data objects with community relationships are selected from the set of map_id which belong to an element_id having a primary type_id for community, and all data objects with relationships to a specific curator are selected from map_id which belong to an element_id with a primary_id for the specific curator. The type_id of the primary categories 302-306 is an enumerated constant of the implementing class. It behaves as a foreign key for the category type in the primary element id 300, however it is used as a software switch or polymorphic selector, not as a join key in the supporting relational database; there is no stored value in the corresponding category model. This design provides a natural partition for load distribution of both the data storage and data processing required to implement the invention.

Supporting Element Relation

Figure 6:
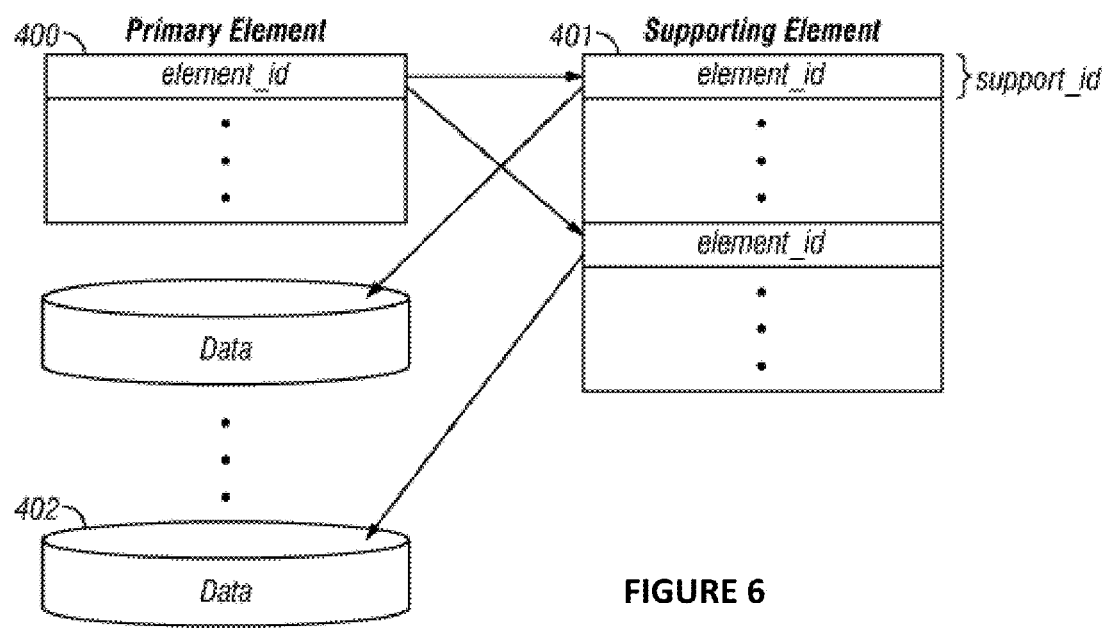
FIG. 6 illustrates a data model for physical access to the items of interest associated with a map index and instantiating one of the primary data model abstractions according to the invention.

FIG. 6 shows the physical storage of data objects 402 representing music, its history, and culture. The data object representations are implemented by supporting elements 401 related to primary elements 400 many-to-one. Each primary element, relates any number of supporting elements to the fundamental relationship of music 200 through association with a primary element 400. For example, all of the supporting elements for a specific curator with respect to a given time, location, genre, and artist are selected by the element_id with the indicated primary_id and map_id combination in the element_id.

Filter Bar Abstraction

As discussed above, the preferred embodiment incorporates the collective knowledge inherent in thousands of expert and community recommendations, major museum resources, and several lifetimes' worth of music collecting and appreciation. The map provides a filter bar abstraction that presents the same knowledge, unfolded in ways that encourage users to discover new connections to the music they love. For example, a user may perform a search for producers, engineers, and musicians that played on particular recording sessions. The invention provides a cross reference through the herein disclosed indexing system. Thus, the user may interact with the filter bar to bring up all the albums an individual produced, engineered, or played on, along with surrounding cultural references.

Figures 7A, 7B:
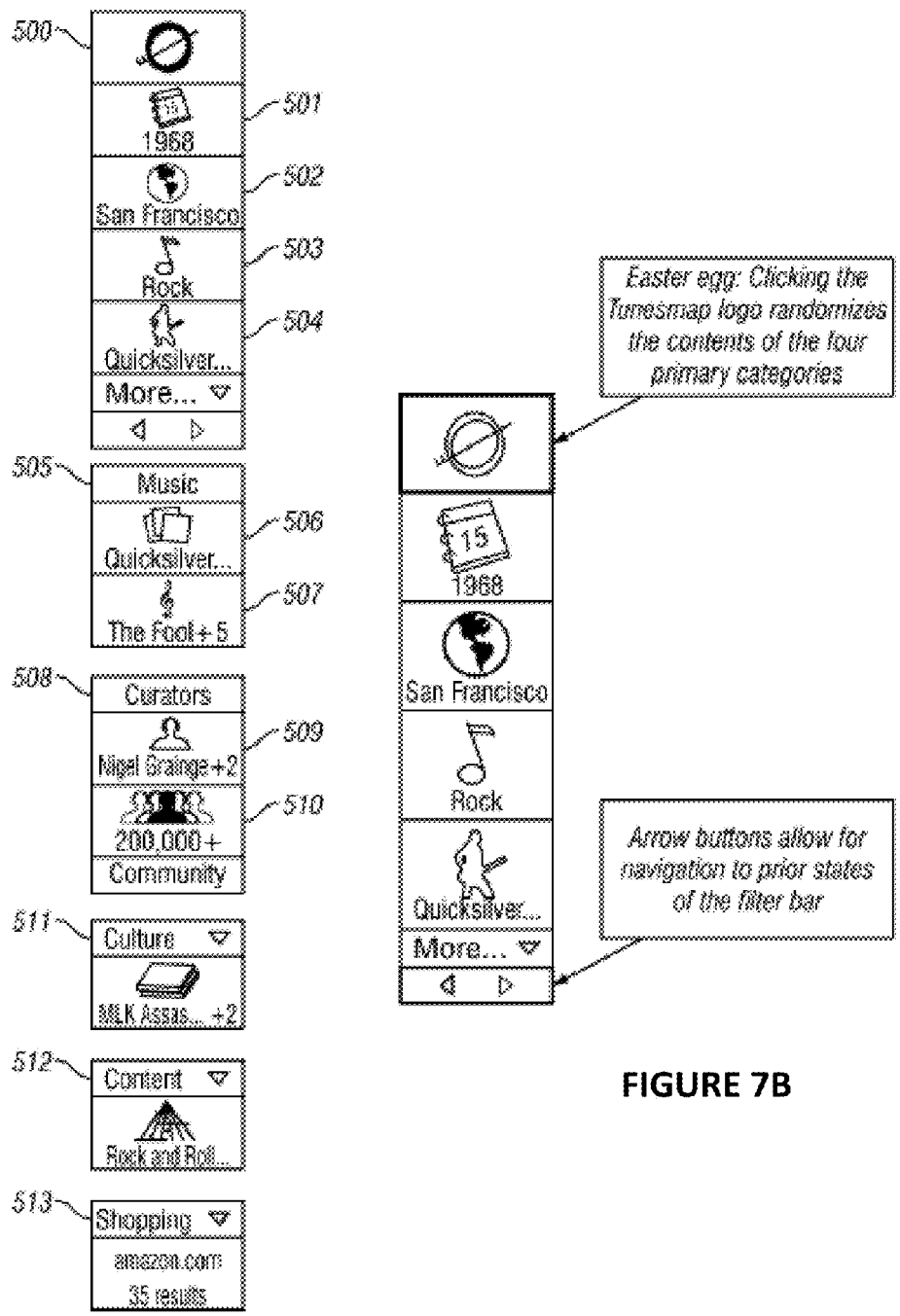
FIGS. 7A-7Q illustrate a preferred embodiment of a key filter mechanism and navigation device used to implement a user interface according to the invention.
Figure 7C:
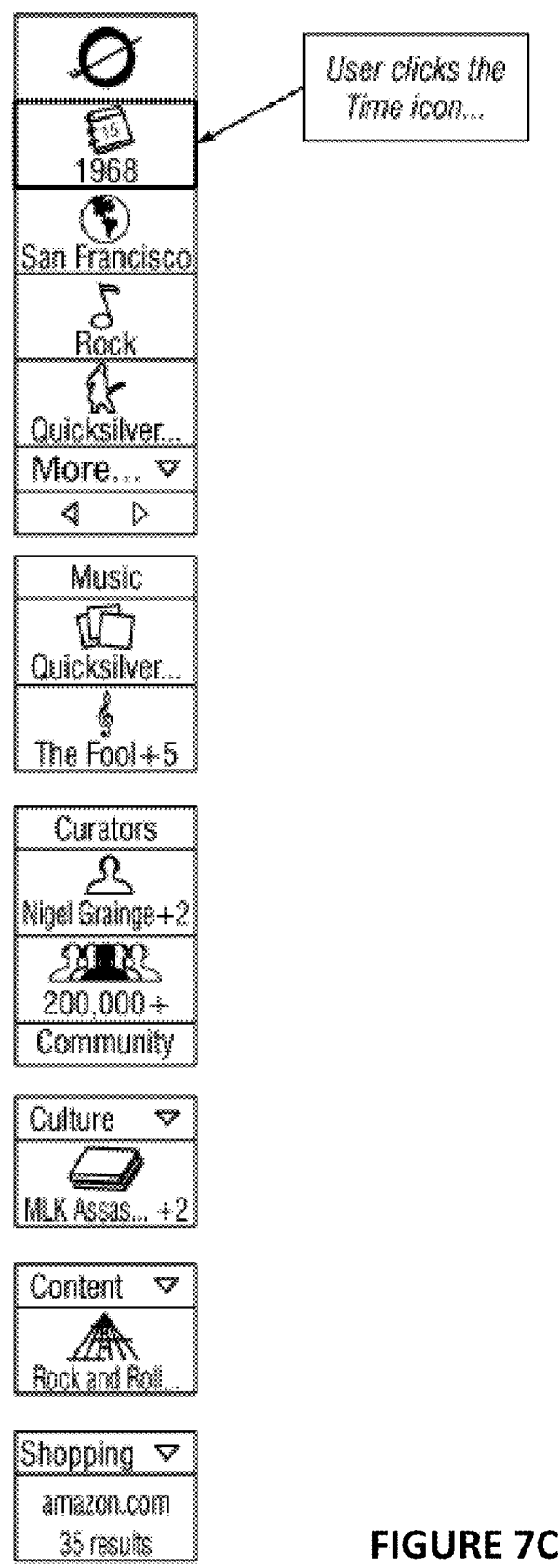
Figure 7C:
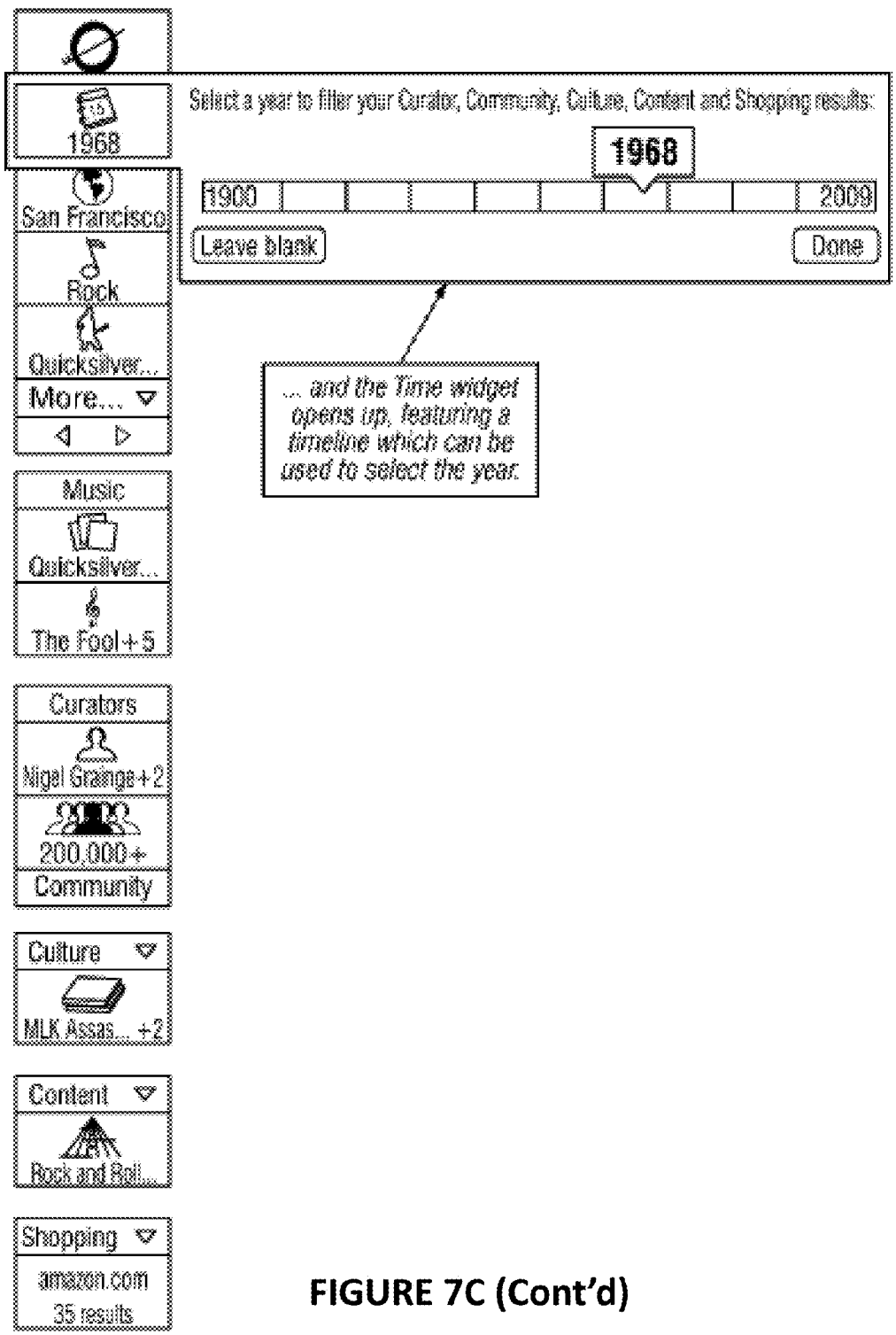
Figure 7D:
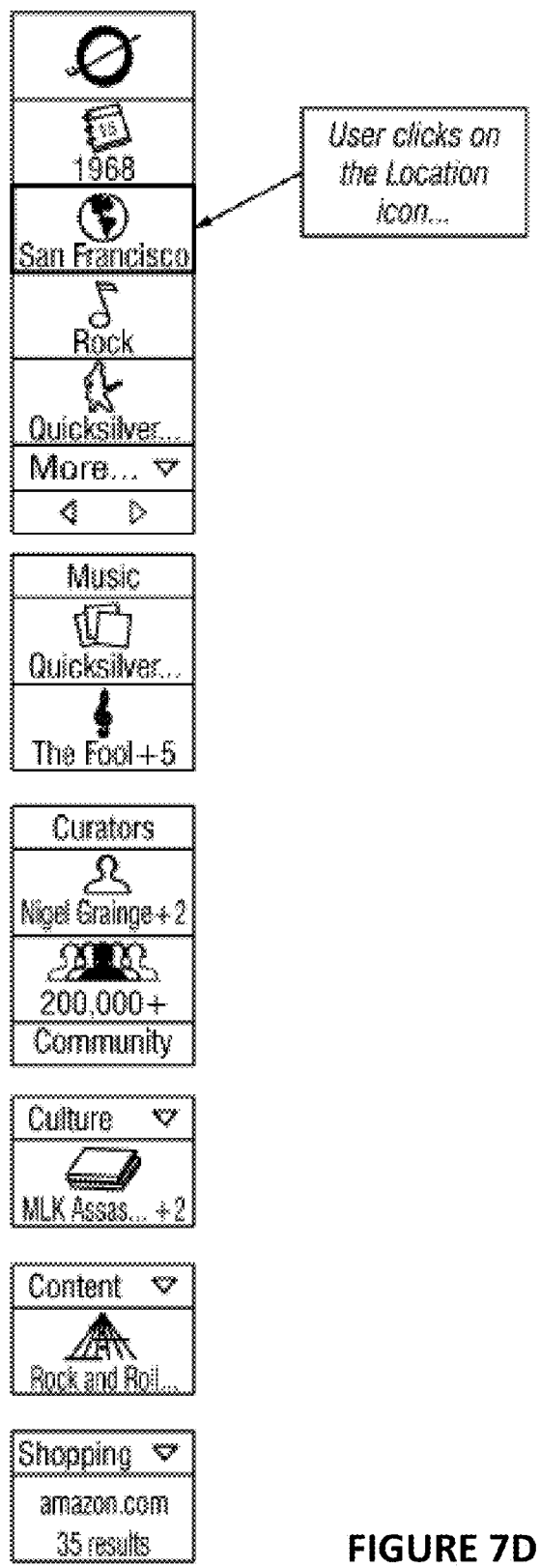
Figure 7D:
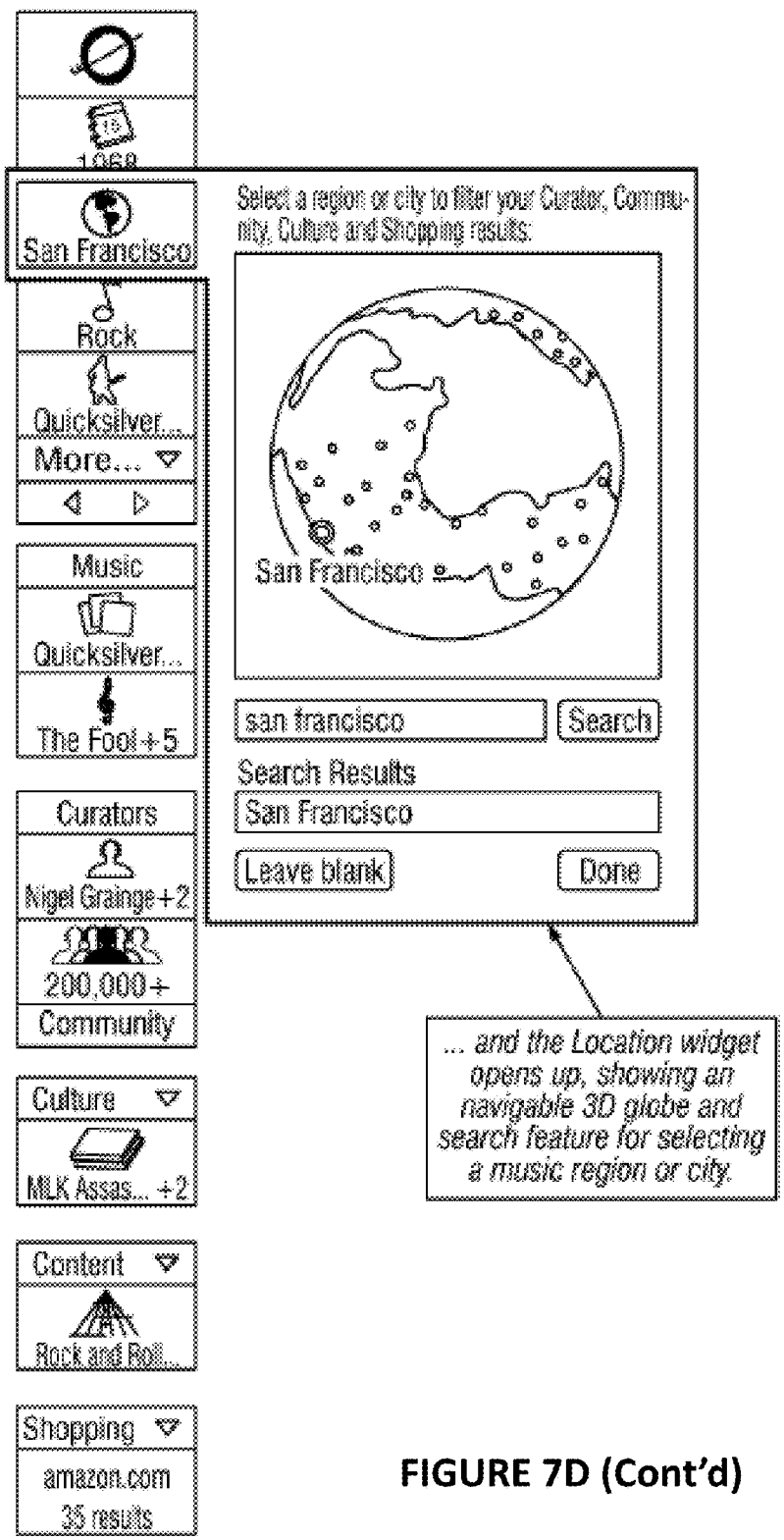
Figure 7E:
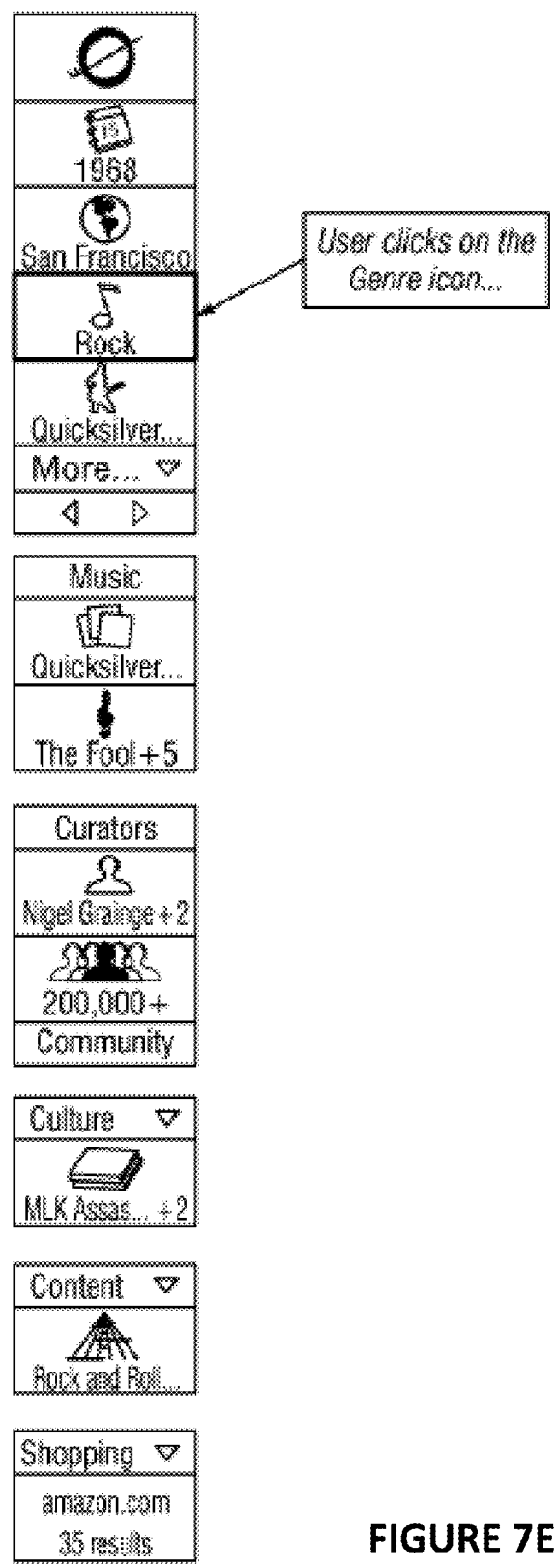
Figure 7E:
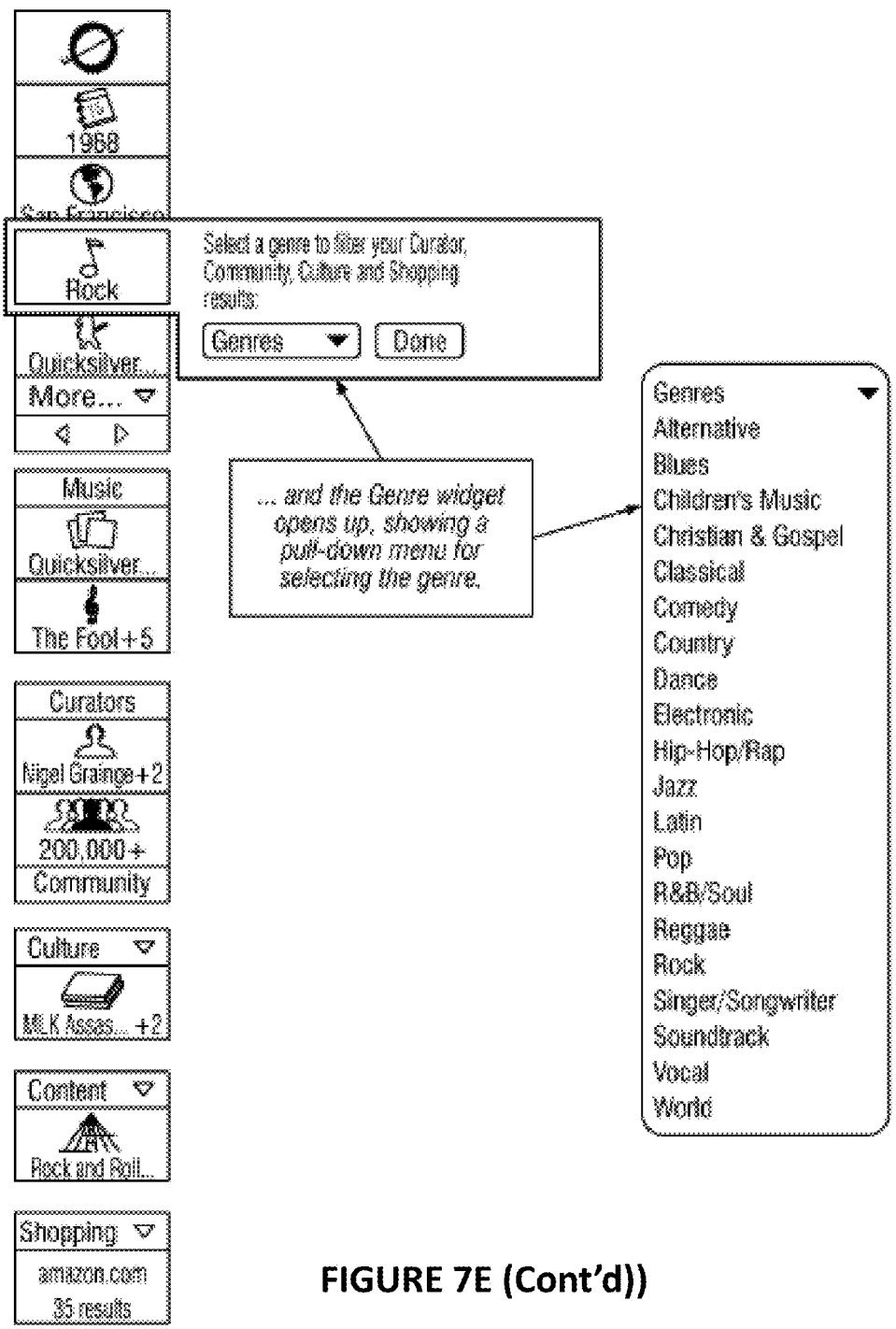
Figure 7F:
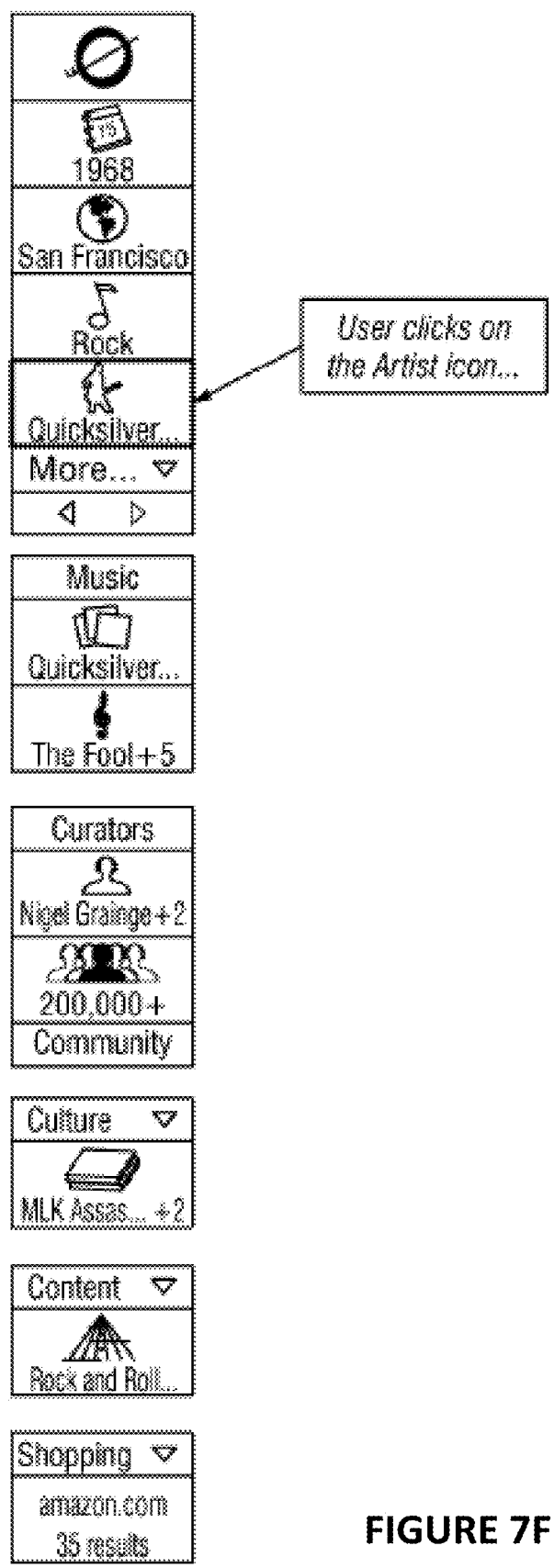
Figure 7F:
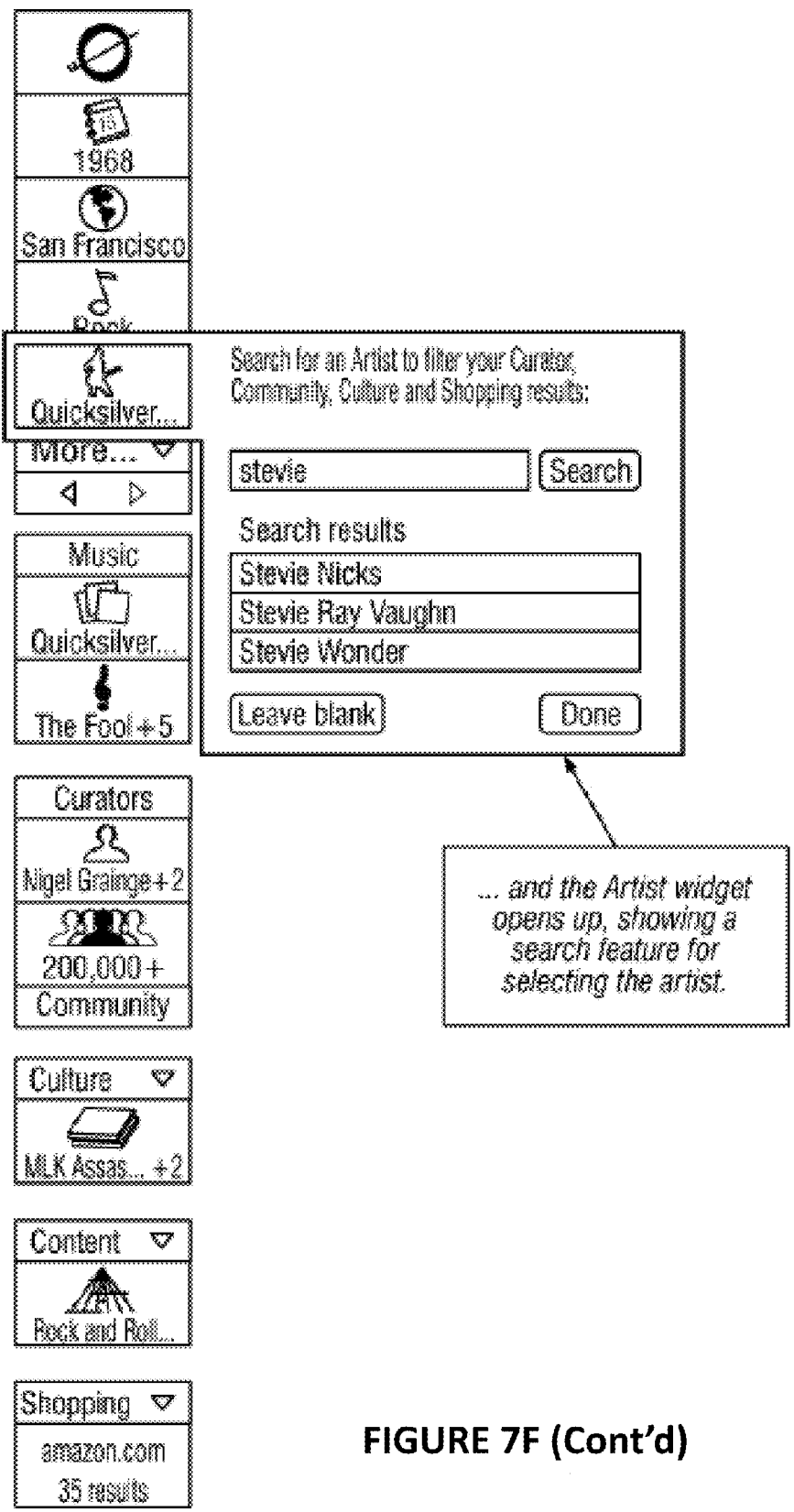
Figure 7G:
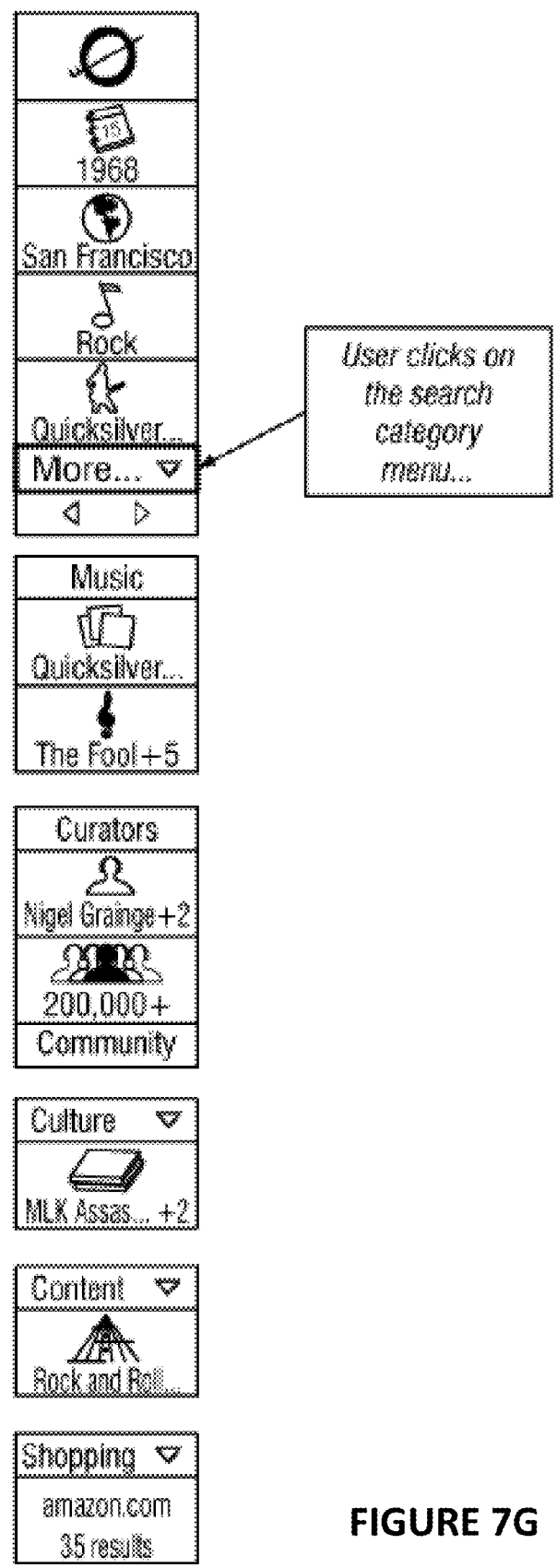
Figure 7G:
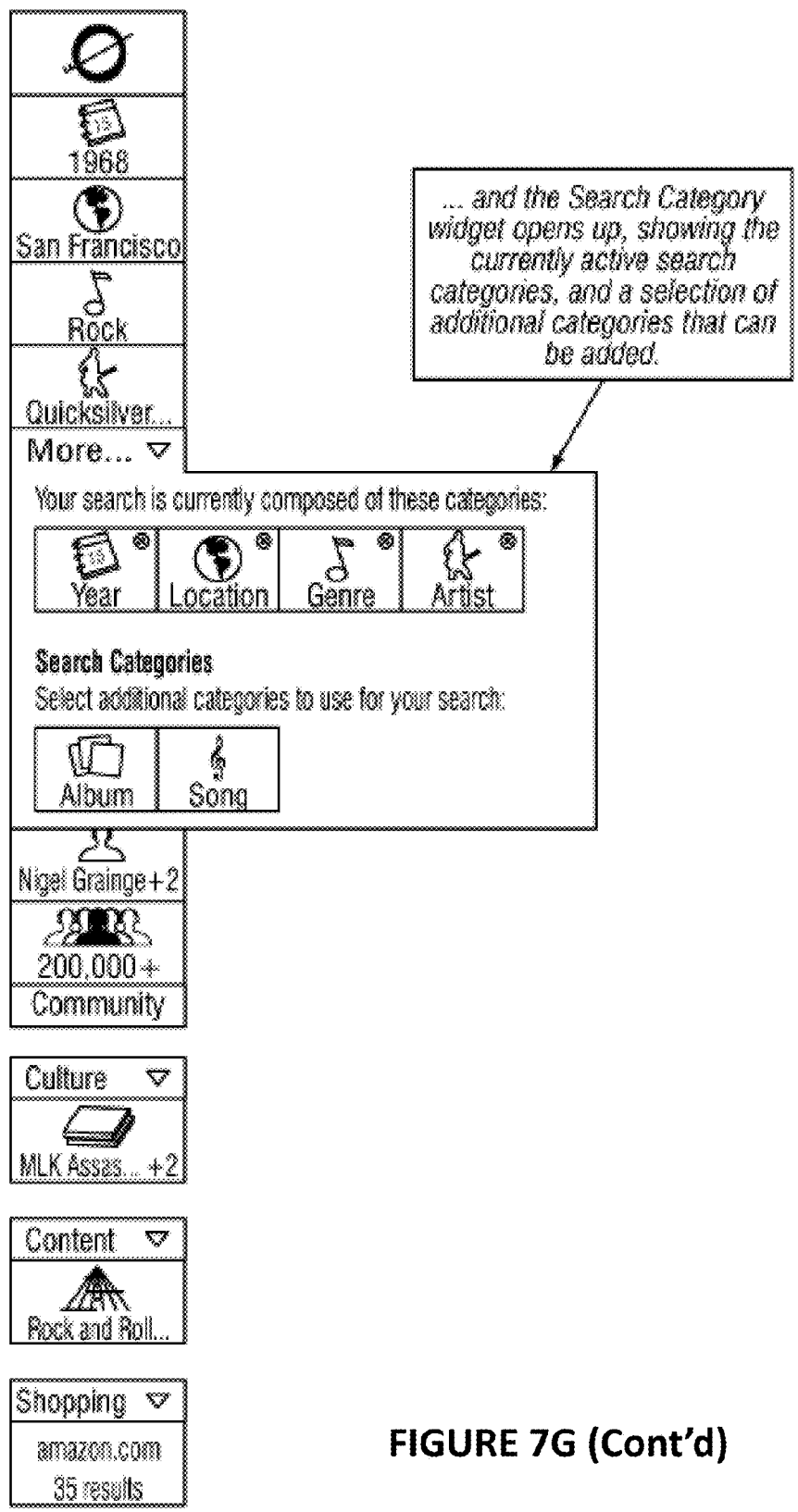
Figure 7H:
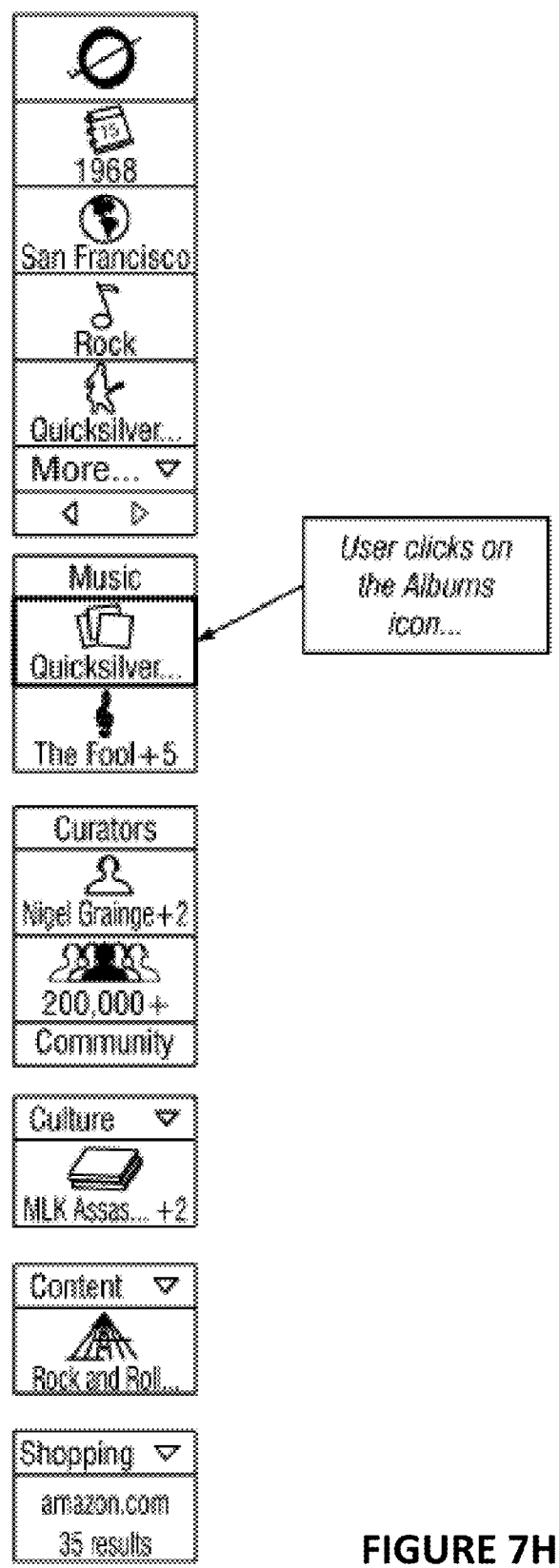
Figure 7H:
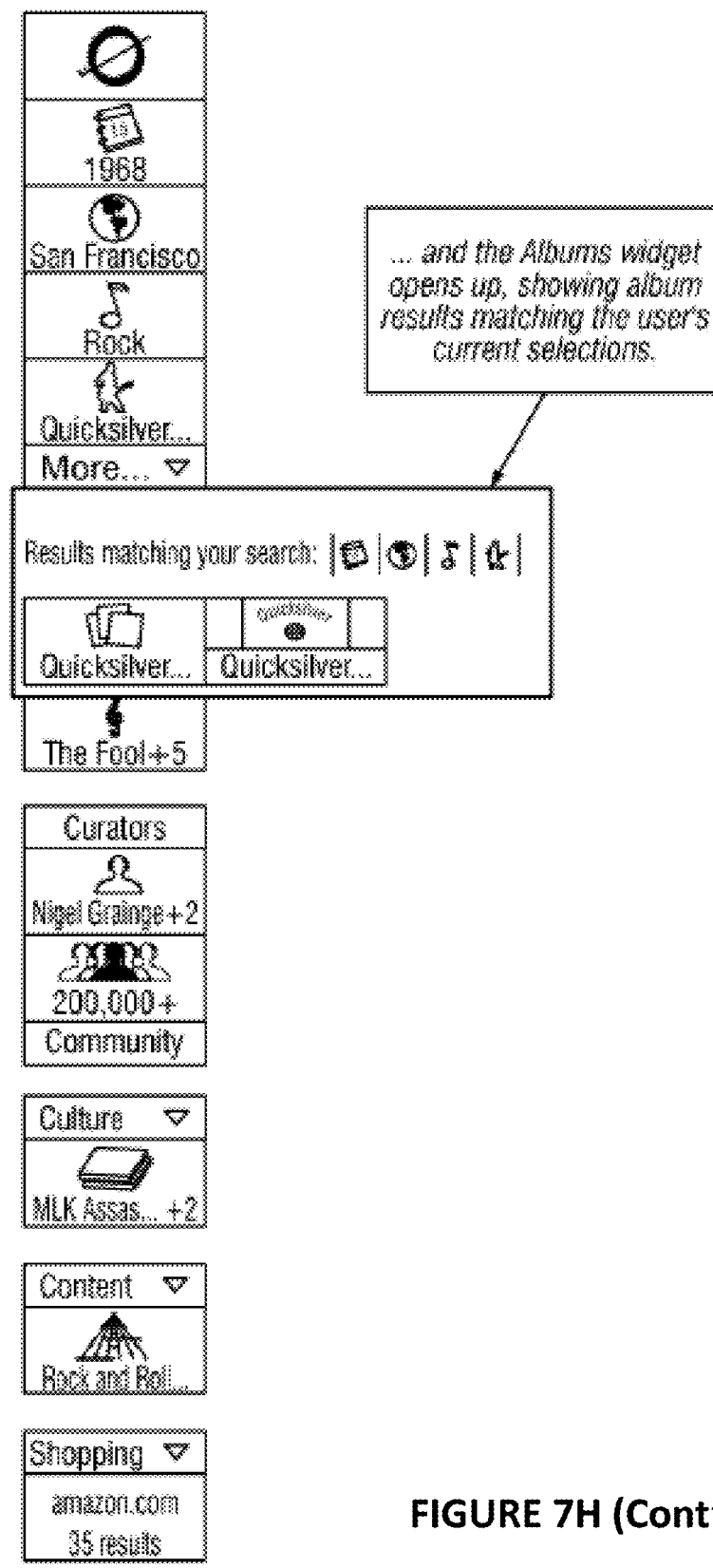
Figure 7I:
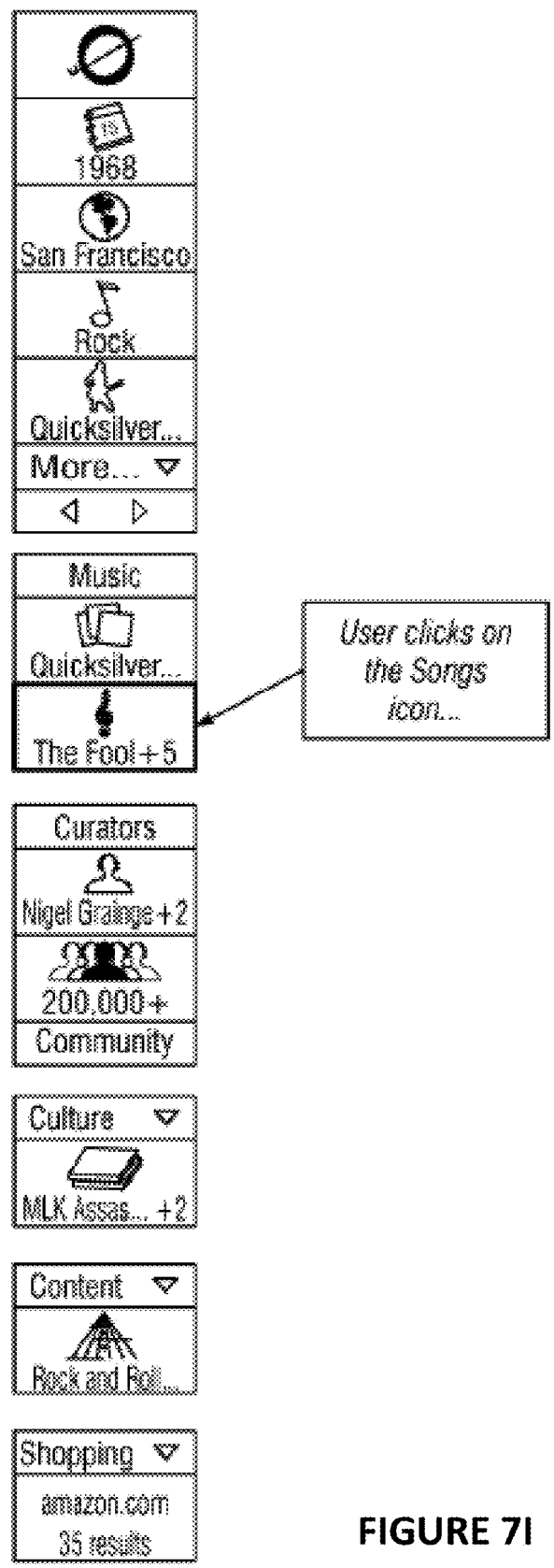
Figure 7I:
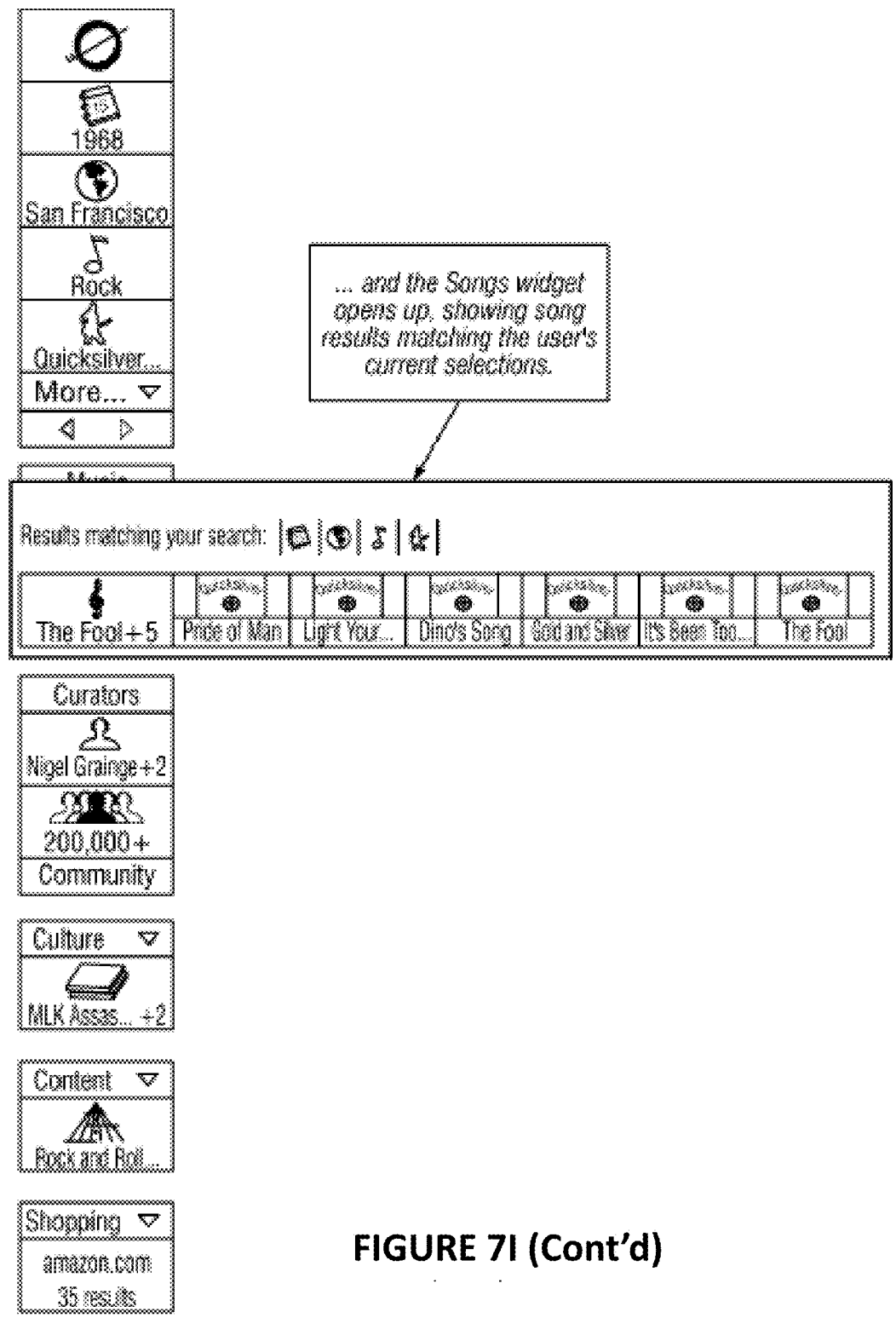
Figure 7J:
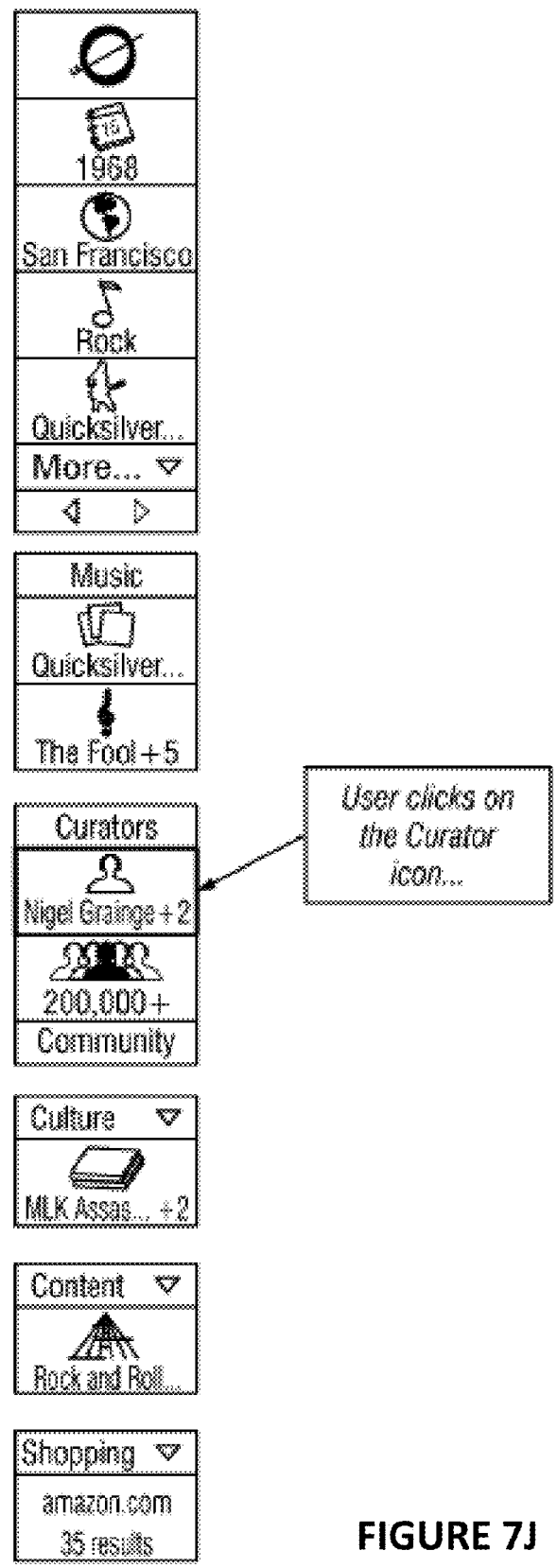
Figure 7J:
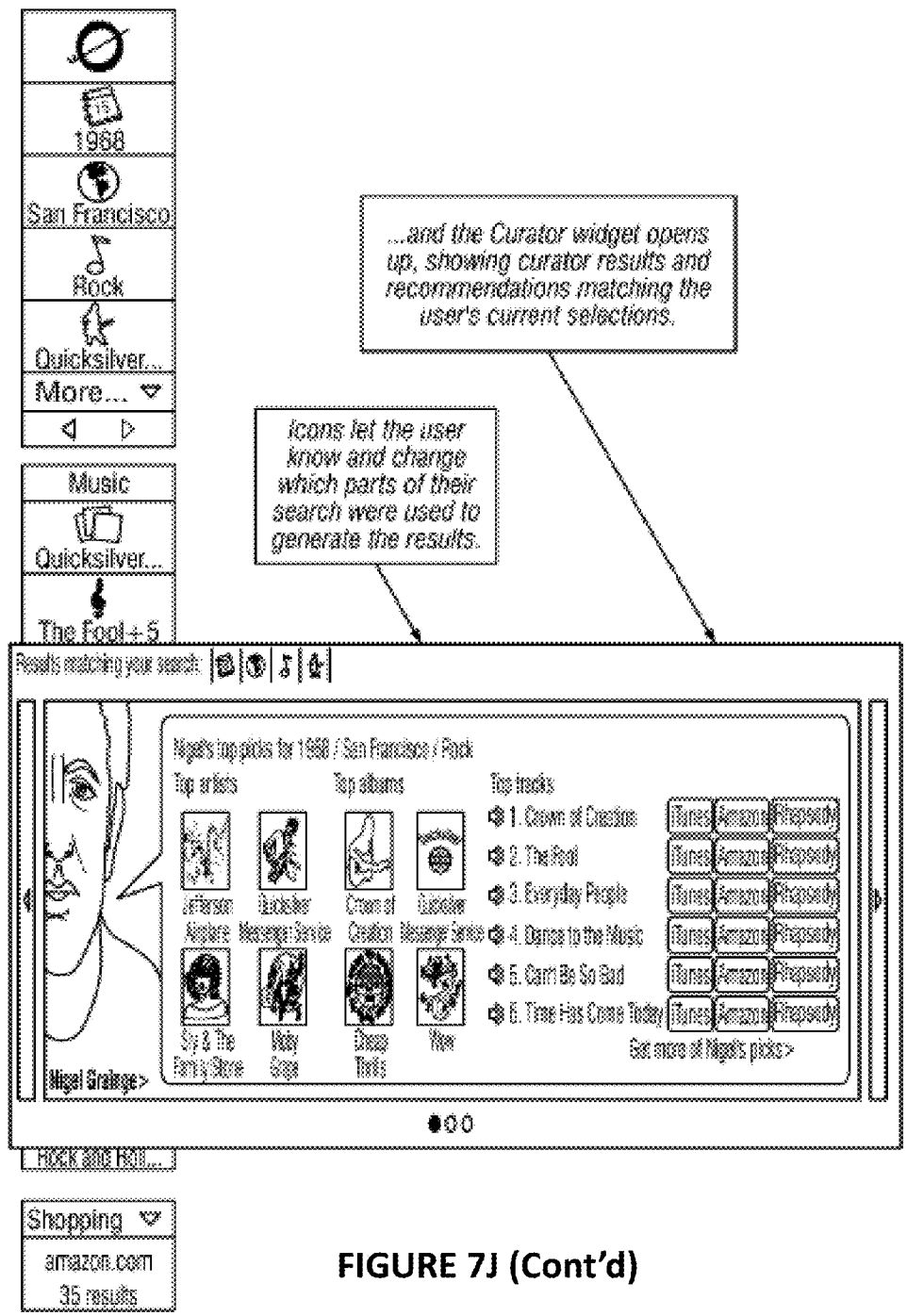
Figure 7K:
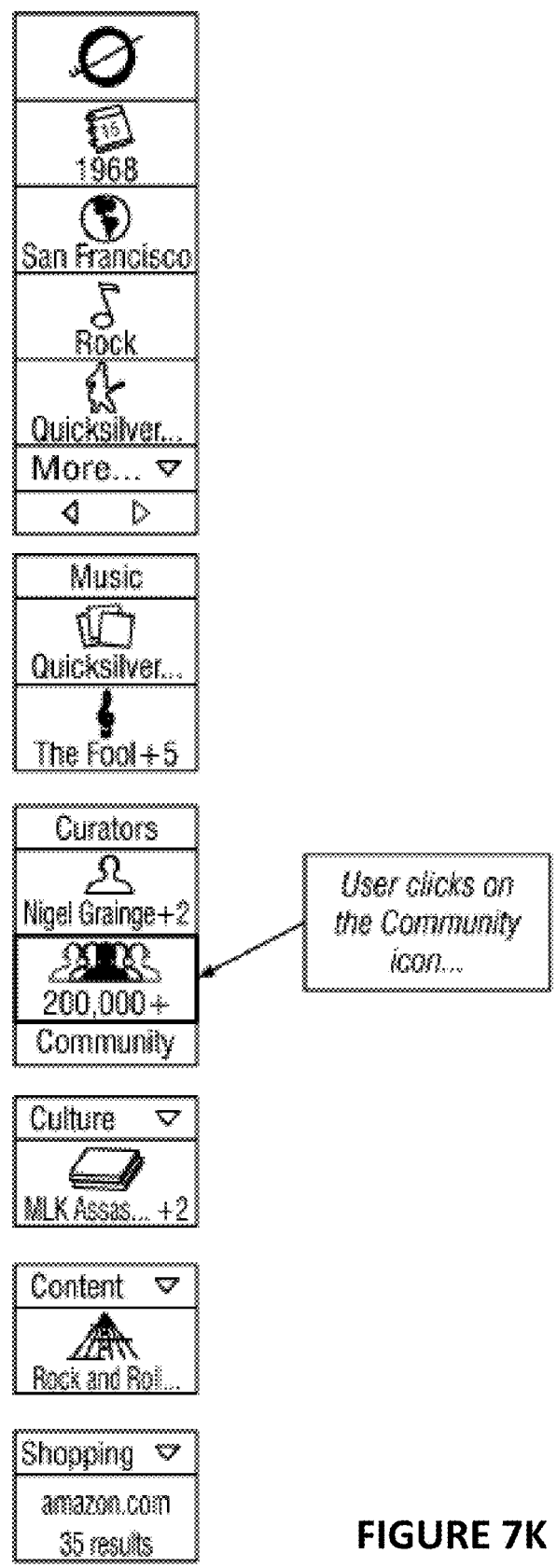
Figure 7K:
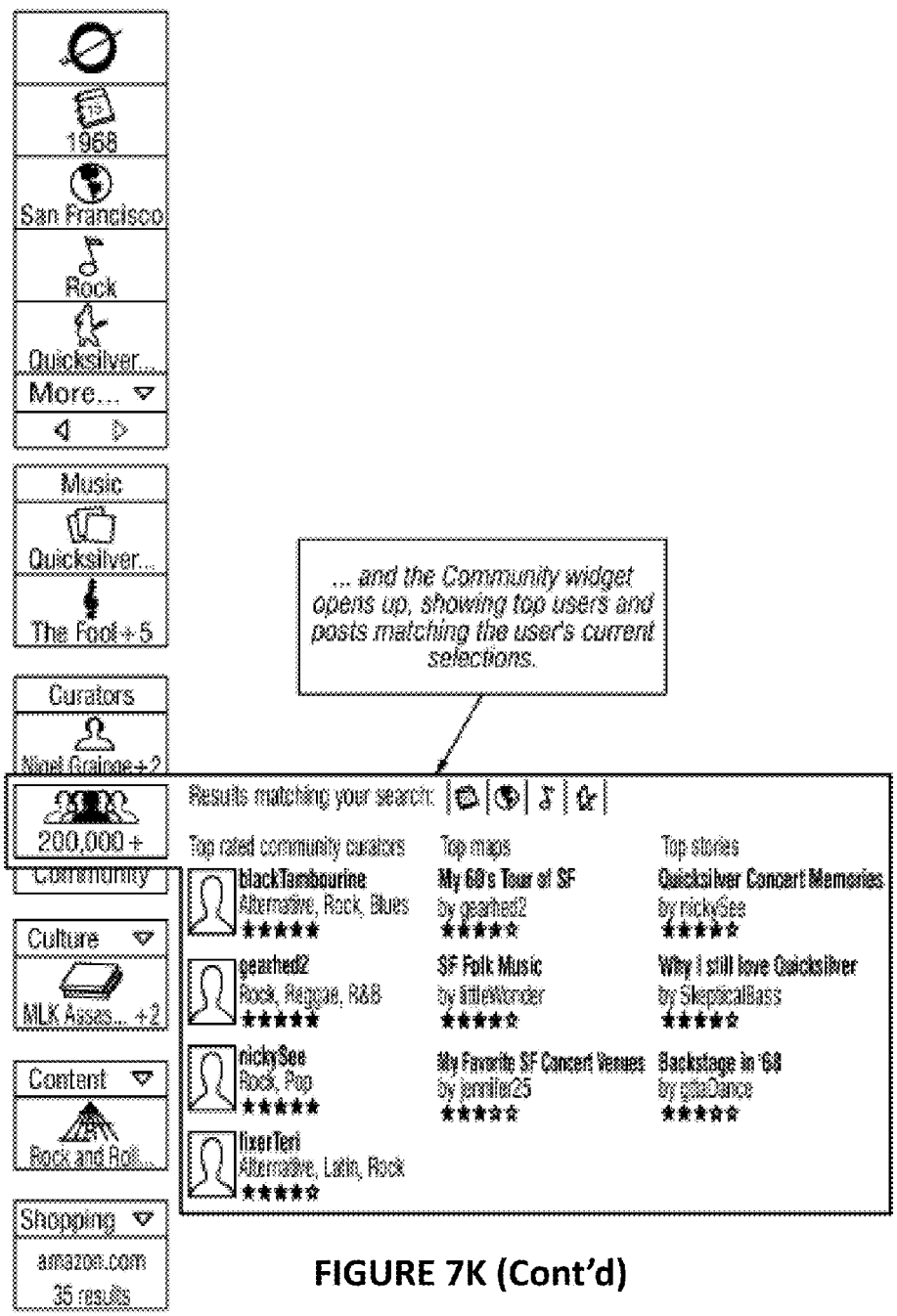
Figure 7L:
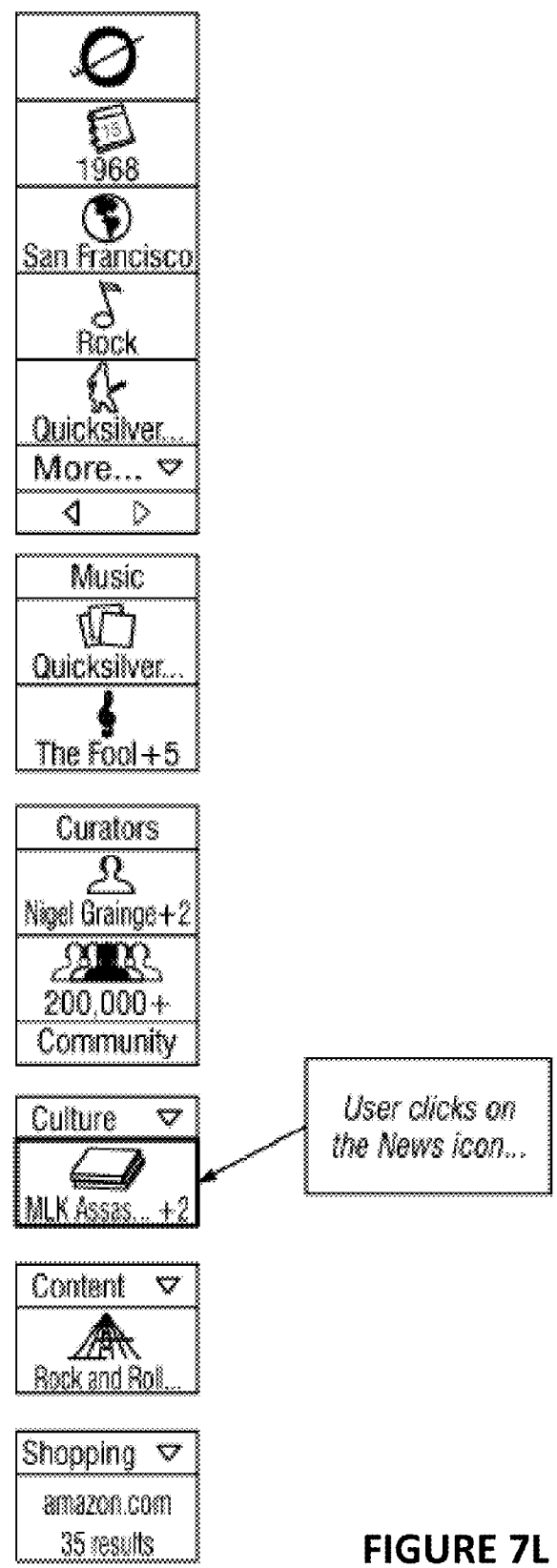
Figure 7L:
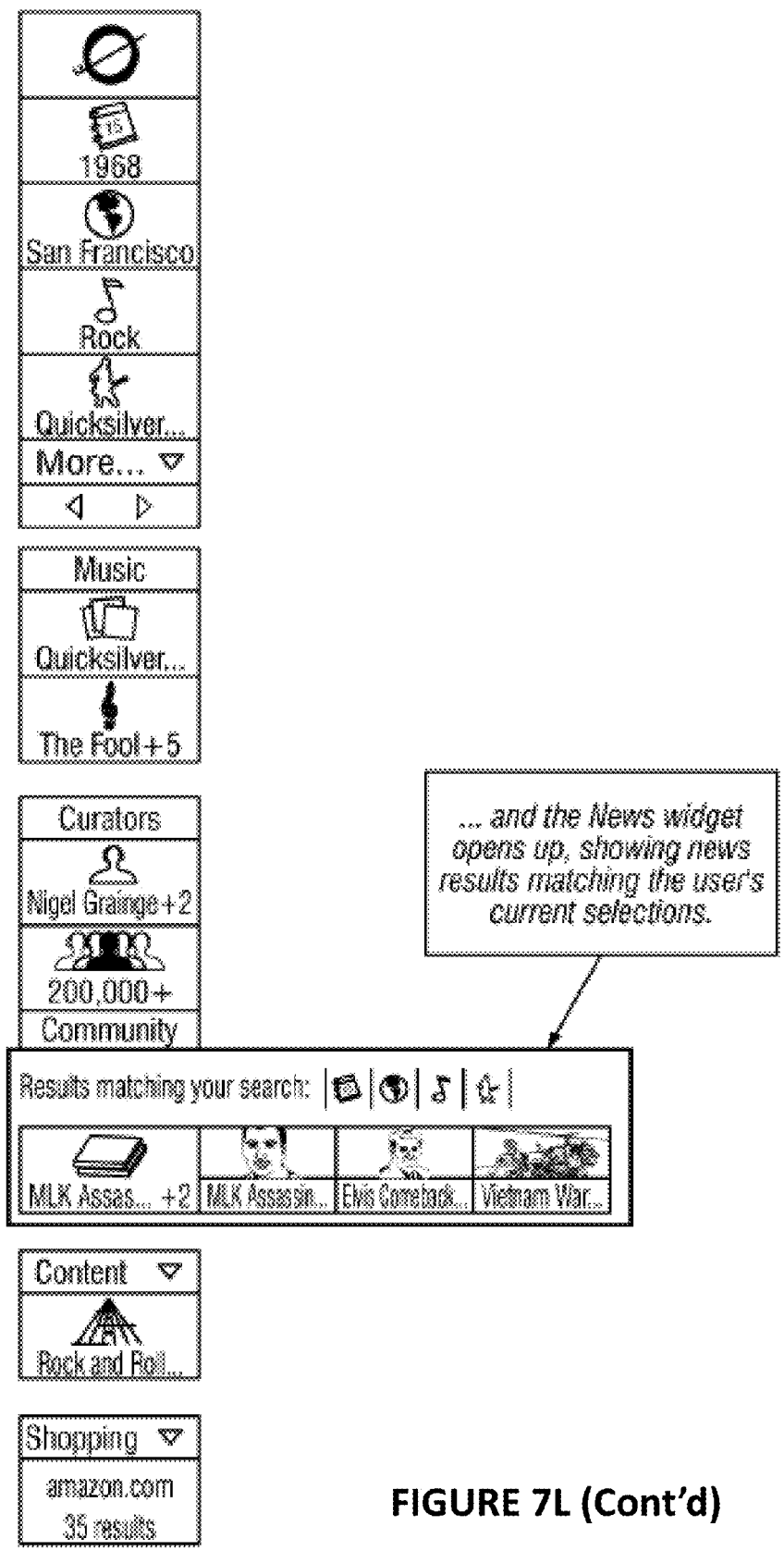
Figure 7M:
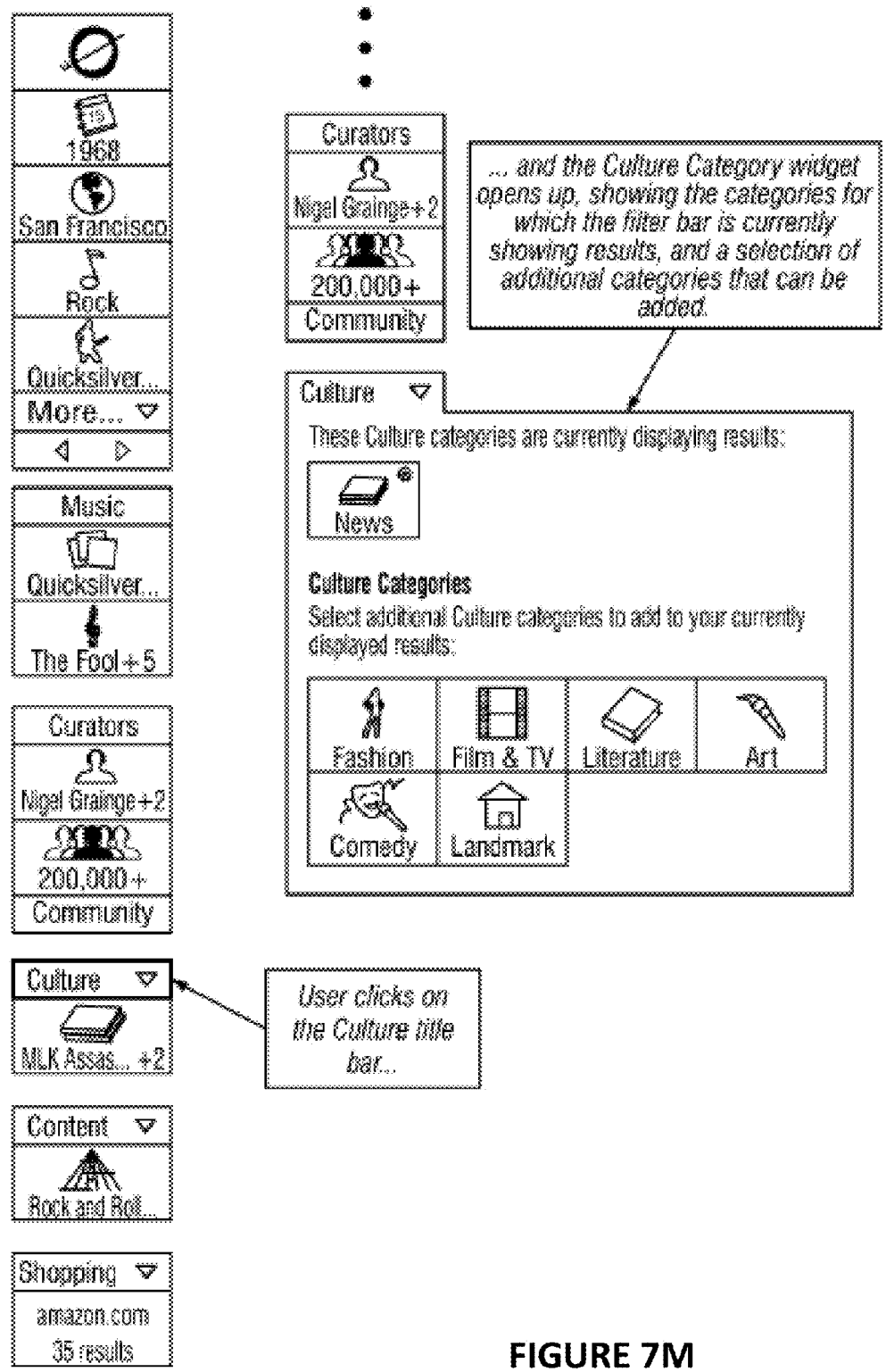
Figure 7N:
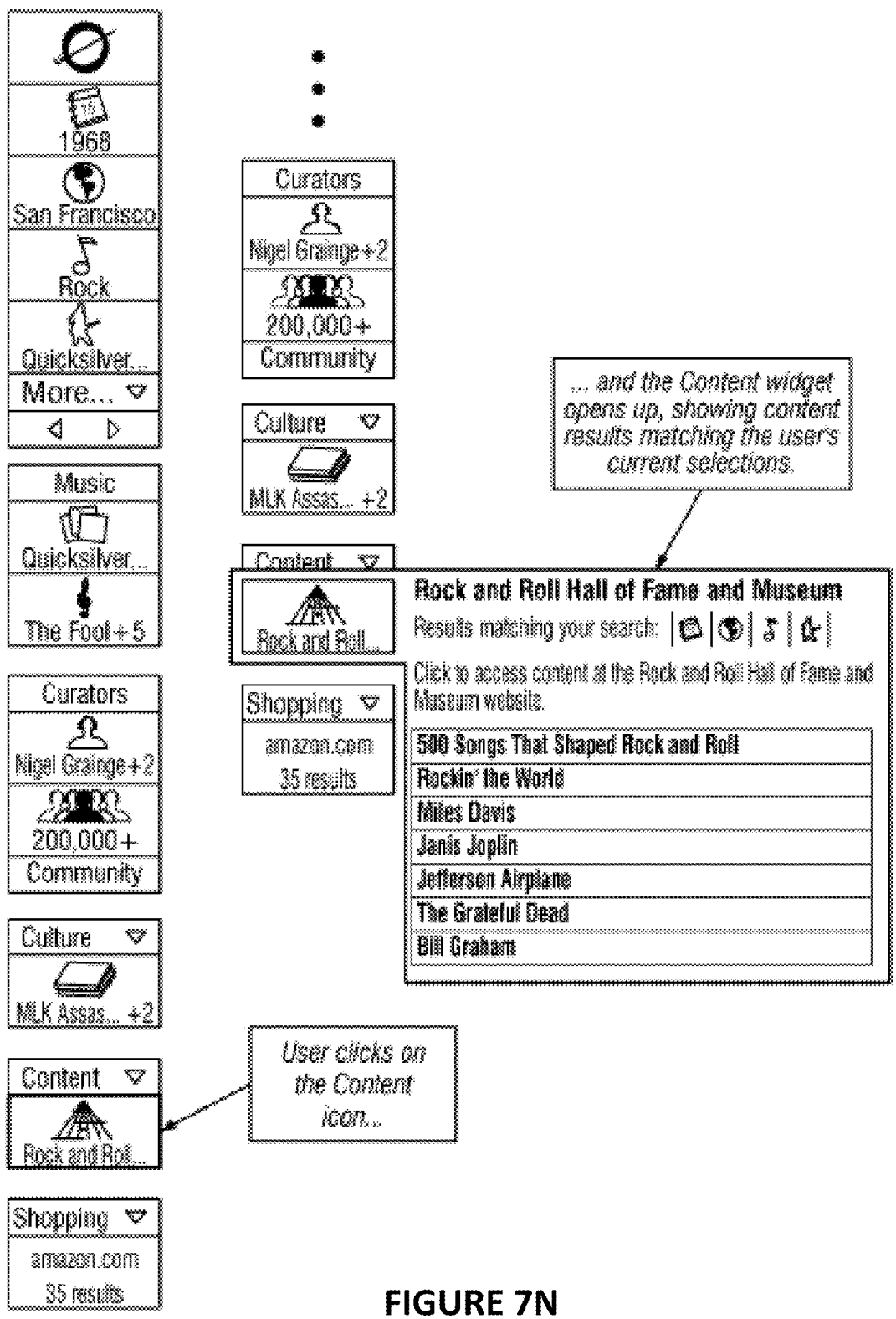
Figure 7O:
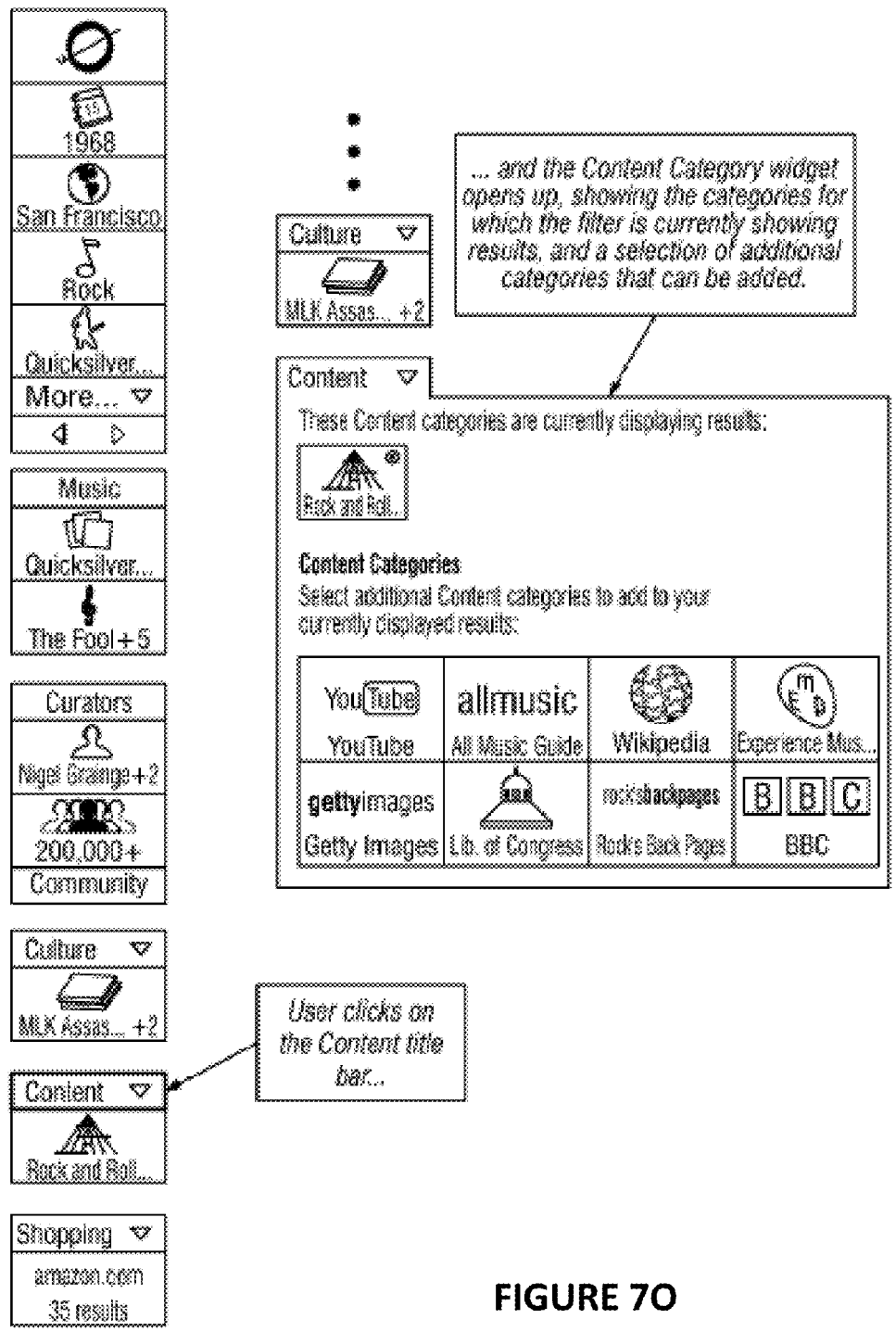
Figure 7P:
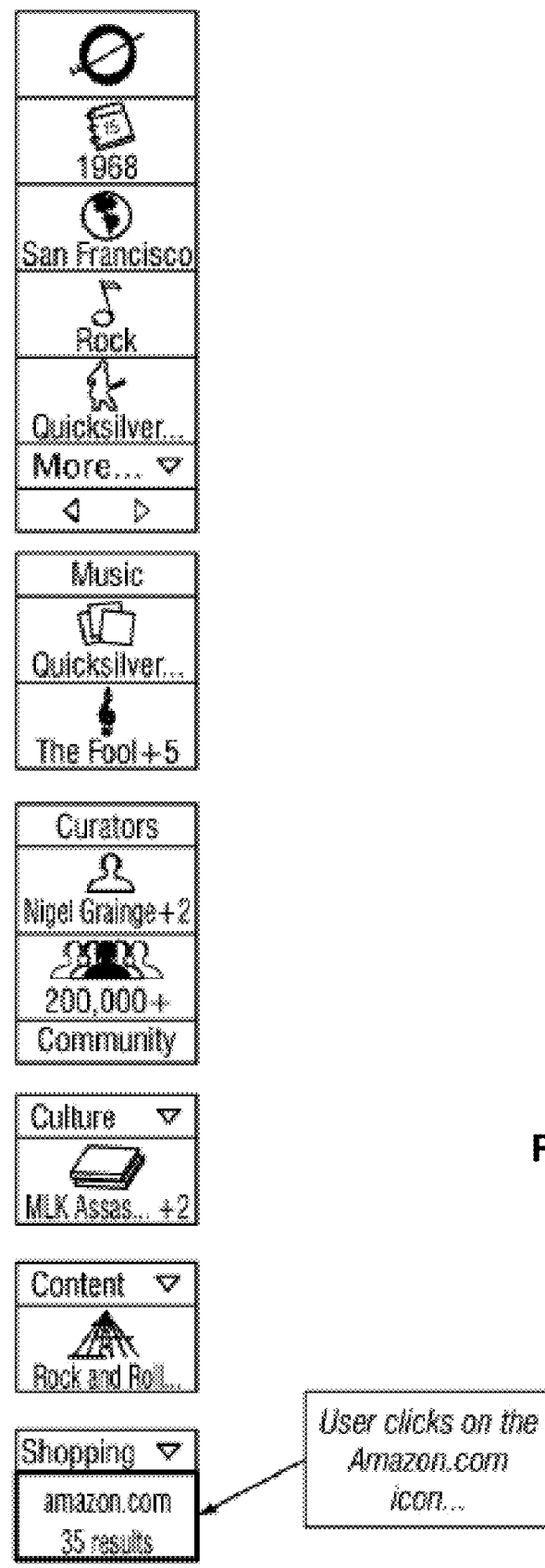
Figure 7P:
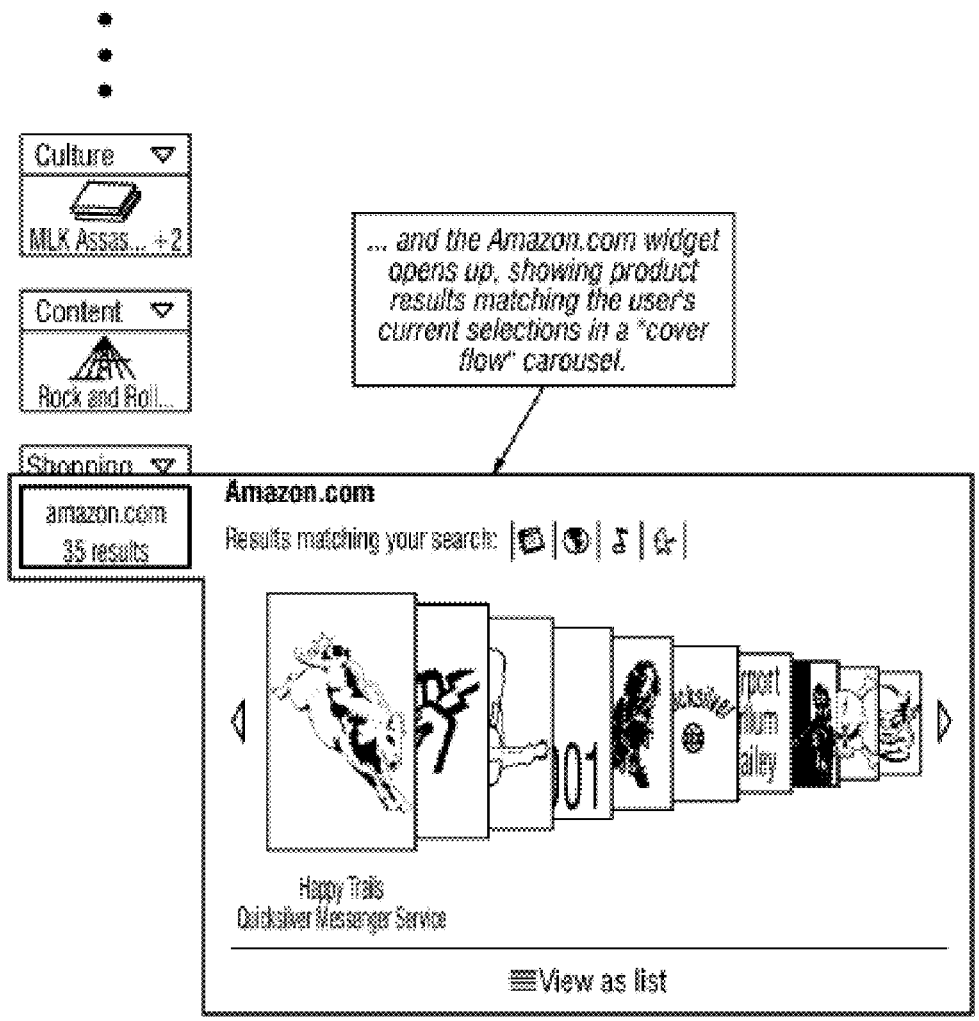
Figure 7Q:
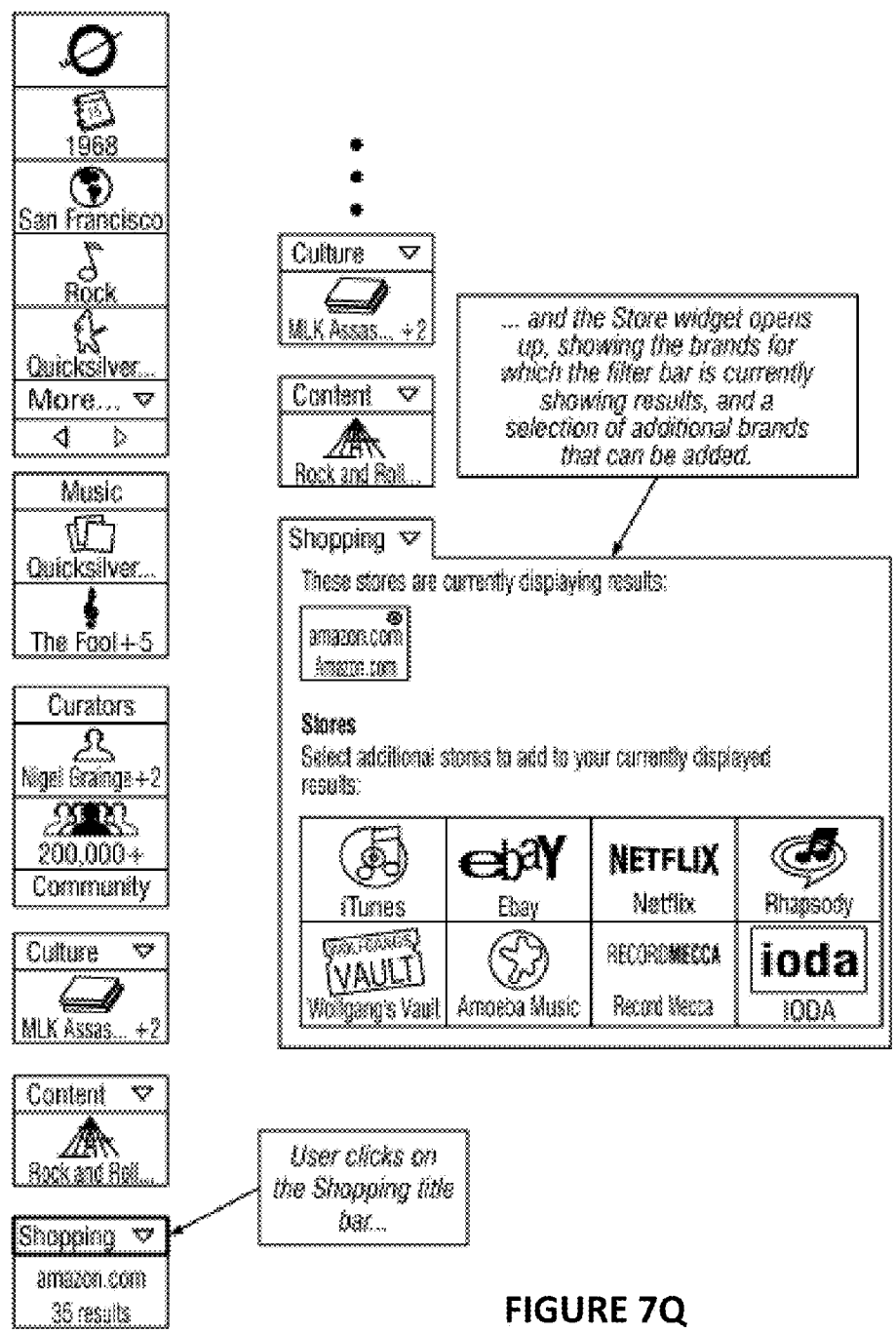

The core element relationship is exposed to the user through a filter bar abstraction 500, an embodiment of which is shown in FIGS. 7A-7Q as the results of a user's search for "1968 san francisco rock."

The filter bar presents a view with an interface to time 501, place 502, genre 503, and artist 504. These are respectively the input devices for the model elements 201-204 of FIG. 4. The user selects any or each of these items to focus their navigation accordingly. Any items that are not selected by the user are the subject of random selection by the system. The Map icon at the top of the filter bar 500 issues a re-randomization when selected. Works matching the core element relationship interface component 505, for example the medium of music is shown, from which matching results are selectable by artist 506 and song 507.

In FIGS. 7A-7Q, the core element relationship interface component 505 is a pop-up that allows a user to select from among various media, such as music, video, articles, etc. to display corresponding results by exposing the primary elements data model 300 to the user interface for navigation. The "Artist" is the currently selected artist in the map index and may be changed and traversed via the selector 505. Note that "Music" is a primary_id 300 which can occur with each primary element type 302-306. Supporting element 401 occurs in the context of a primary element 400 which, in turn, occurs in the context of a primary type and map index. Each of these elements has a navigable representation in the user interface. Note also that the namespace of the supporting elements with such entries as "Music" in the example of interface component 505 can, in general, be thought of as a W3C/RDF predicate in nature. Such data structure includes local terms, in addition to formal W3C vocabularies, such as the Dublin core, and additional industry standard ontology elements, which are important for such functions as naming and classification of external materials, indicating APIs, and defining protocols for commerce. An embodiment of the invention provides a translation of these formal semantic vocabularies into the vernacular of the user or community. For example, Blues, Jazz, Rap, and Classical music communities use very different terms to describe their art. An embodiment of the invention enables the curator to define and choose terms to describe music, its media, and culture and to use those terms to indicate qualified examples of resources that satisfy the predicate nature of the terms.

In summary, a significant feature of the invention includes the data model namespace of primary element names which define predicates in the semantic music ontology, which the map exposes, and which the user navigates. This aspect of the invention thus provides an extensible framework for the classification, curatorship, and navigation of music and its supporting media, history, and culture, The curatorship interface 508 allows both individual 509 and community curatorship 510. The Culture 511, Content 512, and Shopping 513 interfaces relate the selected music to curator and/or community defined items of interest for their respective primary categories. These user interfaces abstractions 509-513 expose the primary element relation categories 302-306 of the data model shown in FIG. 5. Use cases of the filter abstraction are depicted in FIGS. 7B-7Q.

The Map has four search categories with a dynamic extensible set of filters:

Time, Location, Genre, Artist

Note: as per the above discussion: Time, Place Genre, and Artist are each a unique numeric id that is used as the foreign key in referencing the Map Index 200. Album and Song are examples of supporting elements 401. The possible names include Video, Interview, Live Concert, etc.

Whenever the user performs a search, their search terms are analyzed and used to populate as many of the search categories as possible. In an embodiment of the invention, a search is initiated by capturing a fragment of a musical composition as it is performed, for example using a handheld device, such as an iPhone, to capture the music fragment. The music fragment is recognized, as described above, and input to the map generation system as one or more search terms. The search categories then persist throughout the site at the top of the filter bar interface, and their contents can be modified by the user at any time, either through subsequent searches or through individual controls, for example, a timeline slider to select the year.

The filters that are available to the user to navigate are the ones defined and/or chosen by the curator to describe the supporting data 401 and are applied concurrently.

The search categories act as filters which determine search results in a variety of results categories, organized into groups shown underneath the search categories in the filter bar:

Music—This group converts any unused search categories into results categories. In this example, the user has not specified an album or song in their search, so recommended albums and songs are shown here. As noted, there may be a variety of primary element types, such as Music available depending on what has been subject to curatorship.

Curators/Community—Recommended music experts from the Map and the user base at large.

Culture—Related results in Fashion, Film, Literature, Music, Comedy, and News.

Content—Related results from third-party information resources such as Gracenote, Grammy Museum, Rolling Stone, Rock Back Pages, Rock and Roll Hall of Frame, and YouTube.

Shopping—Recommended products from brands including Record Mecca, Wolfgang's Vault, Amazon, EBay, iTunes, and Netflix.

Whenever the user accesses search results in one of the results categories, the results are determined by the locked in search categories. The Curators group gets special prominence because of the overall importance of curator recommendations to the site, and top-rated community experts are also featured. All sets of material are a directly related to a curator at all times. In this embodiment, there is always a curator or group of curators behind the filter result at all times. Random selection is within the constraints of the map index and currently selected primary elements 400.

Unlike traditional discrete searches, however, the Map search is affected not only by explicit criteria input by the user in the form of a song fragment, but also by the user's path through the site. In effect, the user's initial search is smeared with their browse path to provide fresh results on each new page the user visits, while still maintaining some continuity with their original search.

How does this Work?

Let's say the user search recognizes a song that returns "1968 rock san francisco quicksilver messenger service." The Map search engine parses those search terms and locks in the following as search categories:

Time: 1968
Location: San Francisco
Genre: Rock
Artist: Quicksilver Messenger Service Clicking on the icons for any of the results categories returns items filtered by the search categories. For example, if the user clicks the Curators icon, they see a list of Map curators who are experts in San Francisco rock from 1968. If they click on the News icon, they see a list of key news items related to the San Francisco rock scene in 1968.

The Map's content management system allows curators and editors to tag certain results as more broadly relevant than their default categorization might imply. For example, the assassination of Martin Luther King Jr. in 1968 would clearly be associated with both 1968 and Memphis in the Map database. However, because the assassination was such a significant event, it could be manually flagged in the Map database to appear in all searches for 1968, regardless of whether the specific city the user searched for was Memphis or not.

Note that the specific culture icon that appears in the filter bar changes randomly within the constrains of the current filters until the user makes a specific category selection in this widget. Each icon presents the user with results specific to their search (see, for example, FIG. 7M).

Note that also the specific content icon that appears in the filter bar changes randomly until the user makes a specific category selection in this widget. Each icon presents the user with results specific to their search (see, for example, FIG. 7O).

Further note that the specific store icon that appears in the filter bar changes randomly until the user makes a specific store selection in this widget. Each store icon presents the user with results specific to their search in a cover flow carousel (see, for example, FIG. 7Q).

Mural Abstraction

A unique feature of the invention, depicted in FIGS. 8A-8F, is the visual assembly and animation of a mural 600.

The mural displays the results of the user's current filter selection 601. Displayed are iconic representations of data items of interest such as albums, videos, books, interviews, news events, etc., with a back ground image representing the current location and presentation satisfying the current filters 601. The mural icons are hot links to corresponding representations and display descriptive text of the represented items on mouse over events. A set of selectors 602 enable/disable each of the four fundamental relationships filters 201-204 of FIG. 4 independently. Qualified representations of music, its history, and culture 605 are presented in the mural with the current time 604 indicated and selectable from a time line 603. The location of the current search is viewed either geophysically (Earth, shown) 607 or conceptually (Network) by a map selector 606. The Network view and Earth maps are described in greater detail below.

Figure 8A:
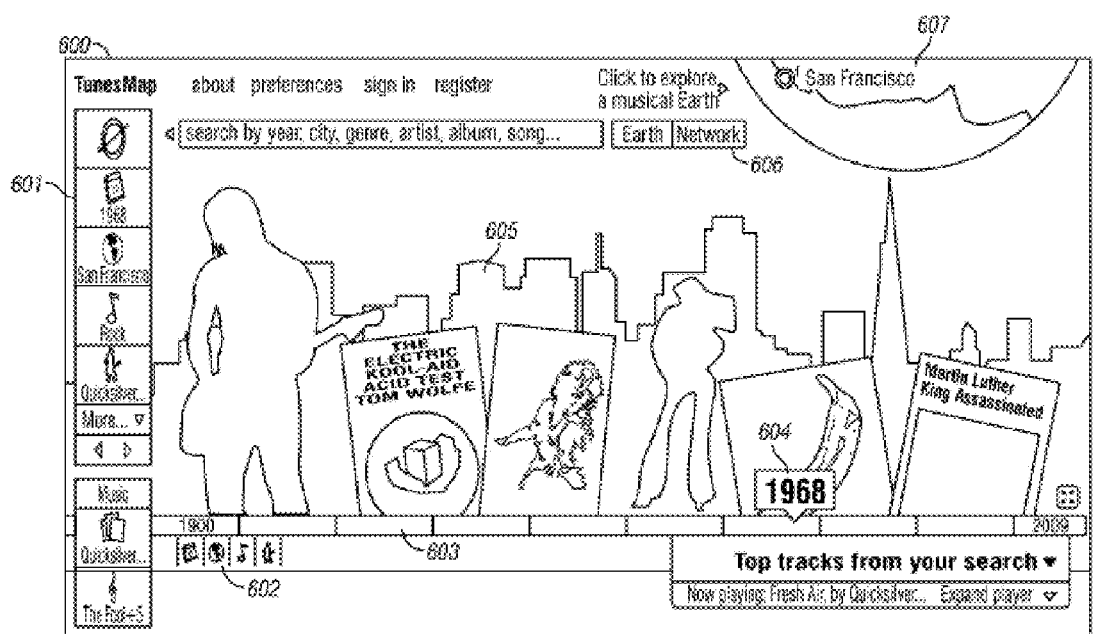
FIGS. 8A-8F illustrate a map mural depicting the fundamental relationship of music in an interactive animated user interface according to the invention.
Figure 8B:
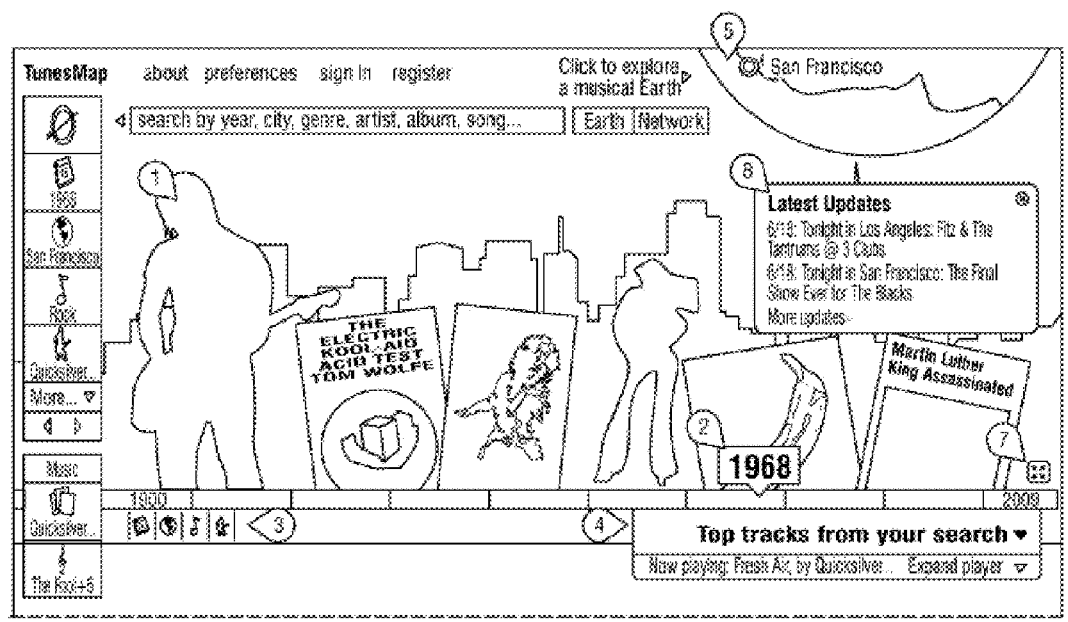
Figure 8B:
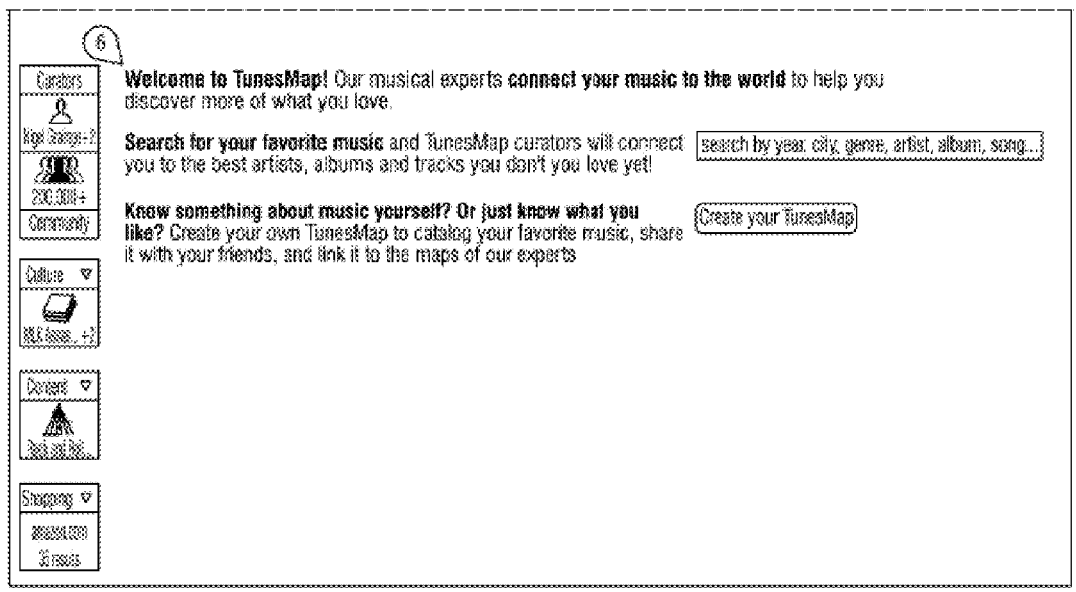

The Map home page as it appears after the user has done a search by capturing a fragment of music is shown in FIG. 8B, and presents to the user the following:

1. Mural. A dynamically animated selection of images derived from the user's current search. Images may represent regions, cities, artists, news items, comedy, fashion trends, movies, books, and genres of art. When rolled over, each image displays a pop-up that provides more information and options.

2. Interactive timeline. An interactive timeline allows the user to change the current year at will. Any changes are immediately reflected in the imagery and the Time icon.

3. Search status. This element, which appears throughout the site associated with various interactive modules, shows which of the four search components are being used to generate the content shown (here, the Mural imagery). Clicking on a given icon toggles it on and off, making the related results either broader or more refined.

4. Media selector. Plays a selection of tracks driven by the user's search. Clicking "Expand player" reveals transport controls and additional details about the current track; clicking "Top tracks . . . " opens a menu with additional playlist options, including a video playlist.

5. Mapping module—Earth mode. Displays the user's current location in the history of music, based on their most recent search, either as a point on a globe, or as a node in a diagram of pop culture referents. As the contents of the Location icon in the filter bar change, the globe rotates to center on the new location.

6. Welcome messaging. Introduces the user to the Map, and the major activities users perform on the site, e.g. exploring curator-recommended music and, optionally, building their own Map.

7. Full screen option. Toggles full-screen display of the Mural on and off.

8. Latest updates. This area displays the latest items of the Map music news. Clicking the "x" button closes the updates box.

Figure 8C:
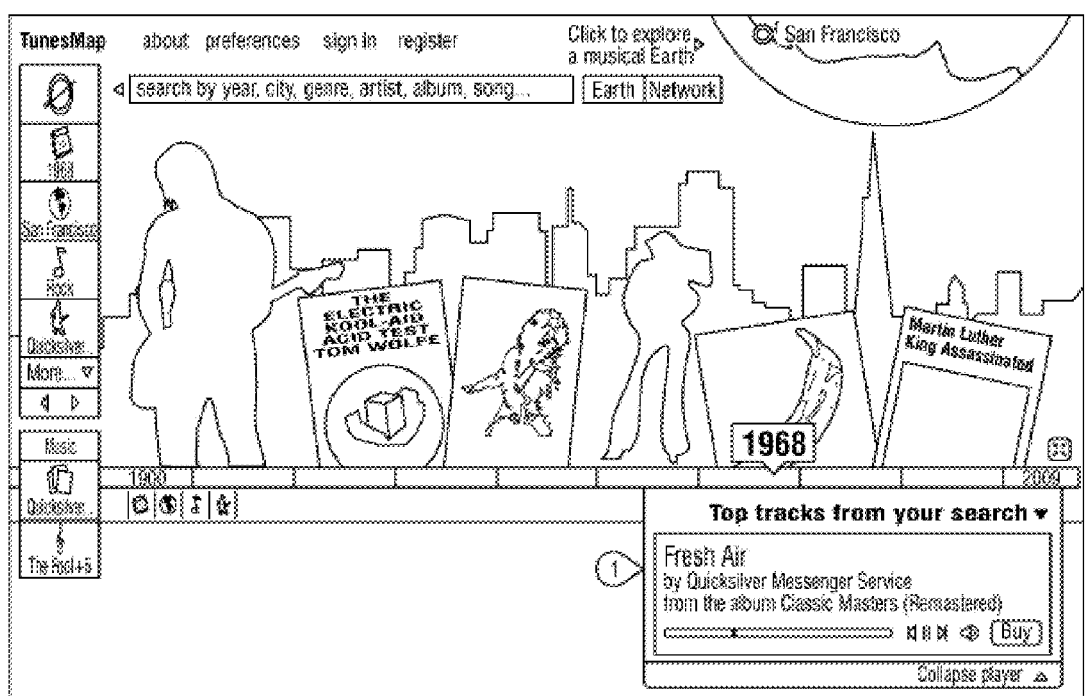
Figure 8C:
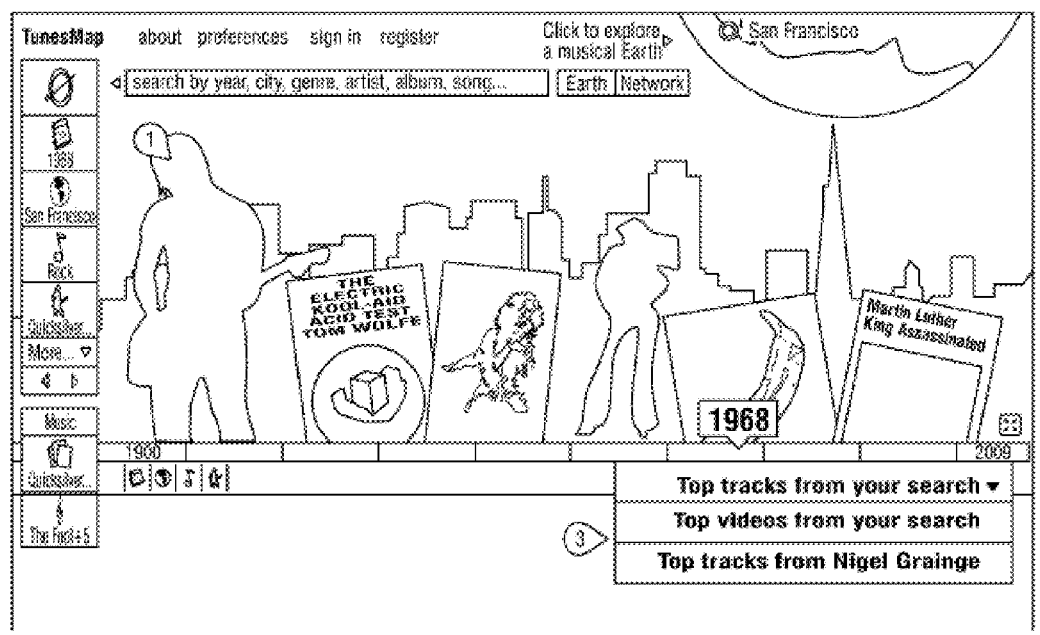
Figure 8C:
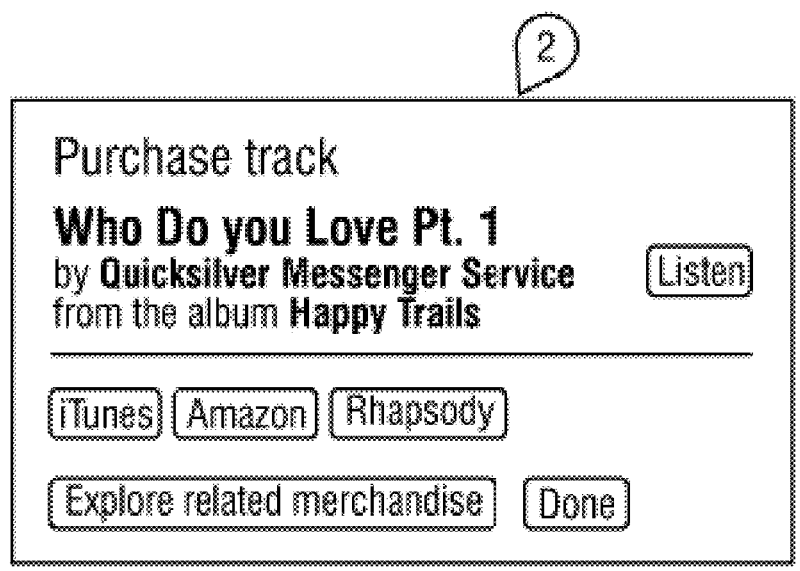
Figure 8C:
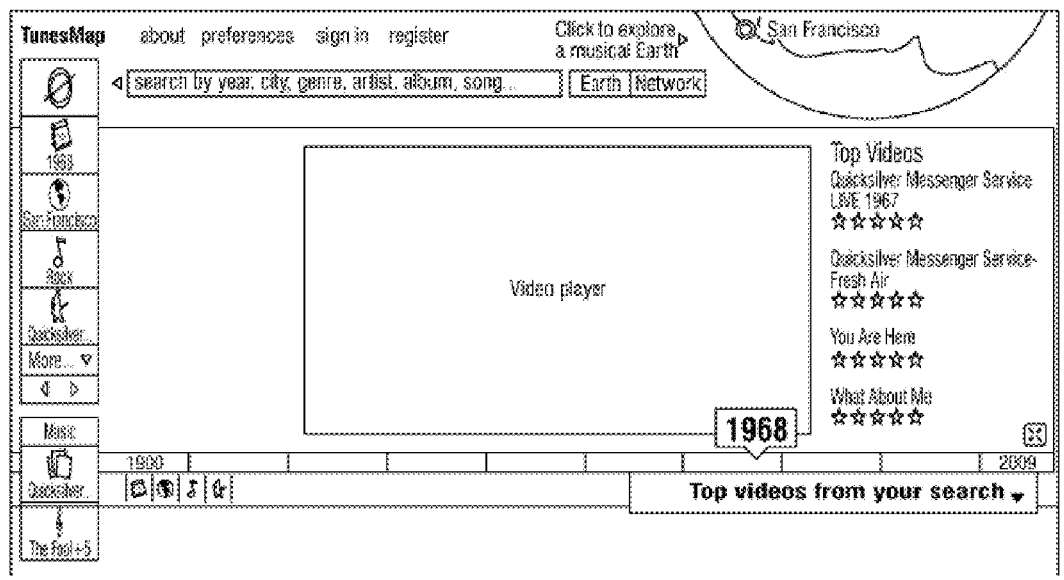

FIG. 8C depicts the following functionality:

1. Expanded media player. The expanded media player provides transport controls and additional details about the currently playing track.

2. Track purchase dialog box. Clicking the "Buy" button triggers the appearance of this dialog box which provides options to purchase the song from iTunes, Amazon.com, or Rhapsody. The user can also listen to the song or expand the dialog further to reveal other types of related products that can be browsed in a cover flow style carousel.

3. Playlist menu. Allows the user to select other playlists relevant to their search, including a video playlist that replaces the Mural with a video player.

Figure 8D:
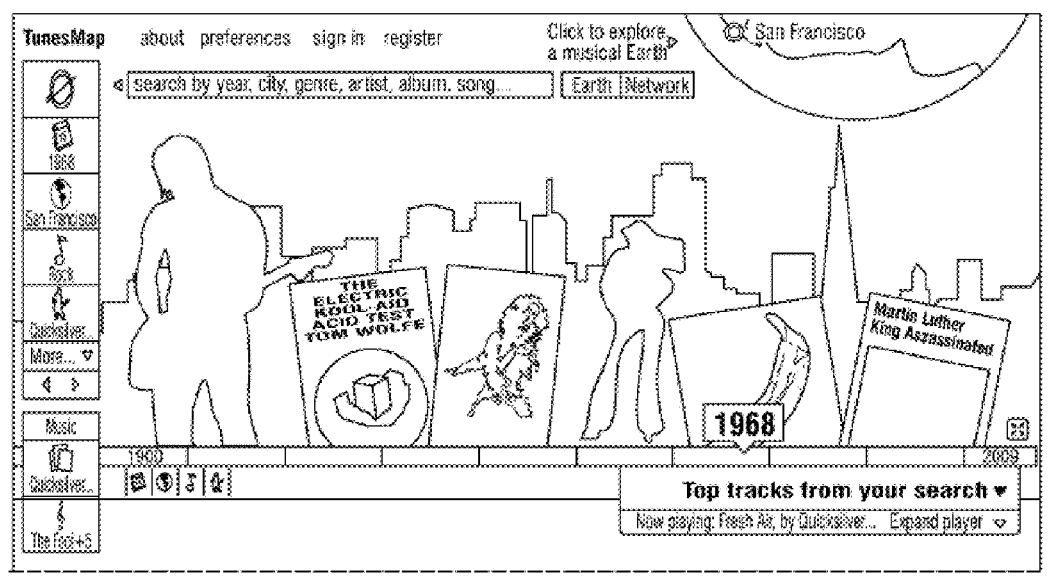
Figure 8D:
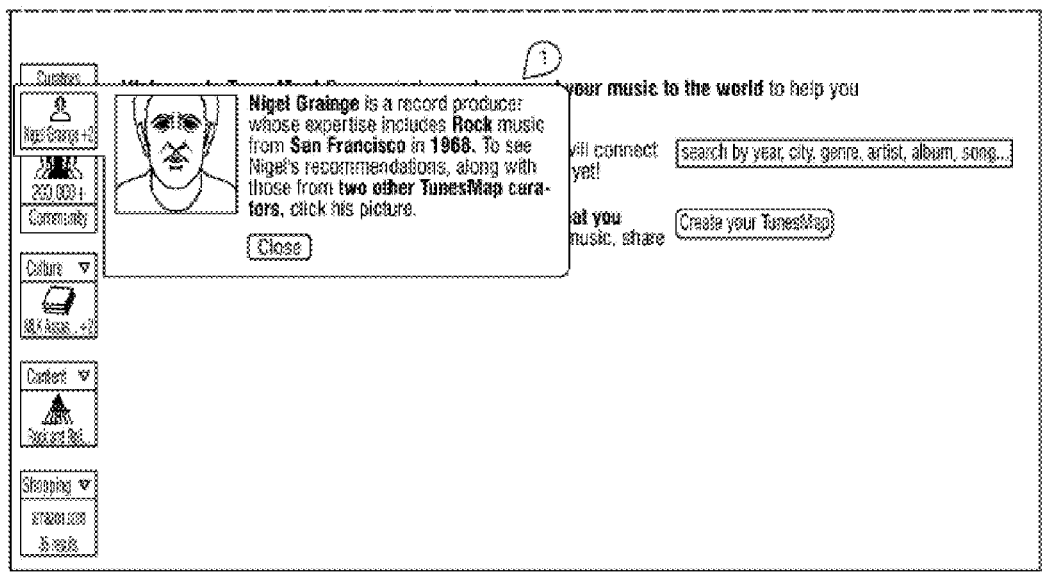

FIG. 8D depicts the following functionality:

1. Curator promotion. Whenever a user search returns a Map curator that has not been previously promoted, a pop-up promotion appears which introduces the user to the curator. Clicking on the curator photo or icon replaces the promotion with the full Curator widget and its results.

Figure 8E:
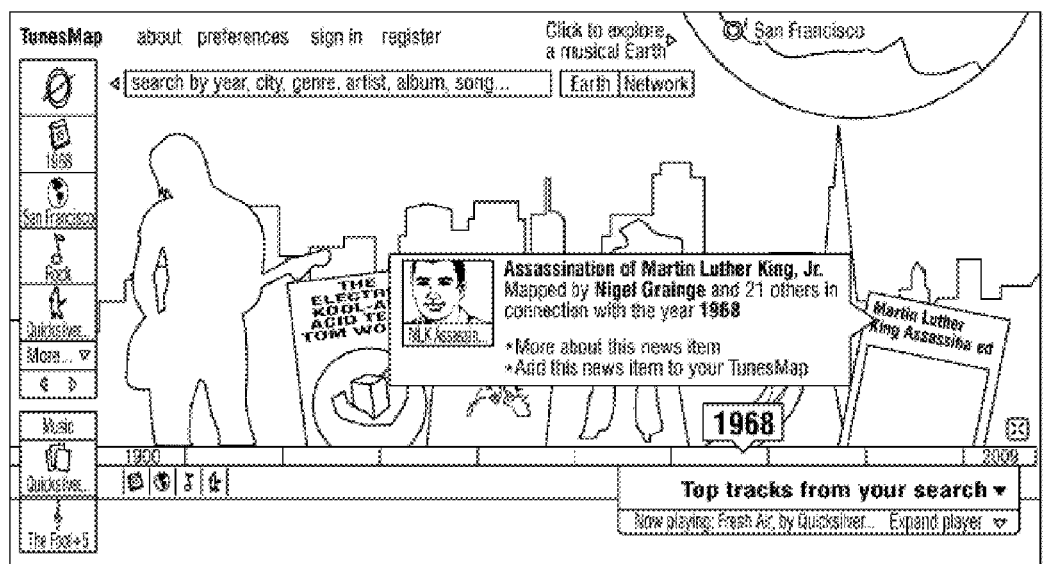
Figure 8E:
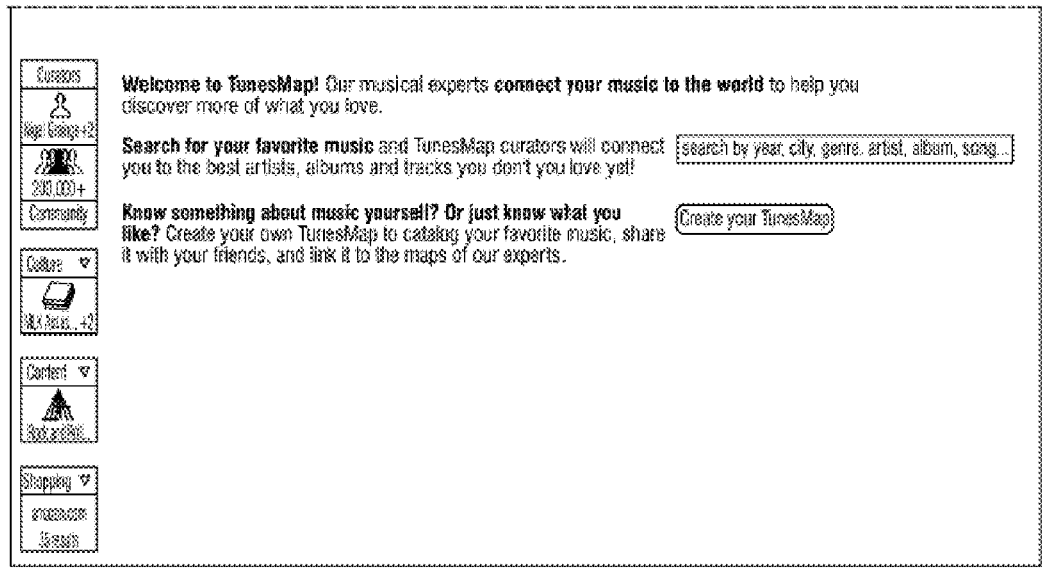

FIG. 8E depicts the following functionality:

1. Mural rollover. When the user rolls over an image in the Mural, a pop-up box appears offering further details, a link to the dedicated page for the item, and the opportunity to add the item to the user's Map.

Figure 8F:
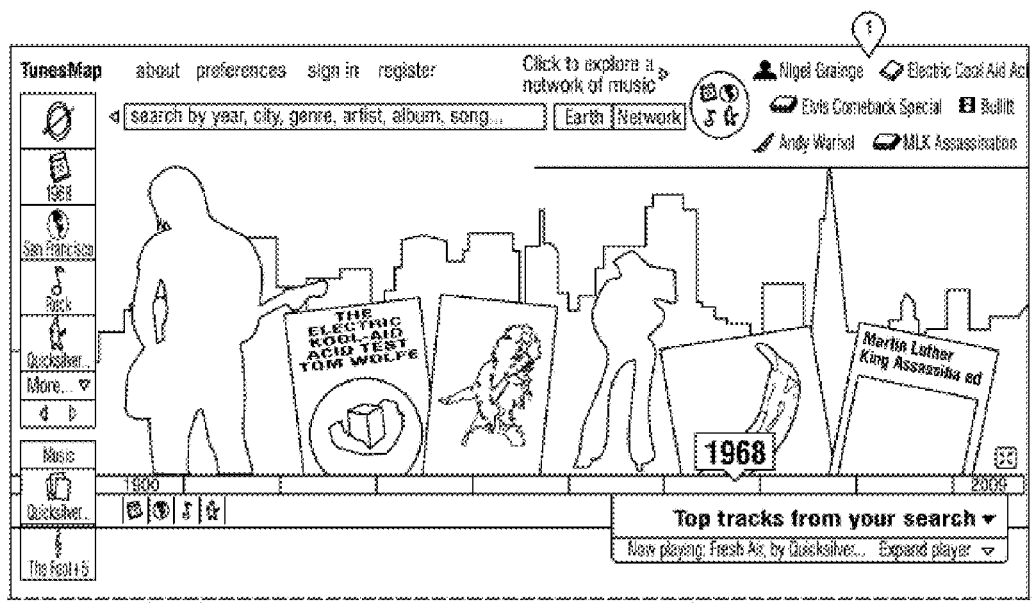
Figure 8F:
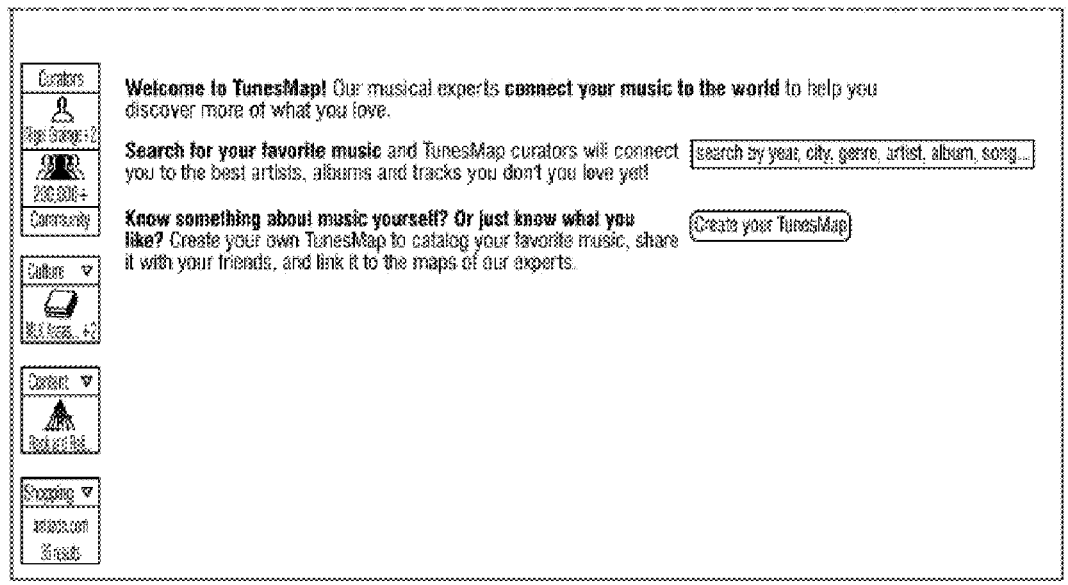

FIG. 8F depicts the following functionality:

1. Mapping module—Network mode. When this module is togged into Network mode, it shows the user's current search in icon form, with a multilayered ticker of related elements, including Map curators, arrayed to the right. Clicking a specific element takes the user to its dedicated page, clicking elsewhere in the module takes the user to the Network View page. Network View Abstraction The invention presents two kinds of maps to the user. The Earth map 605 is shown in the Mural 600 of FIGS. 11A-11I described below. The Network map is presented in FIGS. 9A-9L. This novel abstraction functions as an iconic filter construction device. The Network map user interface presents a pallet of available supporting elements 708 and curatorship facilities 709. The user adds elements to the map by drag and drop of icon items from the pallets 708 and 709 onto the mapping area 707. The map has a representation of the user's current filter selections and primary category data items with counts of the number of items satisfying each criterion. Selecting an icon, for example the icon representing the user 708, graphs the relationships 705 between the selected icon and other icons in the network map. A double click on an icon expands it. For example, the songs icon 706 has not been expanded while the Garth Trinidad icon 710 is the result of two expansions; the curator icon 711 was expanded from the Current search, and the Garth Trinidad icon 710 was expanded from the curator expansion 711. The current network map is saved by user selection 701. The map is made available to external Web sites, such as MySpace, Facebook, and Twitter, etc. through an embedded object tag, for example, a JavaScript object or integrated plug-in module, the semantics of which are provided to the user by selecting 702. Thus, an embodiment of the invention includes a social networking aspect as it relates to the user and their ability to share their music culture through Facebook, Twitter, or any other social networking sites.

Figure 9A:
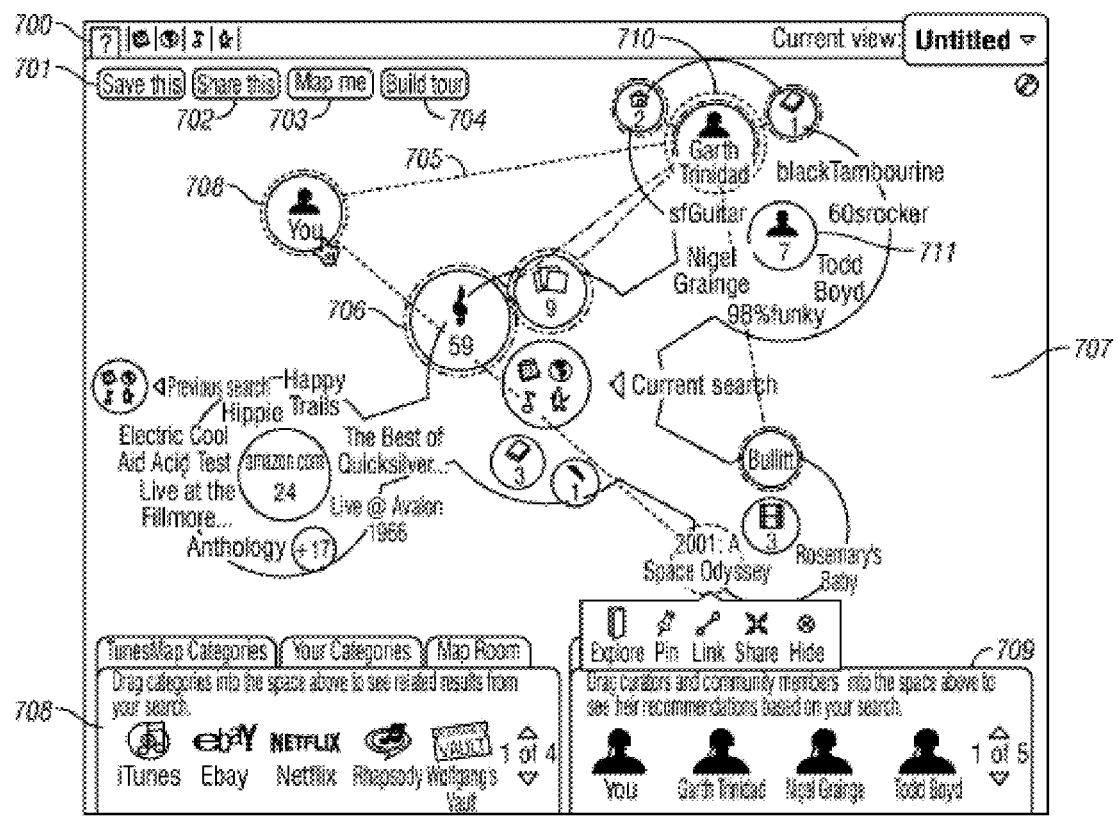
FIGS. 9A-9L illustrate a network relationships view of the primary representations of music, and its history, culture, and related items in the unique and personal perspective of a user according to the invention.
Figure 9B:
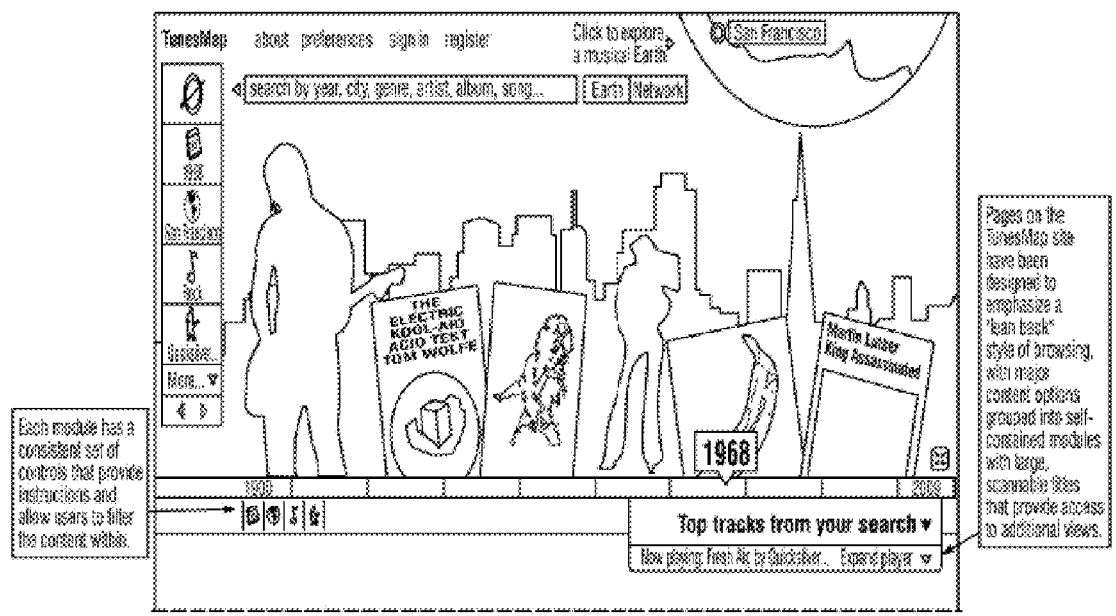
Figure 9B:
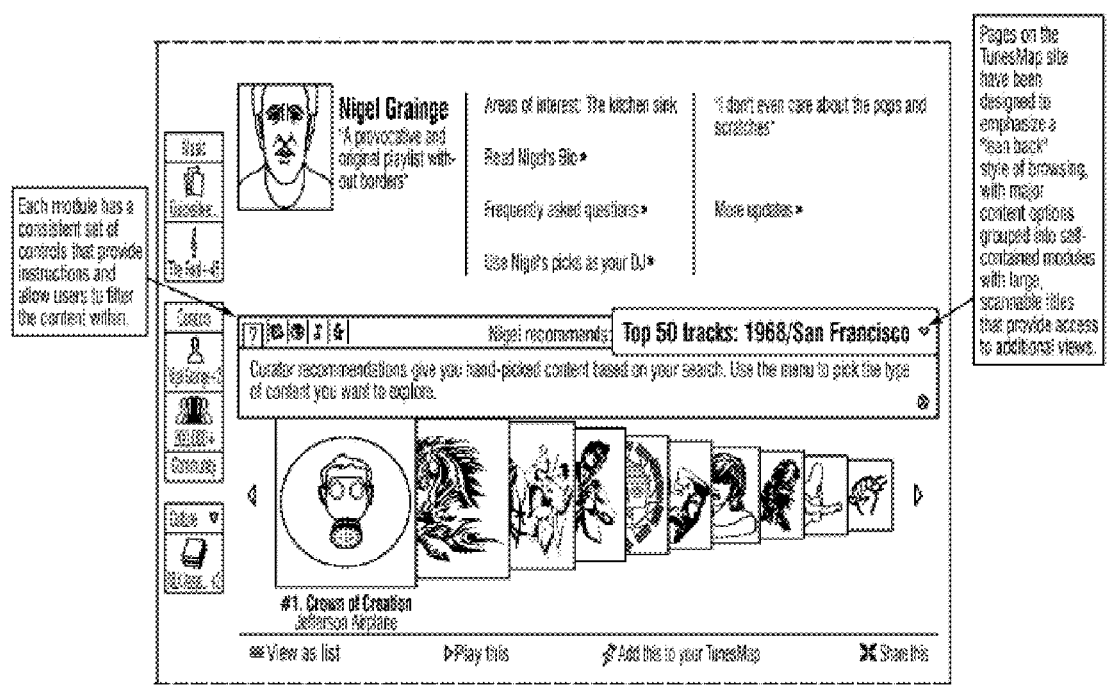
Figure 9B:
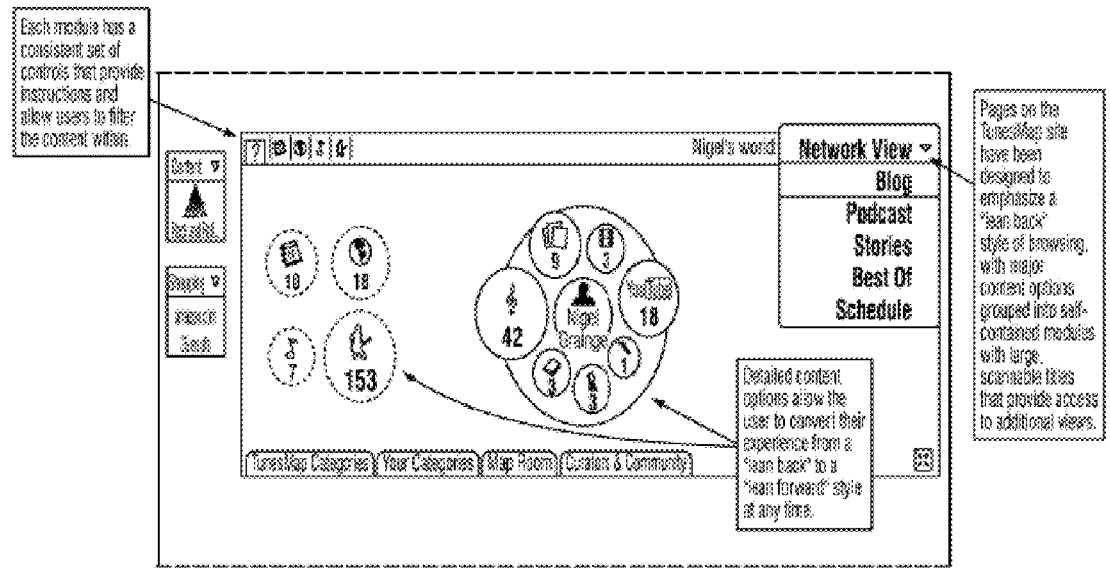
Figure 9B:
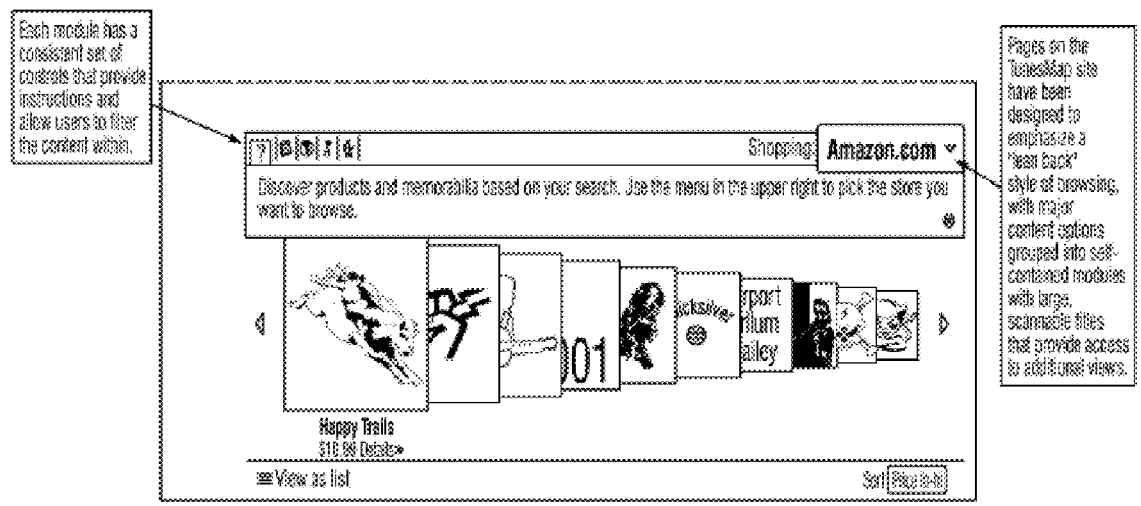
Figure 9C:
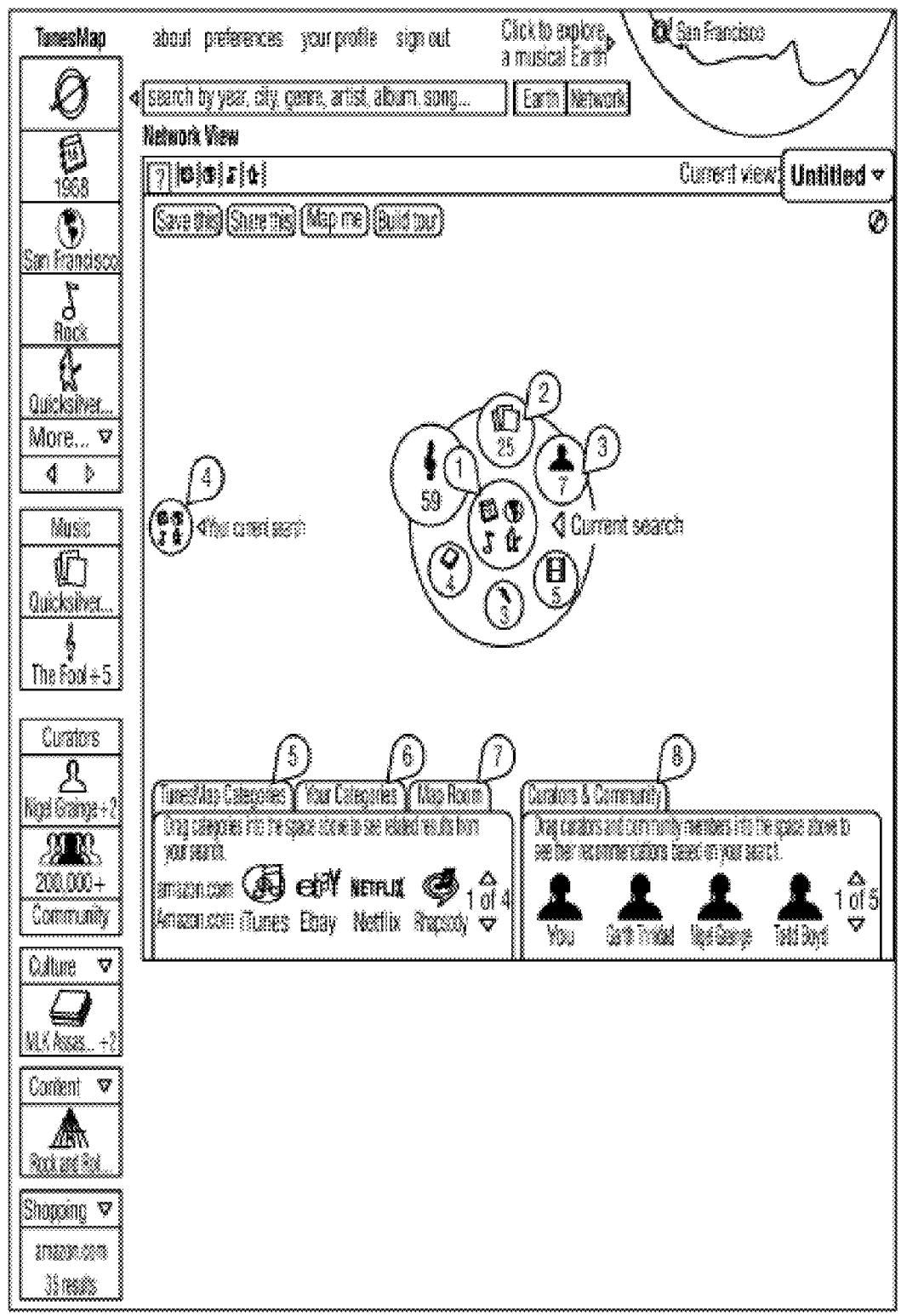

The Network View page presents the user with an interactive diagram of connections between elements in the Map database (see FIG. 9C).

1. Central focus. The diagram is always centered on a specific item; in this case, a cluster of icons representing the user's current search. The large circle behind the central item indicates relationships between the items it touches and the central focus. Double-clicking any item in the diagram makes that item the new central focus.

2. Category cluster. Because even links to a single element within the Map database quickly become too complex to be displayed all at once, category clusters are used to simplify the diagram by grouping related results. For example, this "Albums" cluster indicates that there are nine albums related to the user's current search. The more results a cluster contains, the larger it gets.

3. People cluster. Because Map curators and community members can create their own networks of linked items, their results appear as a special category of cluster with a different look.

4. Previous search. Users can step back through their search history by clicking here; doing so causes that search to move to the center and the category results to update accordingly.

5. Map categories. This tab is a repository of all the default Map categories which can be dragged into the Network View. Most of these correspond to icons in the filter bar.

6. Your categories. This tab contains custom categories specific to a particular user. With this feature, a user can organize their Map however they wish, by creating a category like "Stuff I need to listen to," dragging it to the browser, and adding specific items into it.

7. Map room. This tab contains map views which the user has stored using the "Save this" command above.

8. Curators and community. This tab contains recommended curators and community members relevant to the user's current search. Each can be dragged into the Network View. Note the first community member is "You"—this enables the user to add items in the view to their own Map.

9. Save this. Allows the user to save the current map view to their Map Room for later retrieval.

10. Share this. Allows the user to send the map to a friend.

Figure 9D:
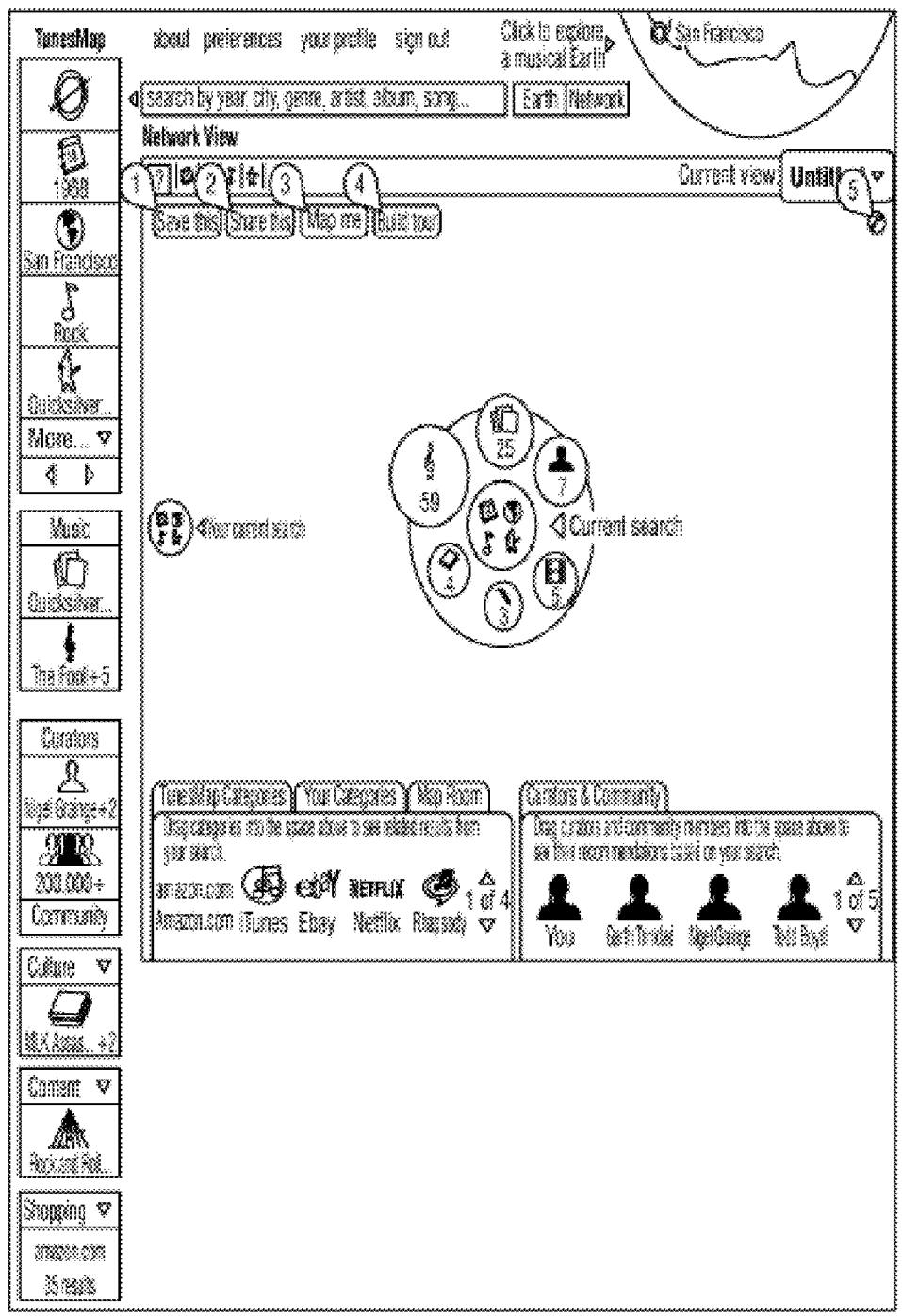

FIG. 9D depicts the following functionality:

1. Save this. Allows the user to save the current map view to their Map Room for later retrieval.

2. Share this. Allows the user to send the map to a friend. The friend does not have to be a Map user.

3. Map me. Shows the contents of the current view plotted on a map.

4. Build tour. Allows the user to construct a linear sequence of nodes as a tour which other users can play.

5. Key. Superimposes text labels that identify all icons in the diagram.

Figure 9E:
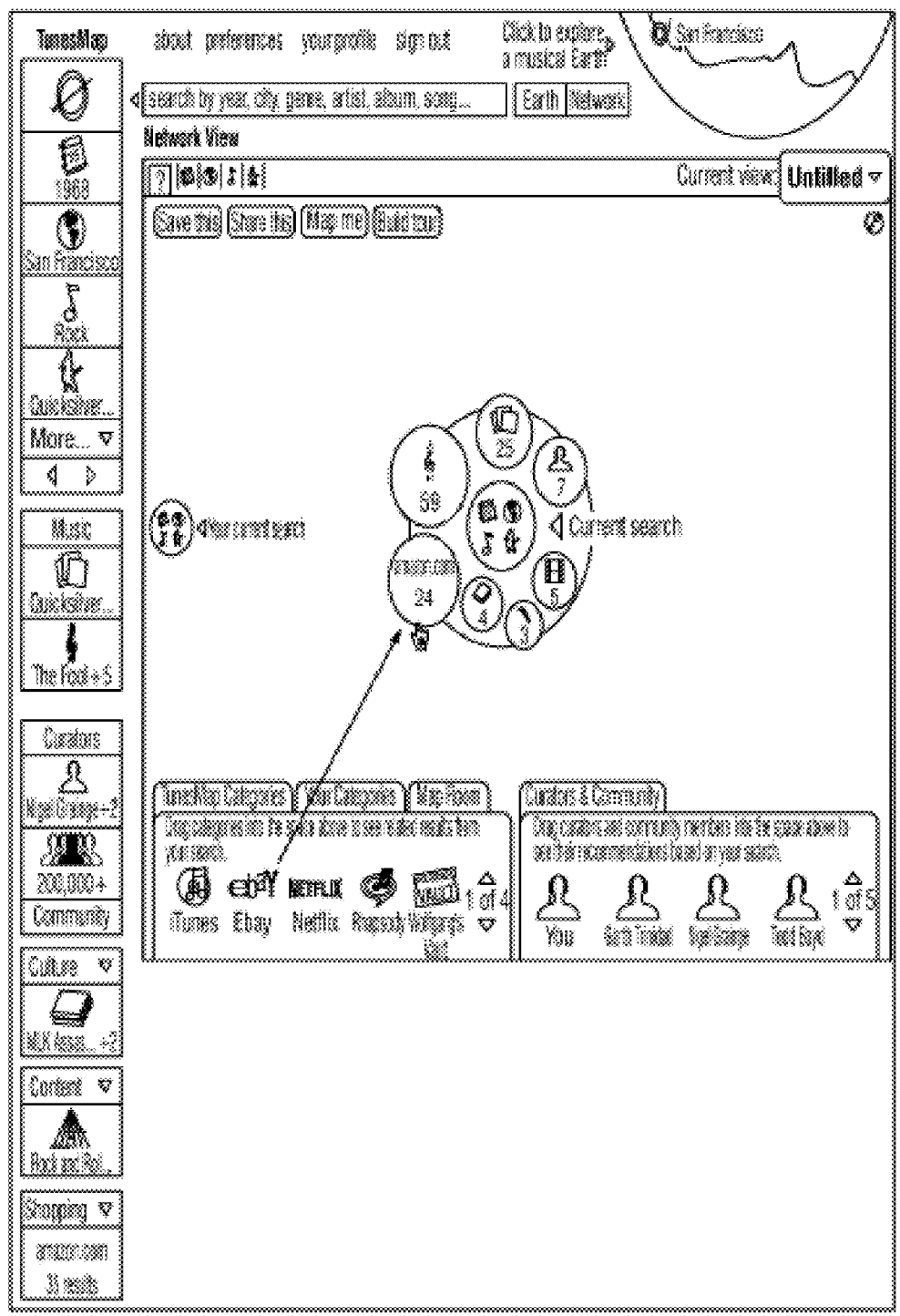

In FIG. 9E, the user is curious about Amazon.com products related to a current search, and so has dragged the Amazon.com icon out of the Map Categories tab and released it in the Network View, creating a new category cluster displaying results from the search.

Figure 9F:
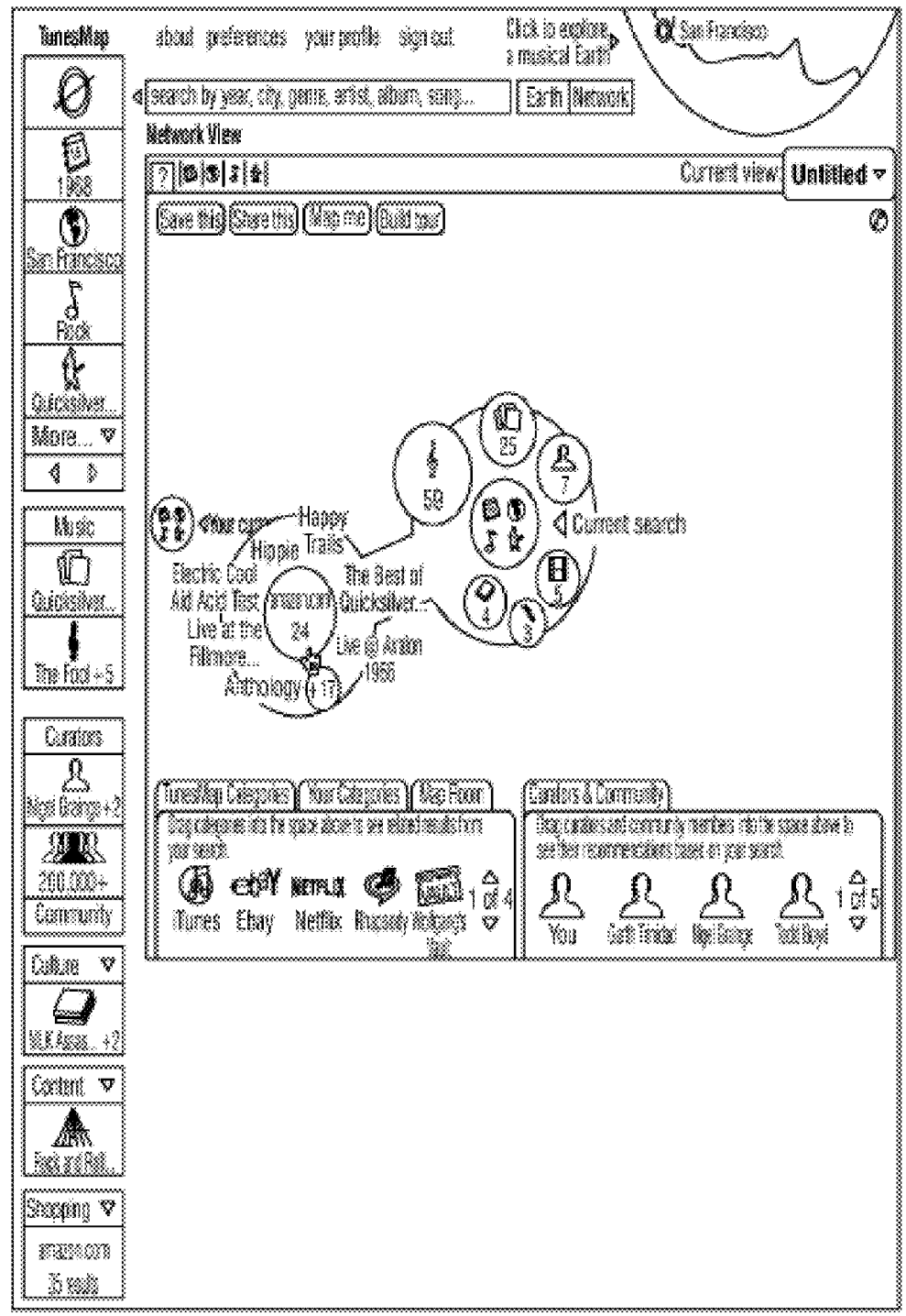

As shown in FIG. 9F, by clicking on the Amazon.com category cluster, the user has expanded it to reveal its contents: a set of related products available from the retailer. Note how the large background circles are connected to indicate that the items they contain are all related to the central focus (the user's current search). If the user wishes to see the complete set of results, he can click on the "+17" bubble to see the items arranged as a list.

Figure 9G:
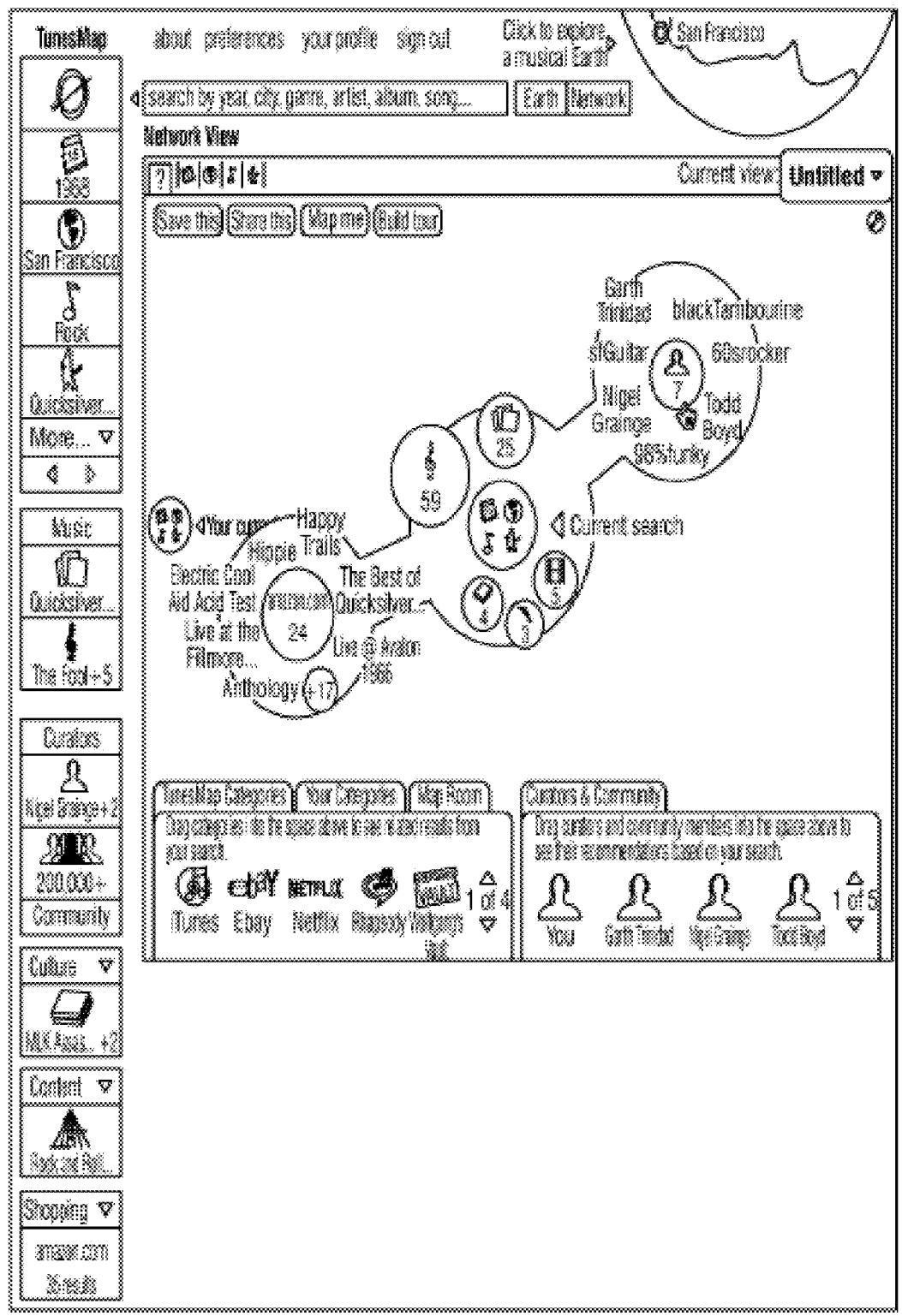
Figure 9H:
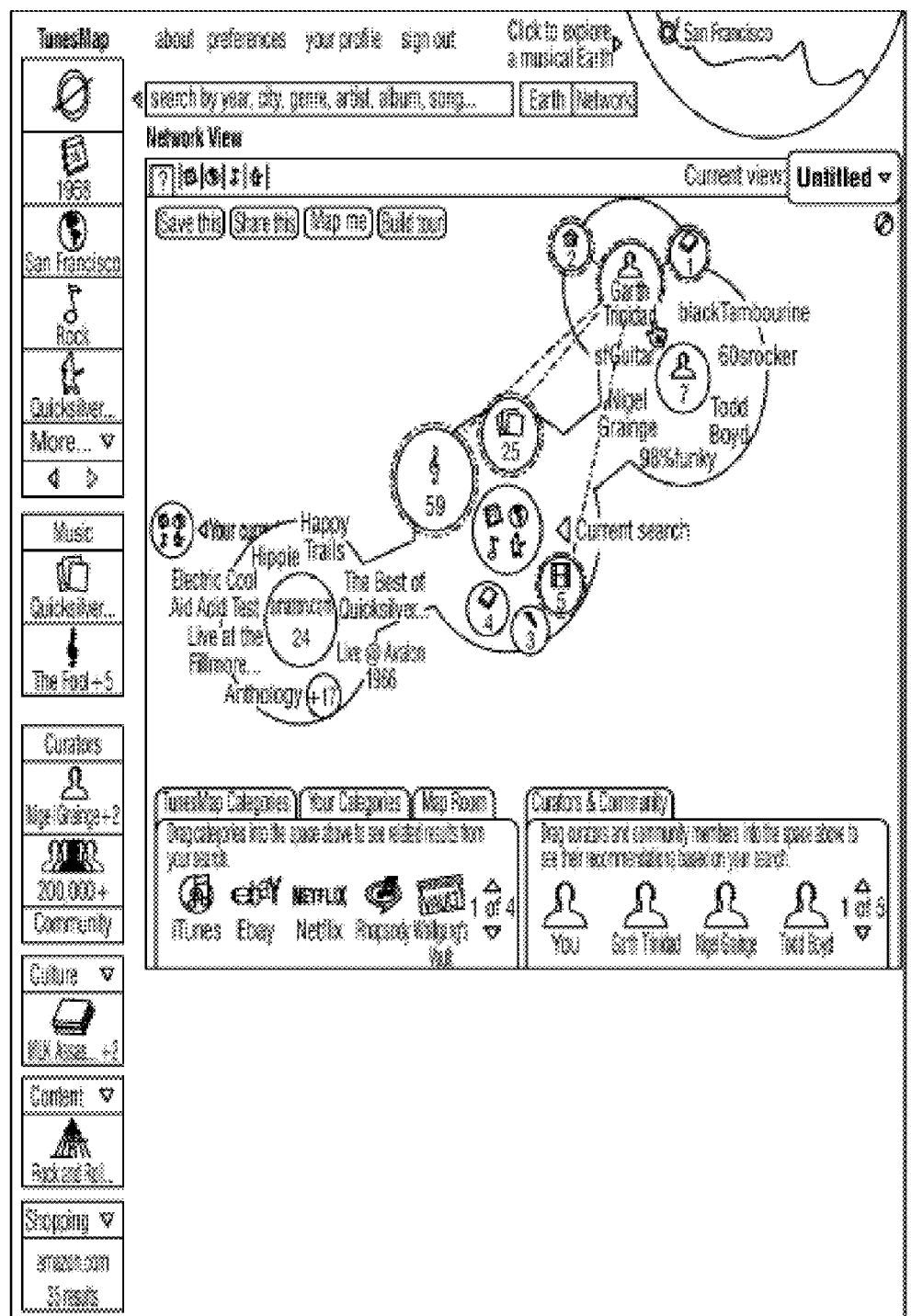

Similarly, the user has clicked on the People cluster to expand it and show curators and community members related to the current search (see FIG. 9G).

Curious about the preferences of a particular curator, the user clicks on his icon to show any of the curator's links that are relevant to the current search. Lines appear connecting the curator to related category clusters (see FIG. 9H).

Figure 9I:
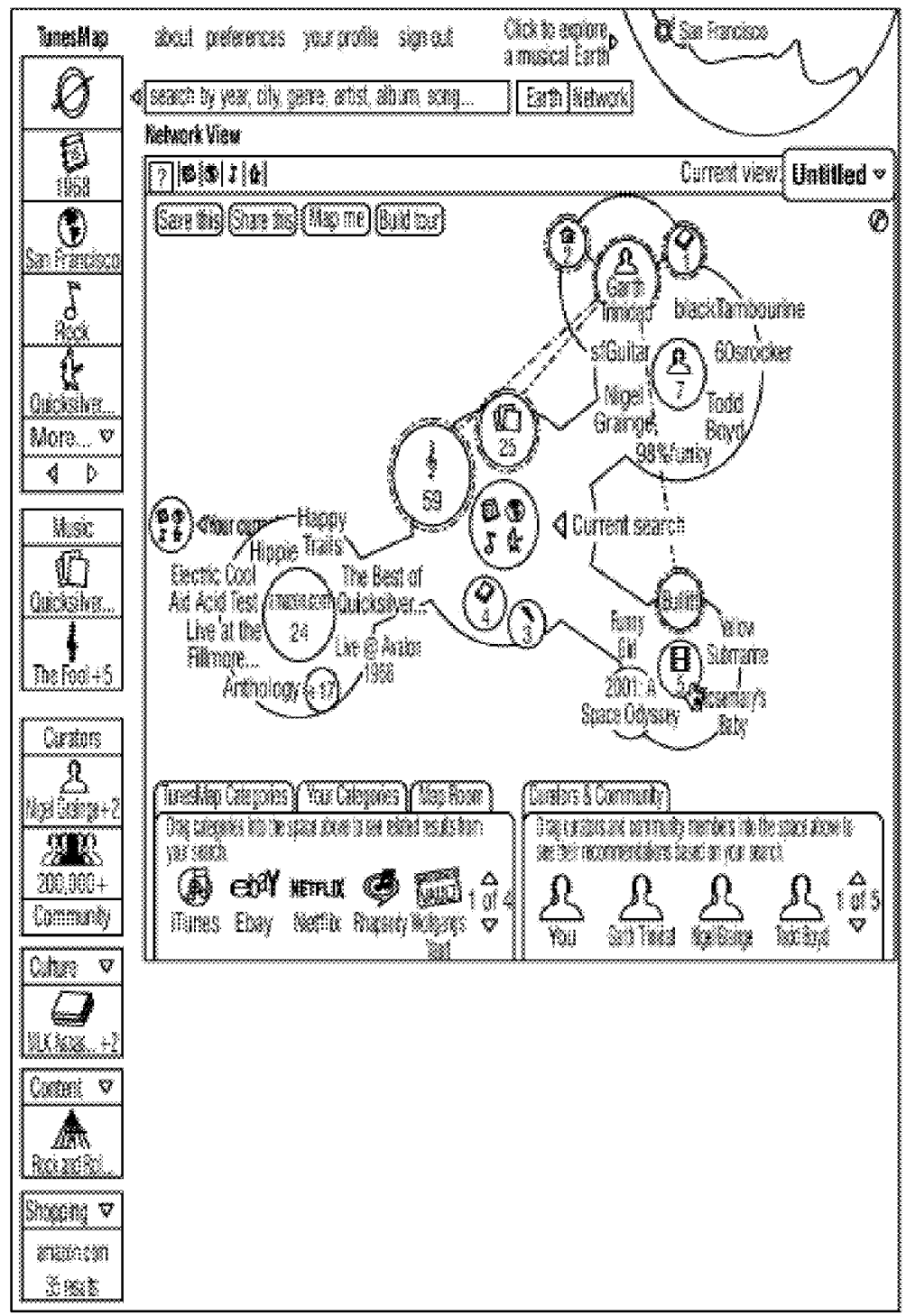
Figure 9J:
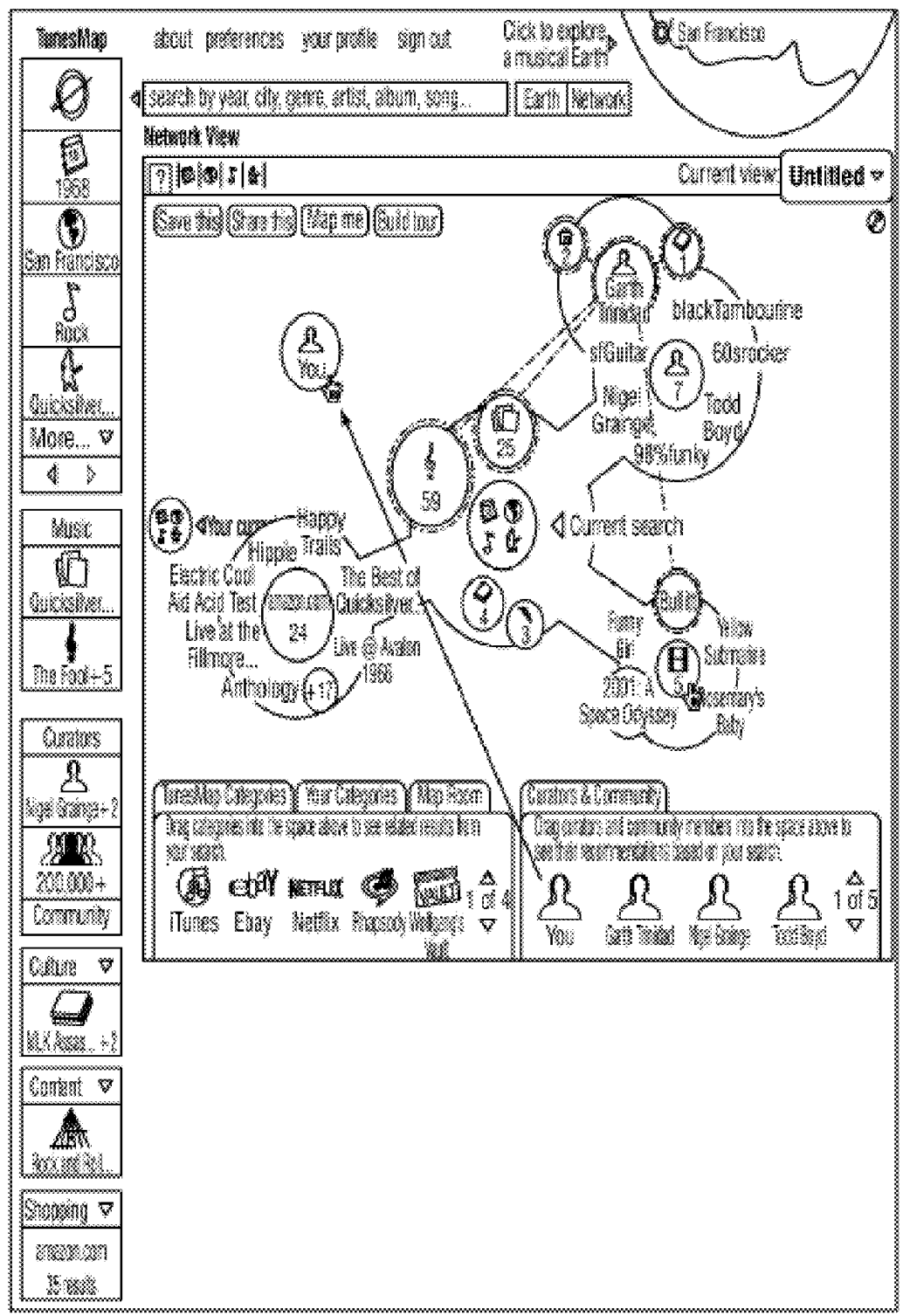
Figure 9K:
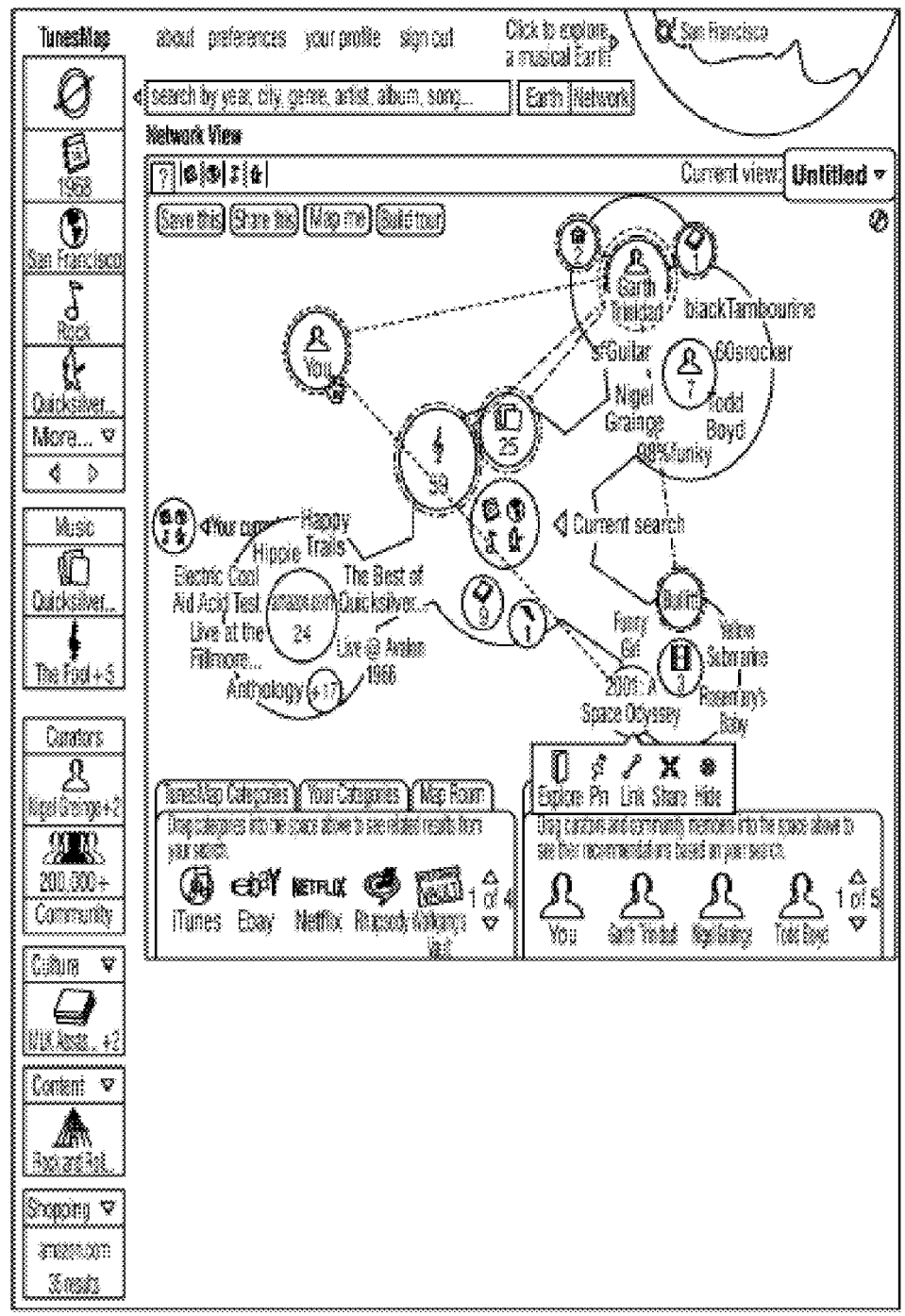

In FIG. 9I, the user has clicked on the Film and TV icon to expand it and reveal which of the three movies the curator has a special affinity for.

Now, the user is ready to make some additions to their own Map. To get started, he drags the "You" icon out from the Curators and Community tab and drops it in the Network View. Because the user has not yet created any links to any of the visible elements, no connecting lines are drawn (see FIG. 9J).

Making use of the pop-up options that appear when he rolls over an item, the user selects the "Link" option, clicking and dragging from the item back to the "You" icon to establish a link—and adding that item to his Map. The user thinks that Garth has good taste, so he adds him to his map, as well as one of his favorite films (see FIG. 9K).

The user wants to explore Garth's map further, so he double-clicks on Garth's icon to make him the central focus. Because the Network View is now no longer being filtered by the current search, the number of results shown expands greatly. From here, the user can expand specific categories at will, or return to the current search as the central focus by clicking the "Your current search" item on the left.

Figure 9L:
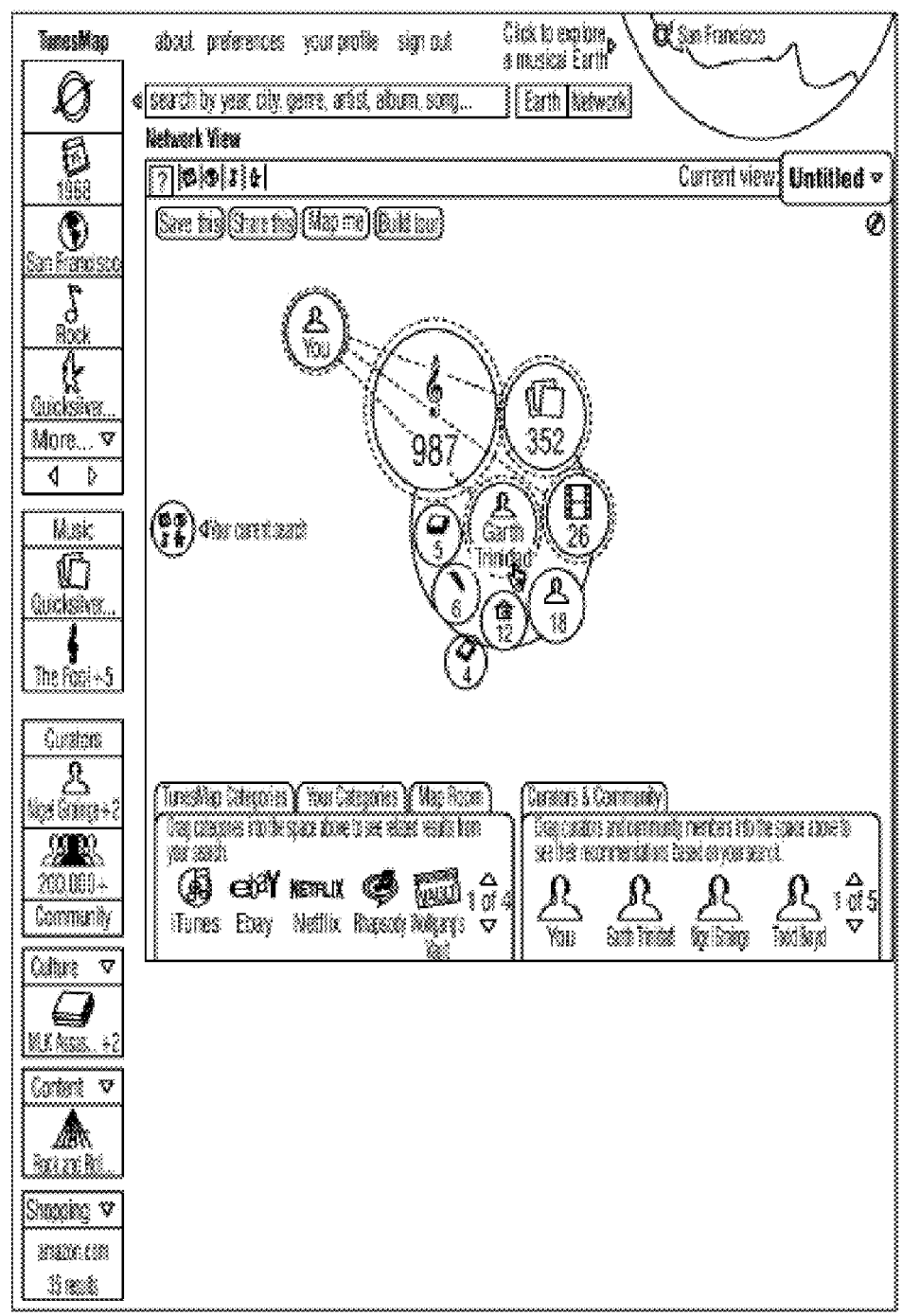

In this way, the user can explore the Maps of others while also constructing is own (see FIG. 9L).

Curator Abstraction

Figure 10A:
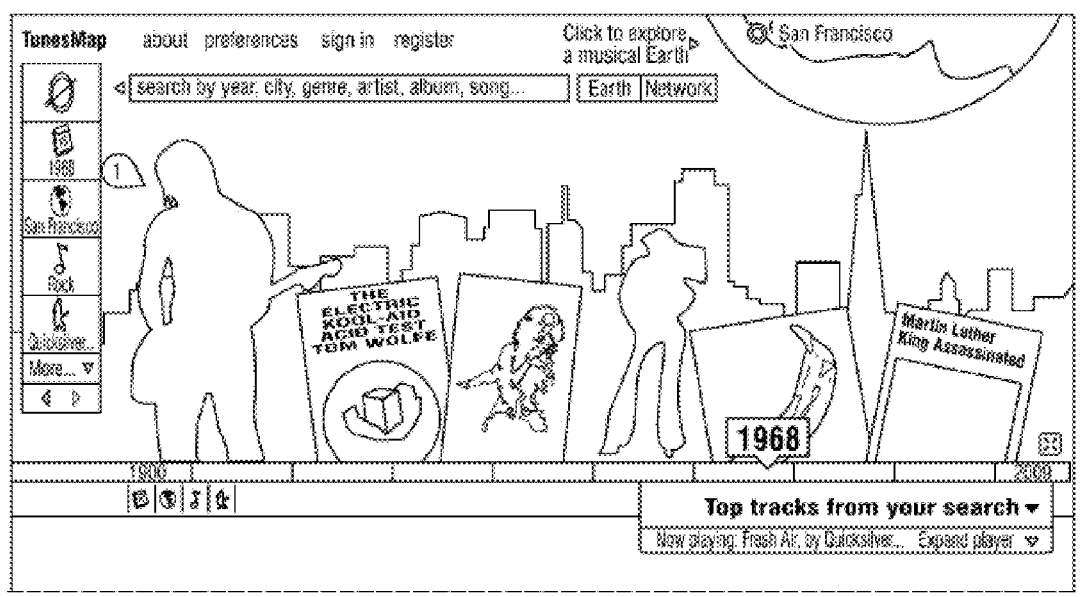
Figure 10A:
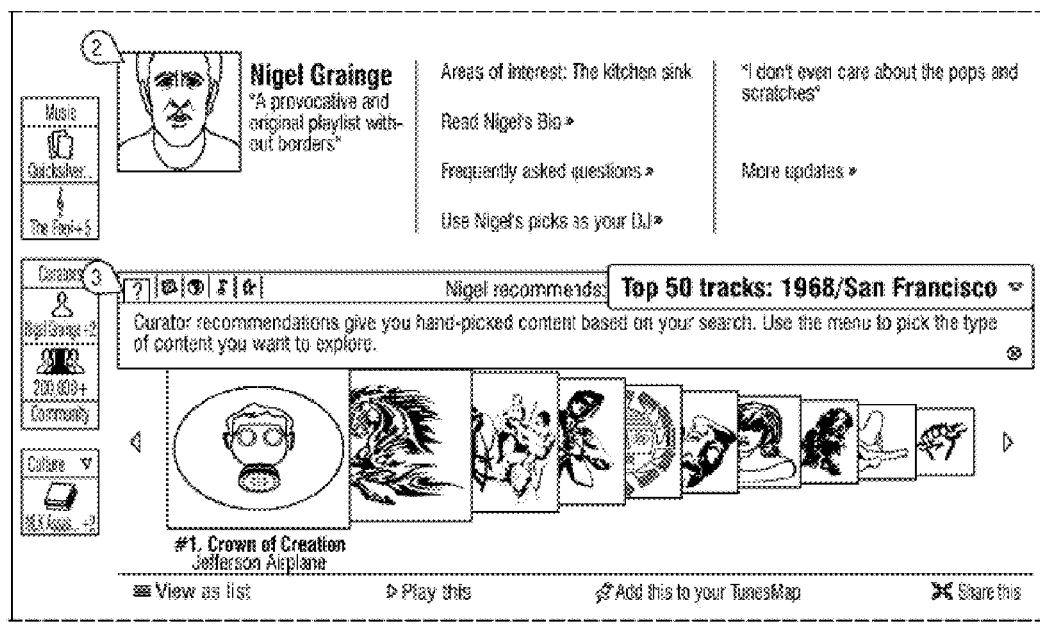
Figure 10A:
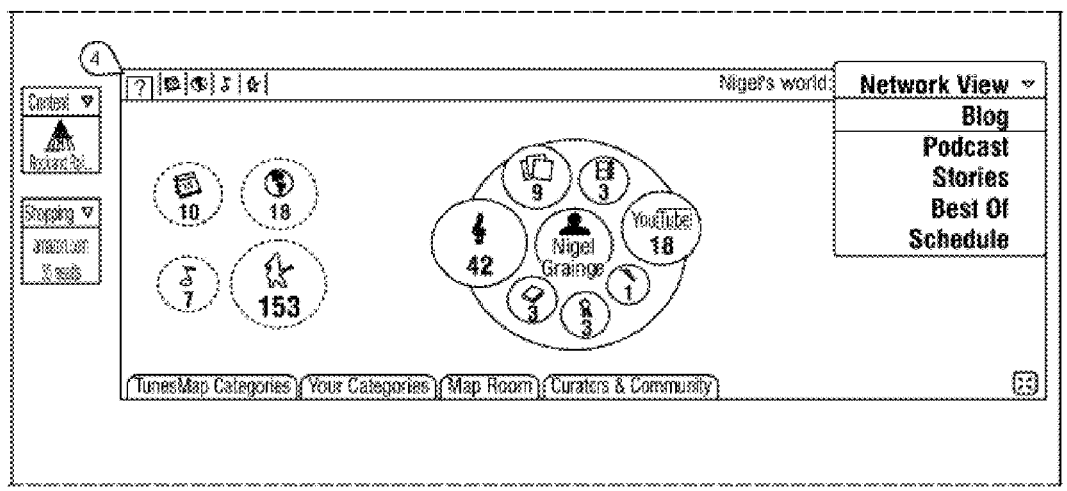
Figure 10A:
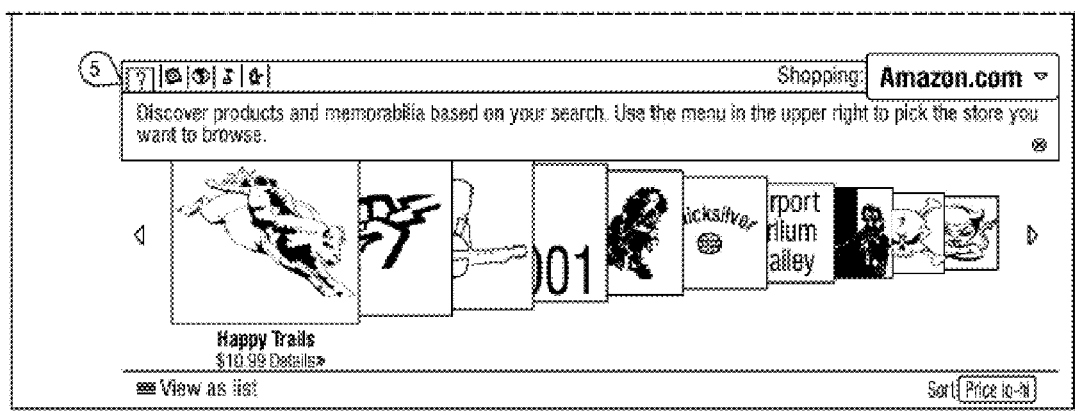

FIG. 10A depicts the following functionality:

1. Mini Mural. This compact version of the collage seen on the home page continues to update with images inspired by the user's current search. The search status and music player elements appear here as well.

2. Curator info. This comprises top-line information about the curator, including links to bio, manifesto, and an FAQ.

3. Curator's recommendations—Playlist carousel. Features a selection of curator-selected playlists related to the user's current search. A question mark icon toggles the display of help content for this module, and search status icons show which elements of the user's search have been used to generate the content shown. By clicking on the pull-down menu in the upper right, the user can change the content displayed to various music and video playlists, blog, podcast, and other curator-recommended content. The list is initially displayed in a carousel that shows items receding in space, but can be toggled to display as a standard text list as well. Most lists can be played in the Mural music player, added to the user's own Map, or shared using social networking services.

4. Curator's world—Network View. This interactive diagram shows content from Nigel's Map, i.e. songs, albums, bands, genres, news, art, literature, fashion, movies, etc.,) which is relevant to the user's current search. Specific elements can be explored, saved to the user's own Map, or shared with friends. By clicking on the pull-down menu in the upper right, the user can access other facets of the curator's world, including blog posts, podcasts, and a schedule of events.

5. Shopping. Similar in format to the Playlist module, this area shows products related to the user's current search. It can be viewed as a standard list and sorted by various criteria. Clicking the pull-down menu in the upper right allows access to the various vendors offering products through the system. Rolling over an item shows its details as well as an off-site link to purchase.

Figure 10B:
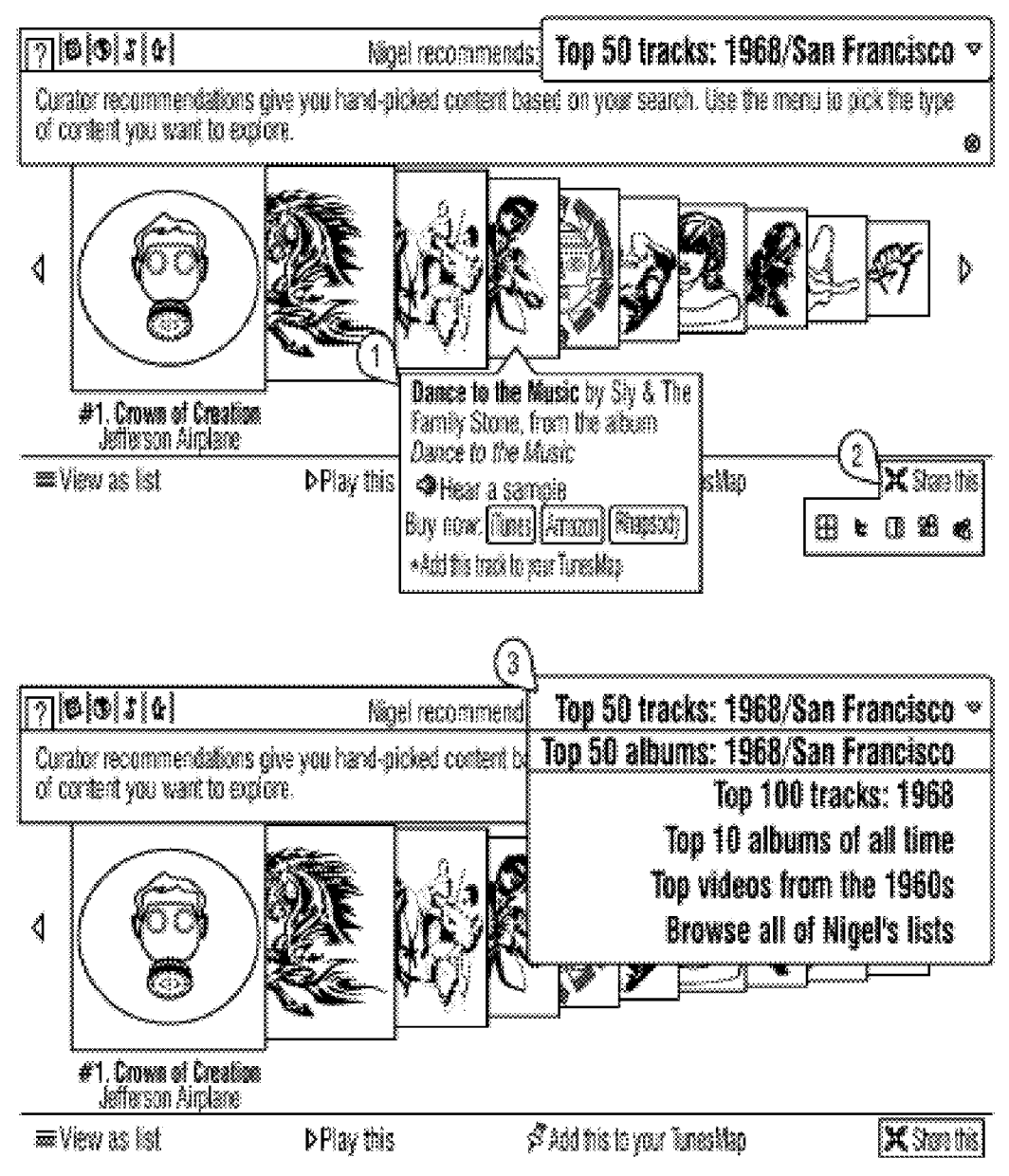

Additional options for the Curator recommendations module (#3 on the Curator page) are shown in FIG. 10B as follows:

1. Track rollover. Rolling over a track entry displays this box, with which the user can listen to a sample of the song, add it to his own Map, buy it, or visit the page for the album.

2. Share this. Clicking on this link brings up a pop-up collection of social networking services through which the user can publish a link to the current curator playlist.

3. Playlist selection. This pull-down menu contains a selection of curator playlists relevant to the user's current search.

Note that the Search status icons currently show only Time and Location being used to generate these results; this is adjusted dynamically based upon the number of available matches.

Figure 10C:
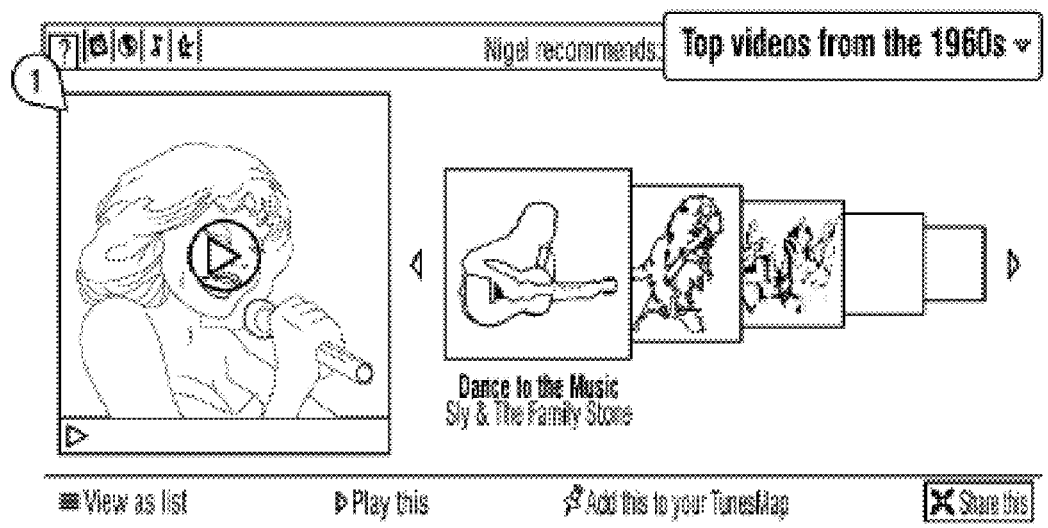

Additional options for the Curator recommendations module (#3 on the Curator page) are shown on FIG. 10C as follows:

1. Video playlist. Here, the module layout is altered to accommodate a video player. Clicking "Play this" here causes the entire playlist to run in its entirety.

Additional options for the Curator's world module (#4 on the Curator page) are shown on FIG. 10D as follows:

1. Content selection. This pull-down menu contains a selection of Curator-originated content the user can explore at will. Content is filtered according to the current state of the Search status icons.
2. Full screen option. Toggles full-screen display of the Network View on and off.
3. Filter bar categories. Because the contents of this view are filtered by the user's current search, as indicated by the icons for Year, Location, Genre, and Artist in the upper-left corner, these dotted-line categories are shown to give the user a sense of the larger scope of the curator's interests. The user is currently searching on 1968-San Francisco-Rock-Quicksilver Messenger Service, but if he were to remove Quicksilver from that search, he would find that Nigel has a total of 153 artists to recommend that are relevant to 1968-San Francisco-Rock. That is why the number 153 appears within the artist category—to indicate that if the user clicks on that category, the Artist filter is "muted" and those results become available.
4. Blog updates. Shows the most recent blog posts by this curator.

Additional options for the Curator's world module (#4 on the Curator page) are shown on FIG. 10E as follows:

1. Podcast. Shows the complete catalog of podcasts by this curator, including links to listen and subscribe.
2. Best Of. Shows featured and/or popular blog posts by this curator.

Figure 10F:
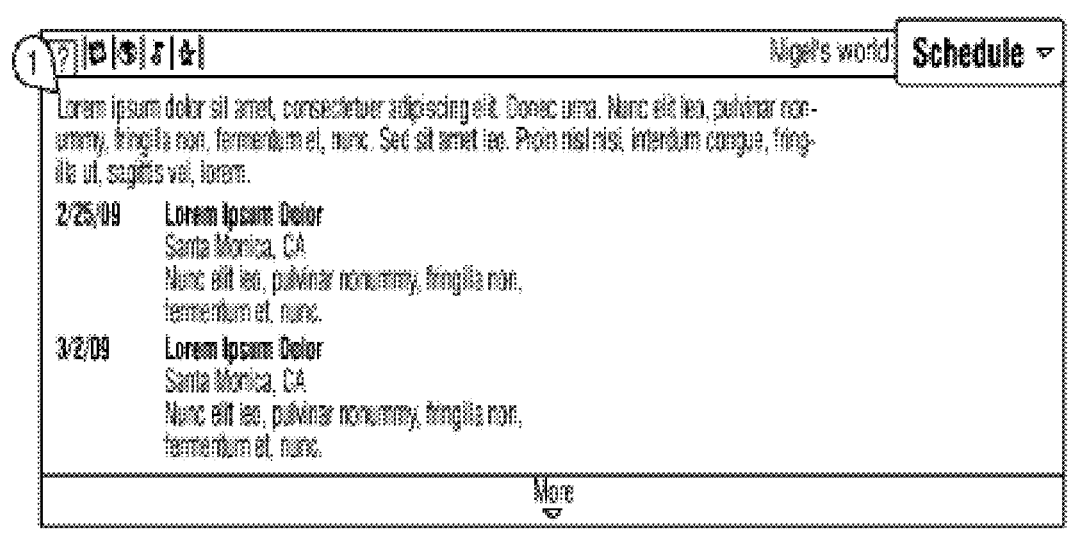

Additional options for the Curator's world module (#4 on the Curator page) are shown on FIG. 10F as follows:

1. Schedule. Shows the curator's upcoming events.

Figure 10G:
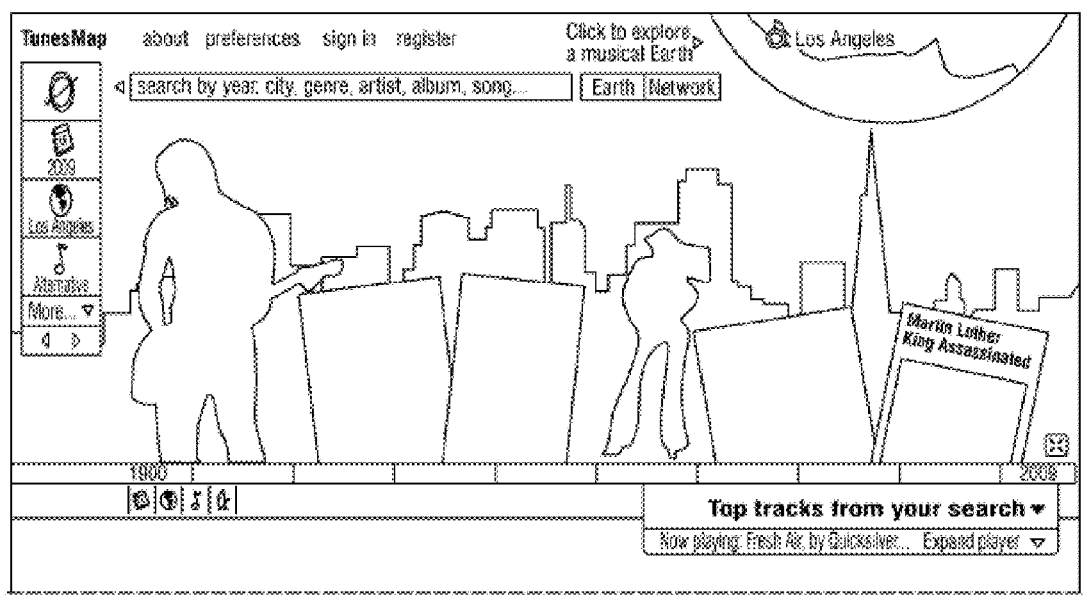
Figure 10G:
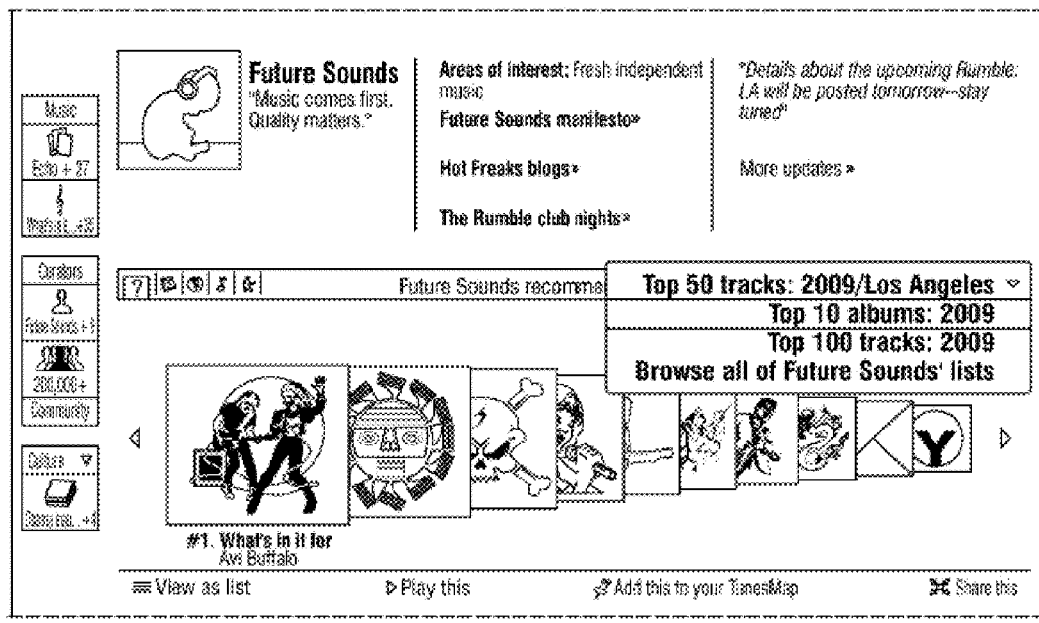
Figure 10G:
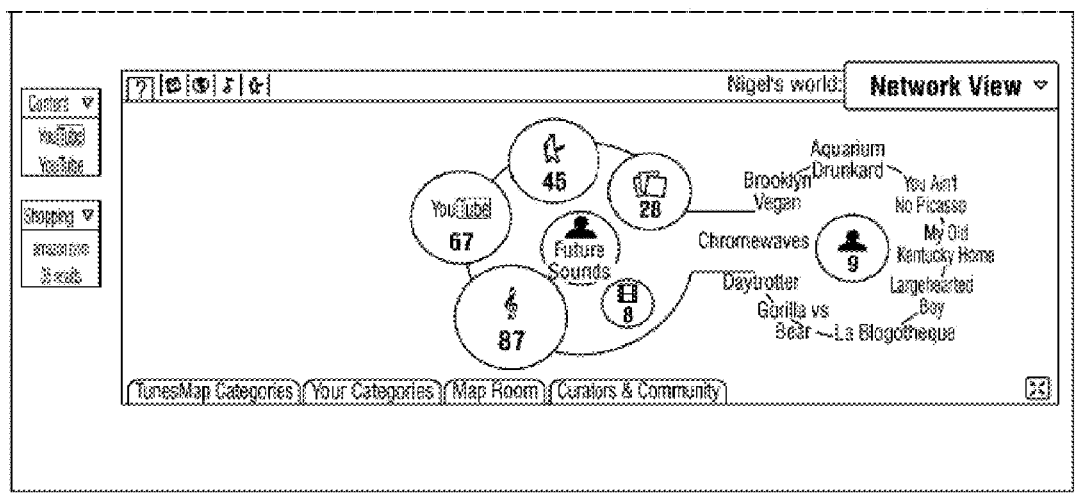

On FIG. 10G, we see a Curator page for the Future Sounds collective of music bloggers, focused on the rising stars of 2009.

Figure 10H:
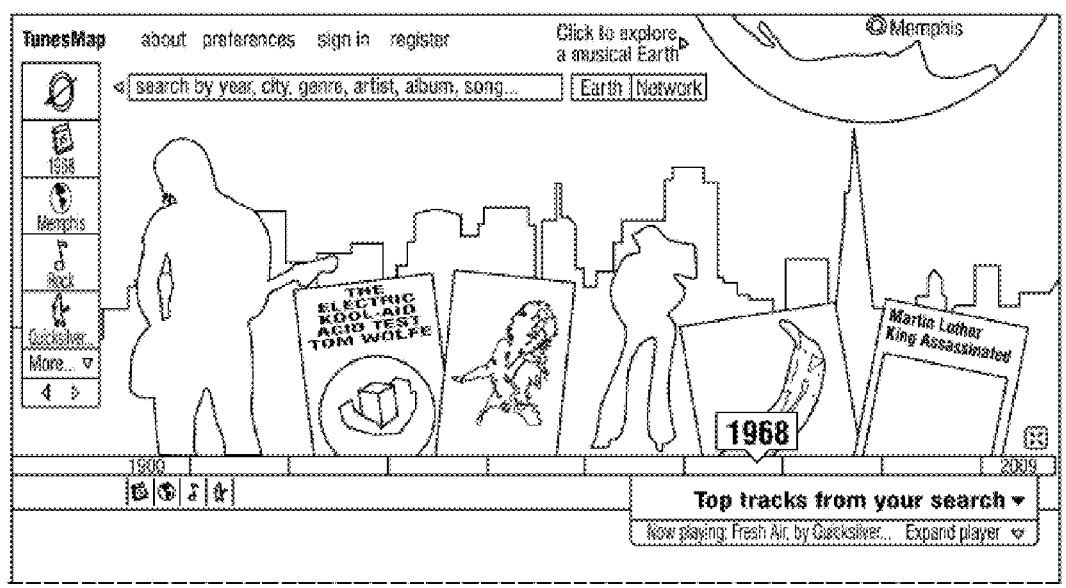
Figure 10H:
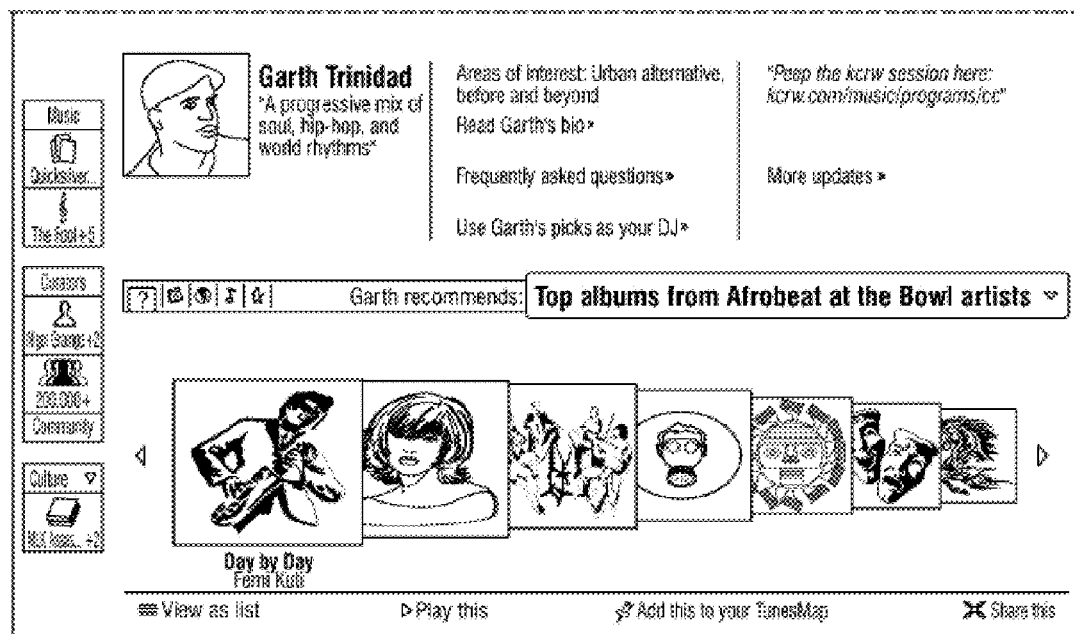
Figure 10H:
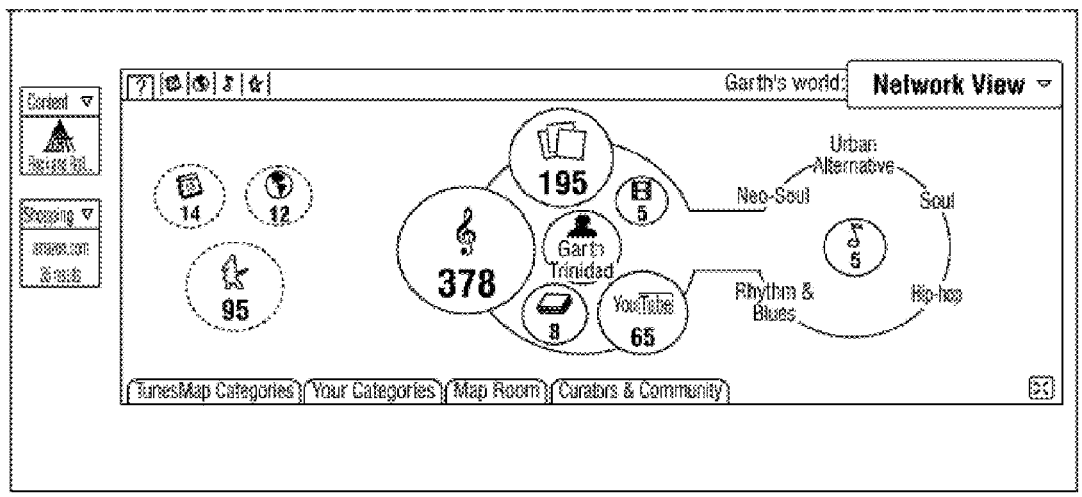

On FIG. 10H, we see a Curator page for KCRW DJ Garth Trinidad, featuring top albums from artists appearing at an upcoming Hollywood Bowl event as well as a Network View that has been expanded to reveal Garth's top genres.

Earth Map Music Overlay

The location element 202 of the fundamental relationship of music 200 from FIG. 4 has a natural representation through standard mapping facilities 802, such as Google Earth, an embodiment of which is depicted in FIGS. 11A-11I. The standard map interface is annotated with music related items of interest 801 according to a selection category 800. The items displayed are subject to the users current filter settings. Selecting an item presents a corresponding representation.

Figure 11A:
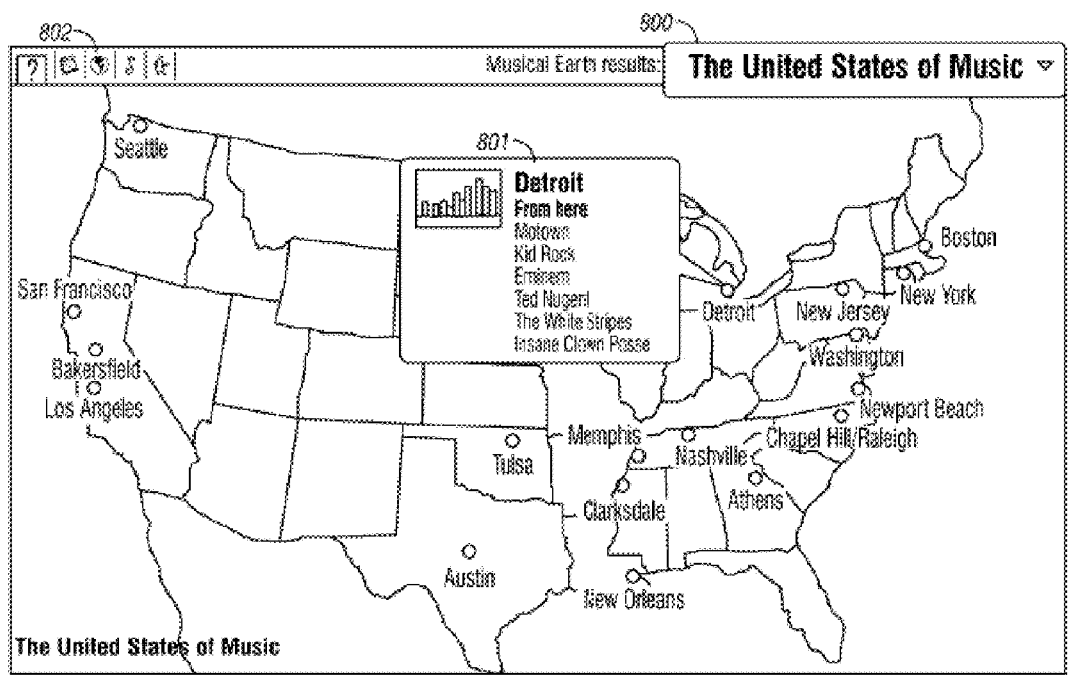
FIG. 11A-11I illustrate a music view of the world, where available interfaces for satellite images of the earth are augmented with specific music related points of interest according to the invention.
Figure 11B:
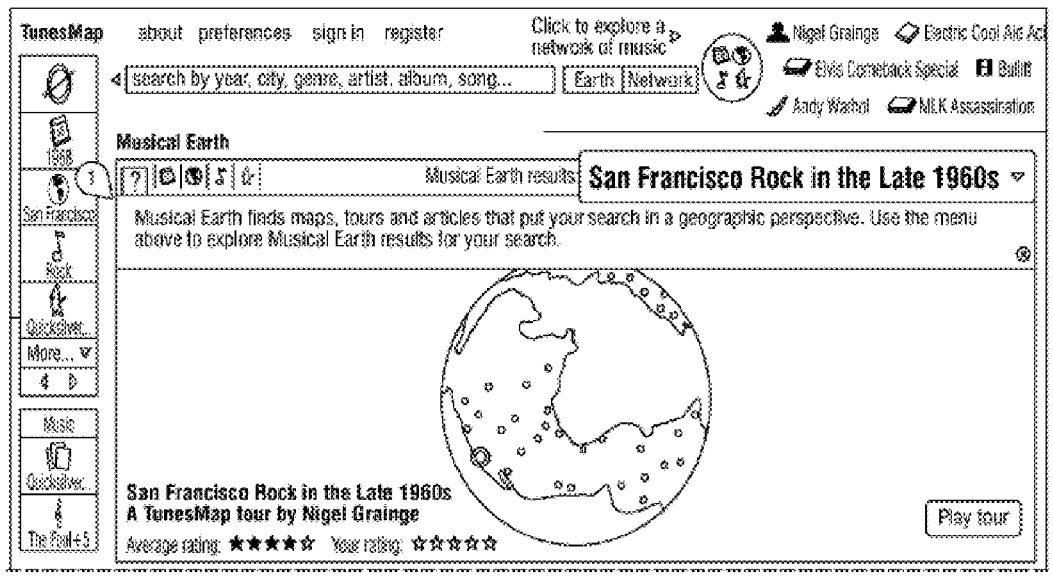
Figure 11B:
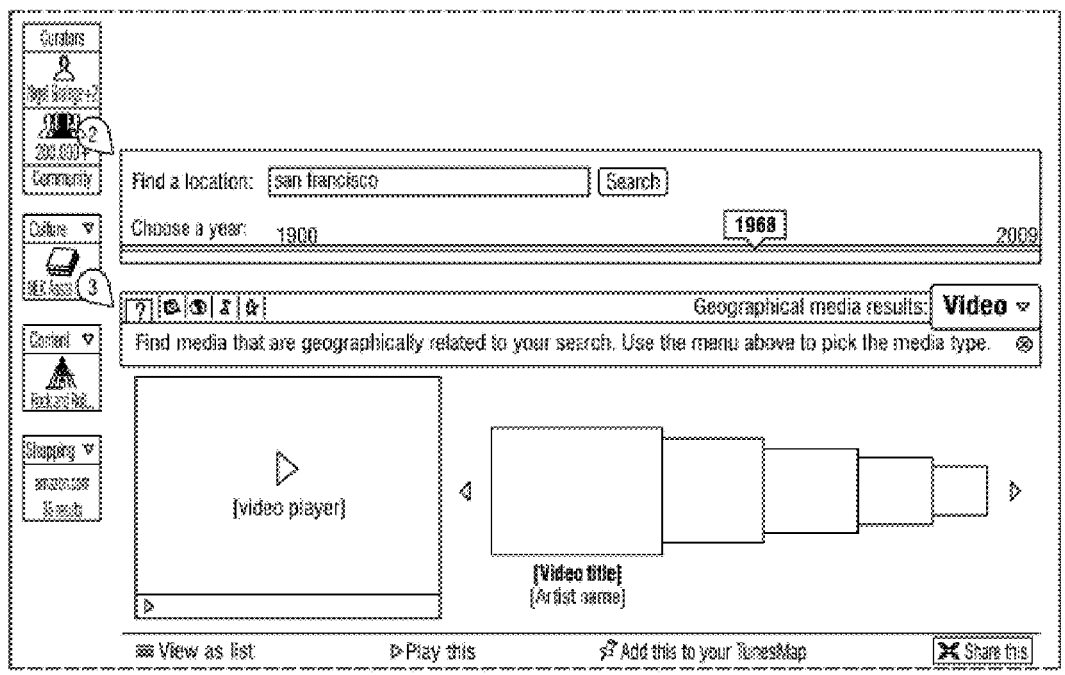
Figure 11B:
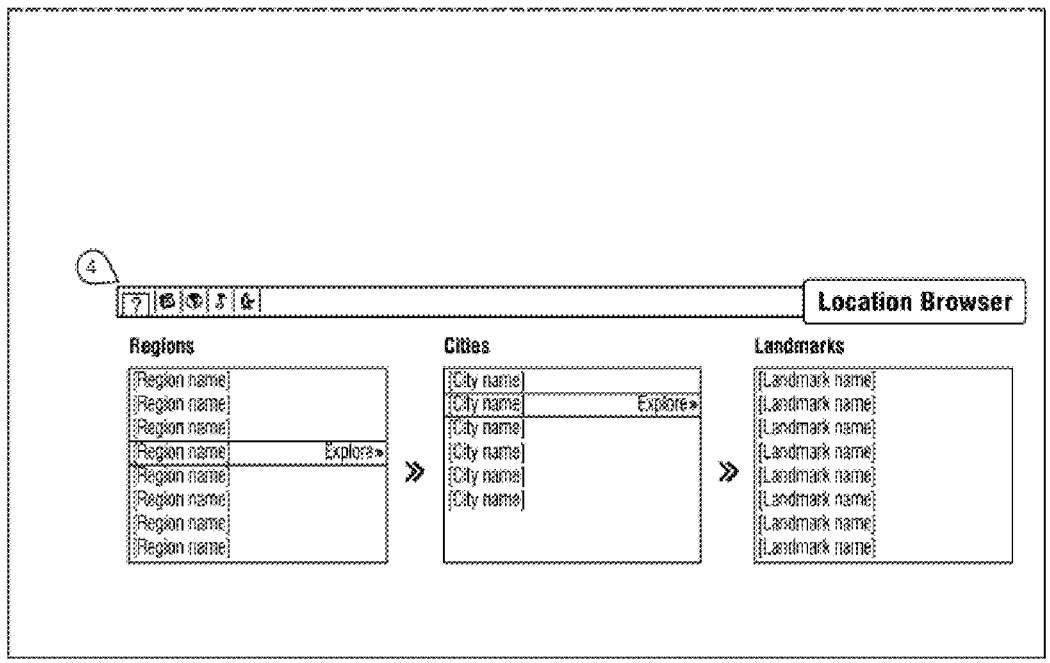

FIG. 11B shows a page that is dedicated to geographical music searches:

1. Interactive globe. Displays geographic content based upon the user's search on a navigable 3D globe, including a variety of map layers and tours.
2. Search and timeline controls. Allows the user to quickly search for a location. The selected result is shown both on the globe and in the Location icon in the filter bar. The user can also update the current year search criterion and updates are reflected in the globe pull-down menu content in the upper-right and in the Time icon in the filter bar.
3. Geographical media browser. Delivers media by type that matches the specified Location in the user's current search. Note that the Search status icons show that Location is the only element being used to determine the content that appears in the browser.
4. Location browser. Three hierarchically filtered lists of Regions, Cities, and Landmarks. Each item in each of the lists has its own dedicated page on the site that the user can visit.

Figure 11C:
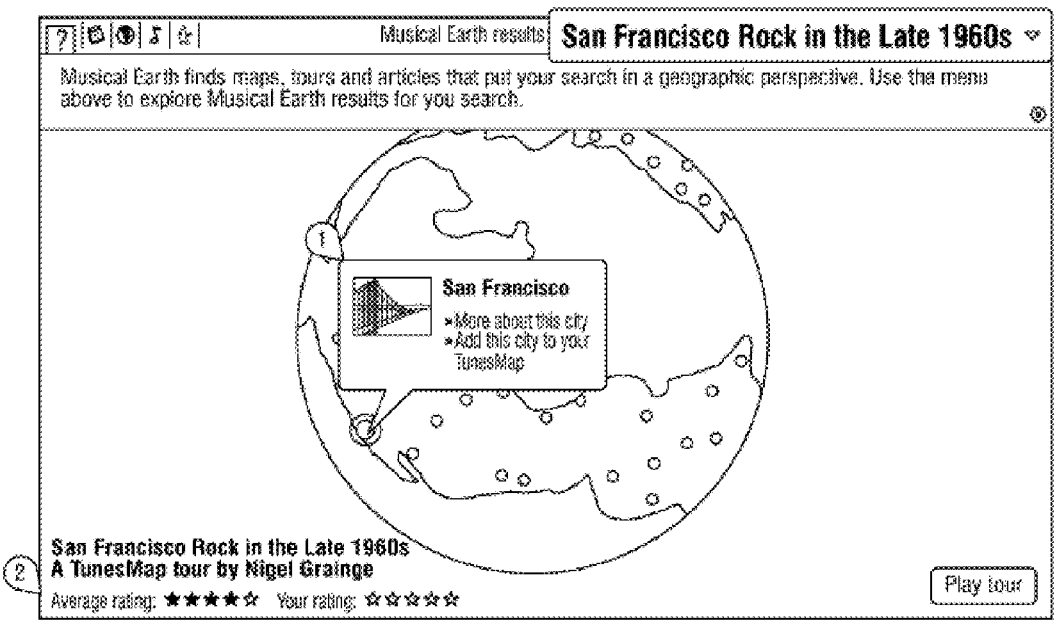

Additional options for the Interactive globe module (#1 on the Musical Earth page) are shown on FIG. 11C as follows:

1. Location pop-up. Provides links to the dedicated page for the location and to add the location to the user's Map.
2. User ratings. Displays the average rating for the currently displayed content among all users, as well as a control for the user to add their own rating.

Figure 11D:
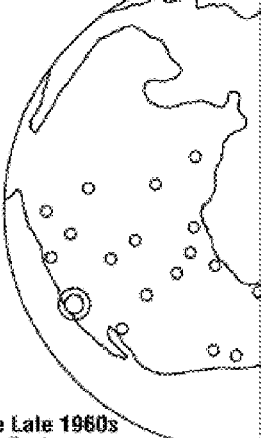

Additional options for the Interactive globe module (#1 on the Musical Earth page) are shown on FIG. 11D as follows:

1. Content selection. Enables the user to select from a variety of search-filtered maps and tours that can be overlaid on the 3D globe.

Figure 11E:
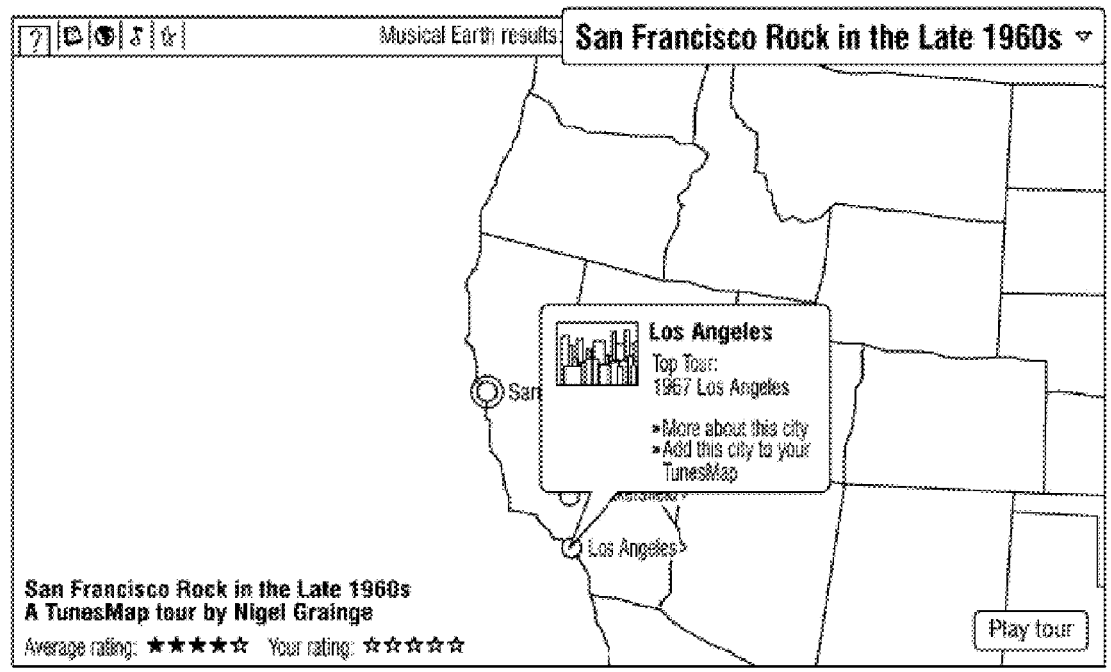

FIG. 11E depicts a version of the module that shows a close-up view of the west coast.

Figure 11F:
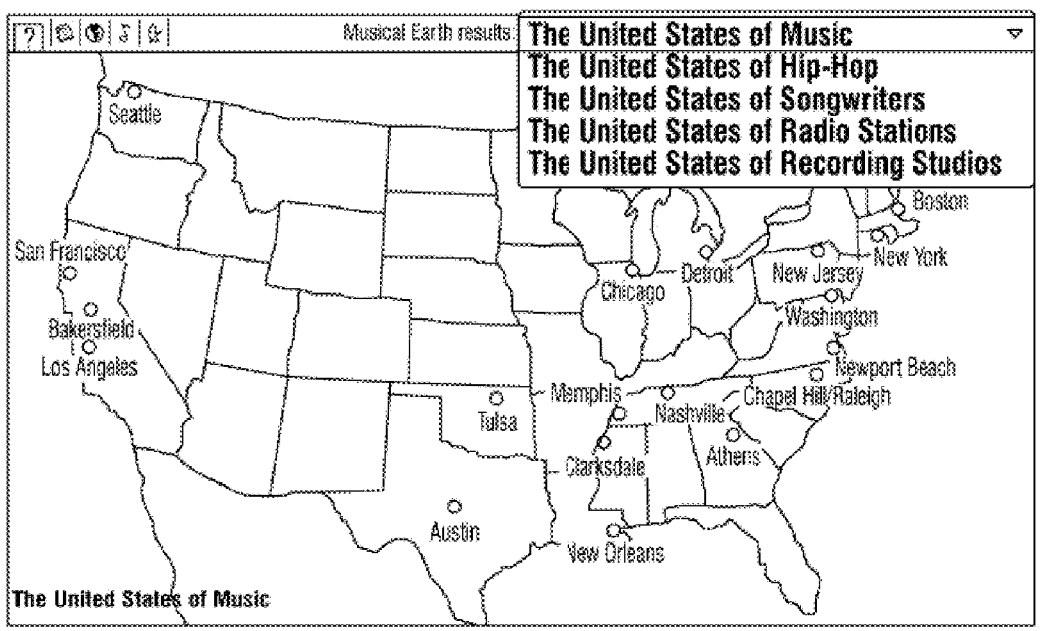
Figure 11F:
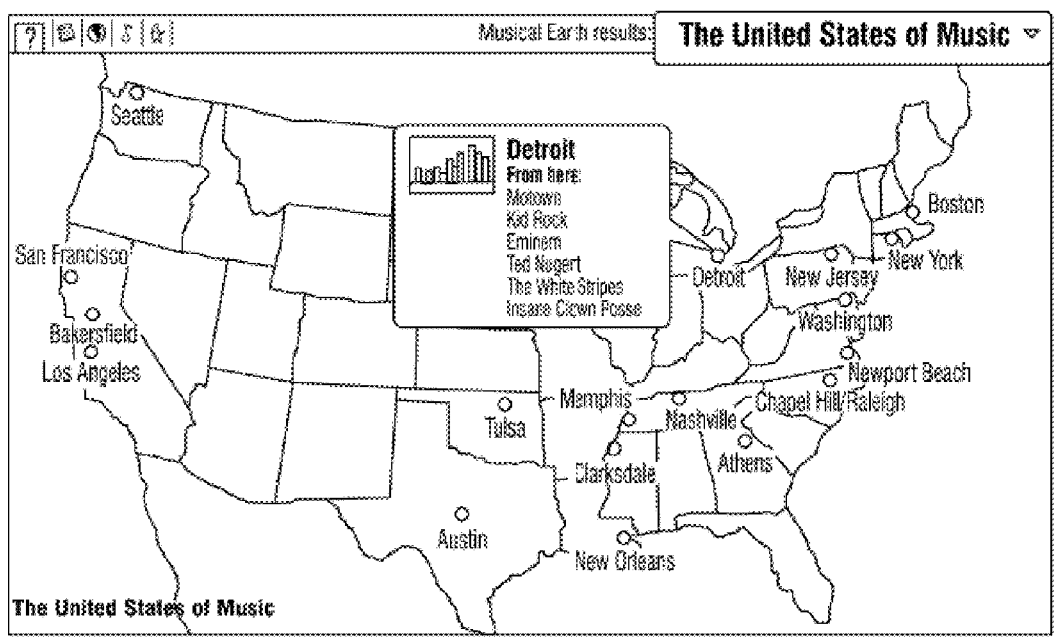
Figure 11F:
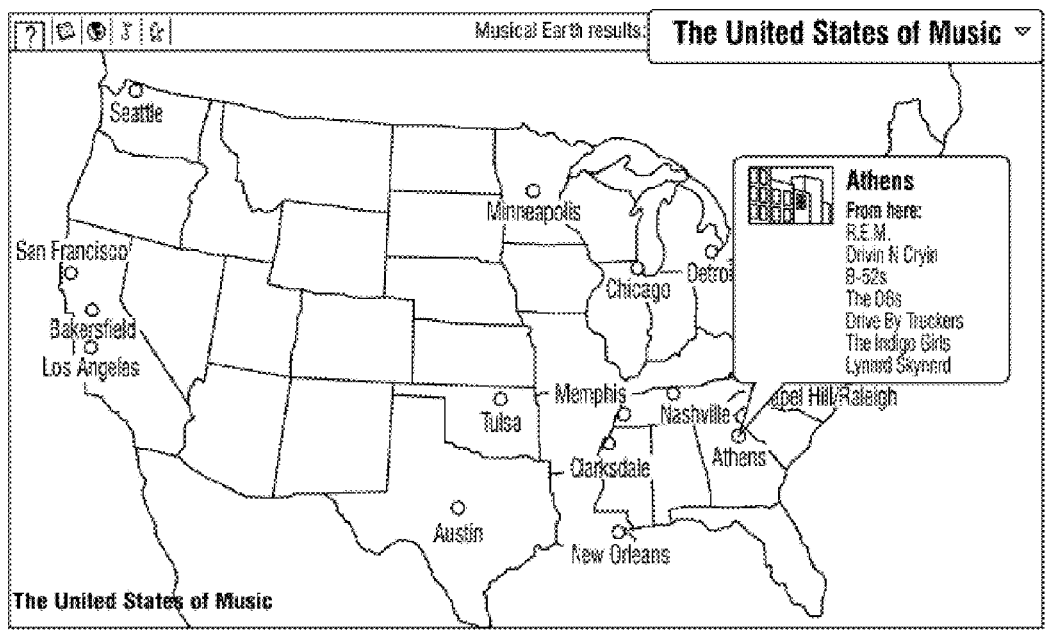

In FIG. 11F, the user is browsing a set of music maps of the United States. Each map highlights geographic locations in the US along a particular musical theme: music in general, hip-hop, songwriters, radio stations, etc. Clicking on a city brings up a pop-up with related links the user can explore. Clicking on a link takes the user to the related page, while also updating their current search to reflect the relevant artist, genre, location, and year.

Figure 11G:
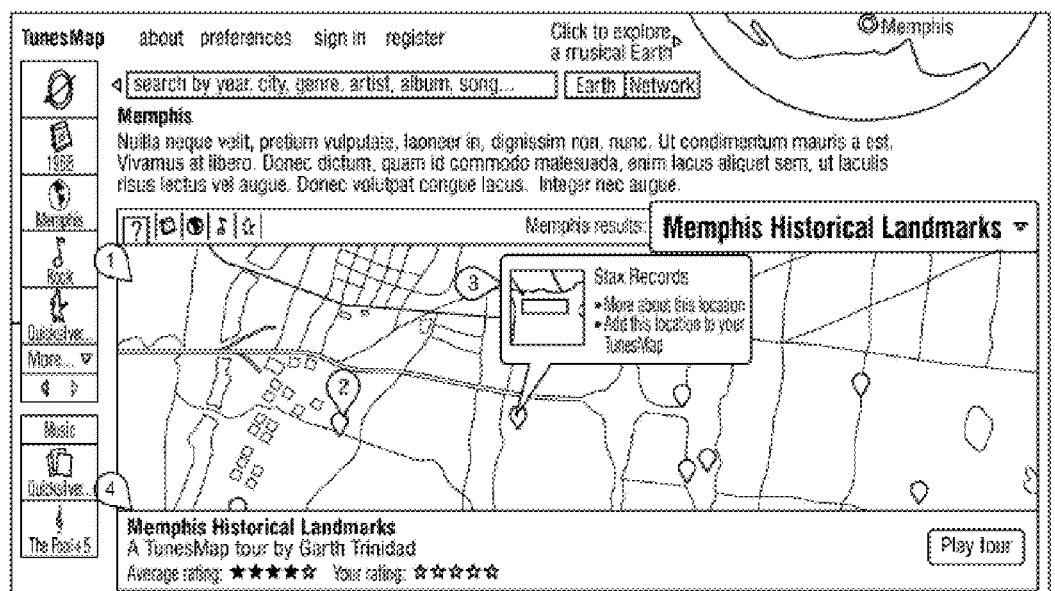
Figure 11G:
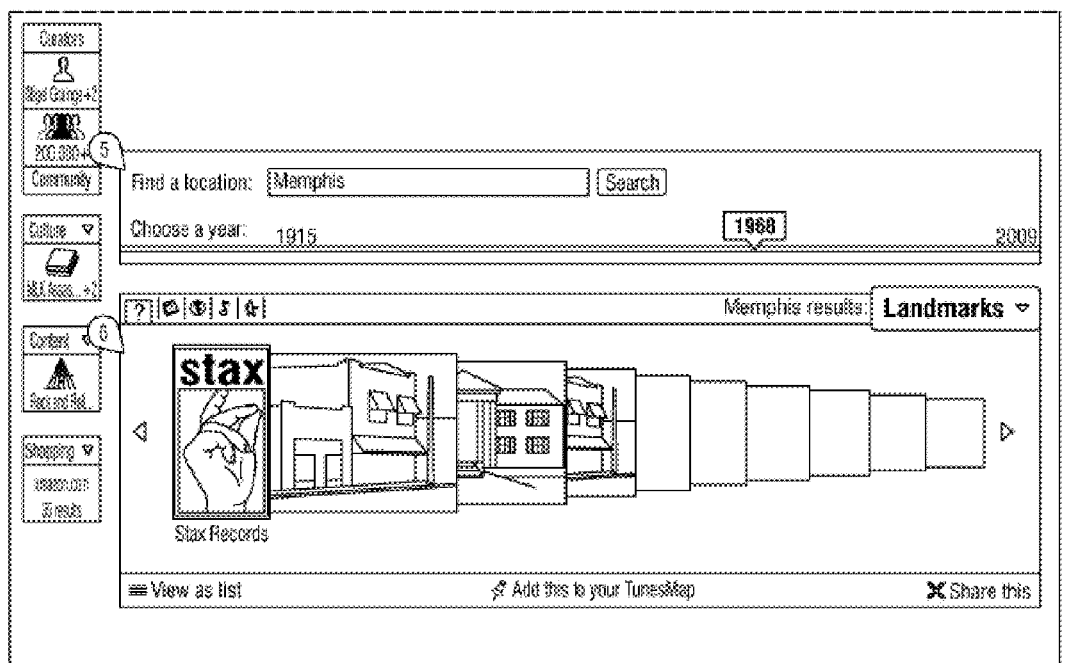

FIG. 11G depicts a dedicated page for a single city as follows:

1. Map. An interactive map shows a satellite view of Memphis.
2. Markers. Markers call attention to important music-related locations in the city.
3. Marker pop-up. Clicking on a marker brings up the related info window, with options to visit the landmark's dedicated page or add the landmark to the user's Map.
4. Map content. Using the pull-down menu in the upper right, the user can select from a variety of search-filtered geographic content, such as clubs, venues, recording studios, residences, and hotels for the city, details of which are shown here.
5. Search and timeline controls. Allows the user to quickly search for a location. The selected result is shown both on the globe and in the Location icon in the filter bar. The user can also update the current year search criterion and updates are reflected in the globe pull-down menu content in the upper-right and in the Time icon in the filter bar.
6. City content browser. This area allows the user to browse content related to the city. Here, the user is browsing curator-recommended Memphis albums.

Figure 11H:
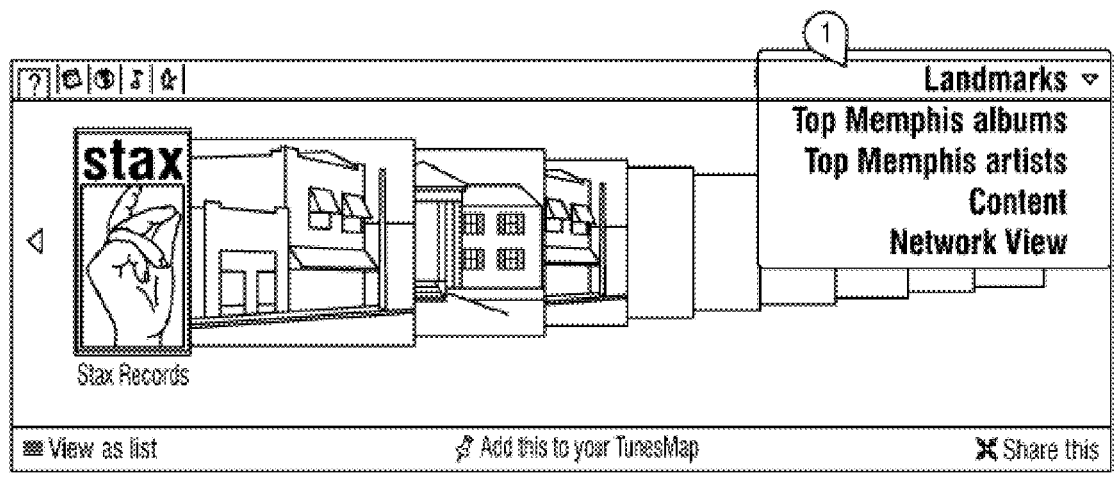

Additional options for the City content browser module (#6 on the City page) are shown on FIG. 11H as follows:

1. Content selection. Enables the user to select from a variety of Memphis-related content carousels, plus a Network View centered on the city.

Figure 11I:
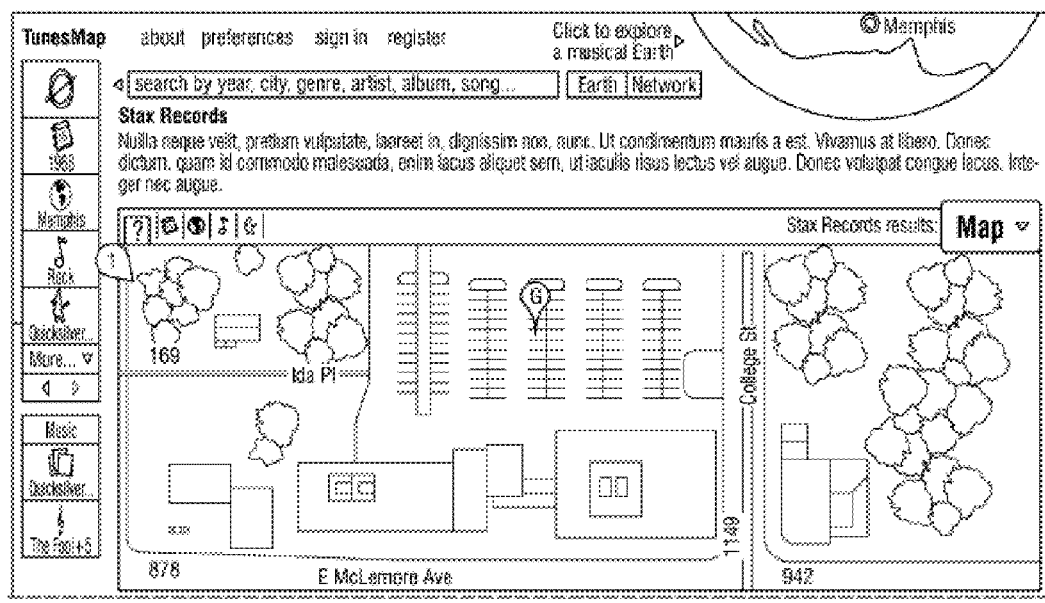
Figure 11I:
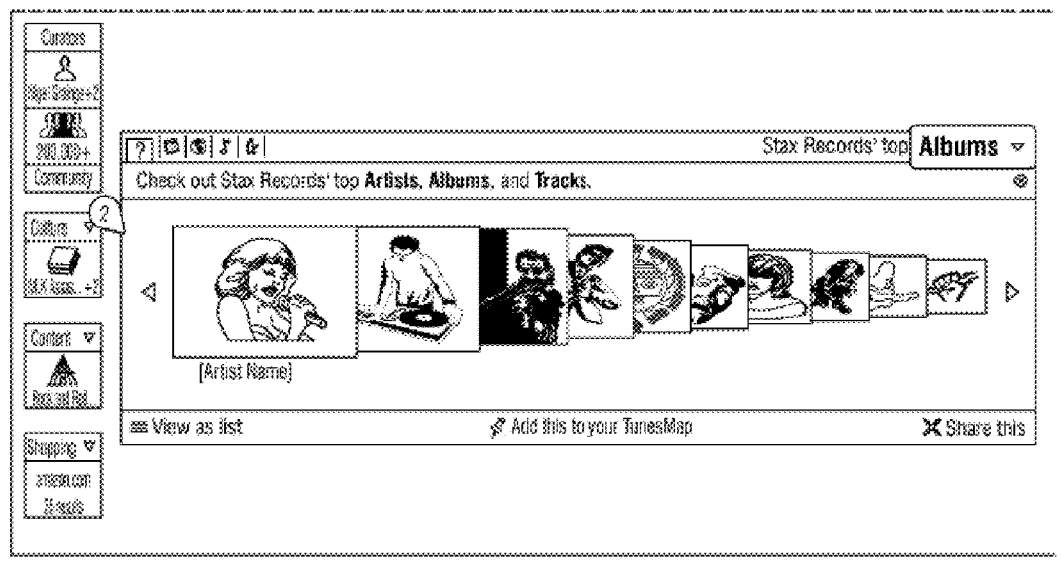

FIG. 11I depicts the following:

1. Location content browser—Map. An interactive map/ street view image of the location is shown. By clicking the pull-down menu in the upper right corner, the user can access other Stax-related content, including photos, video, and user-created content.

2. Recommendations browser—Artists. This module contains a selection of curator-recommended and dynamically chosen content relating both to the user's search and to this location. The various content types (artists, tracks, albums, etc.) are accessible via the pull-down menu. Mobile Device Integration with GPS A mobile device enabled with a Global Positioning System (GPS) 900, such as the Apple iPhone for example, is shown in FIGS. 12A-12D. Illustrated for example is the Network map interface 901 displaying the user current search 903, the fundamental relationship of music filters 900 and search button 901. A unique and novel service of the current invention is to inform the user of music related items of interest near their current physical location 904.

Figure 12A:
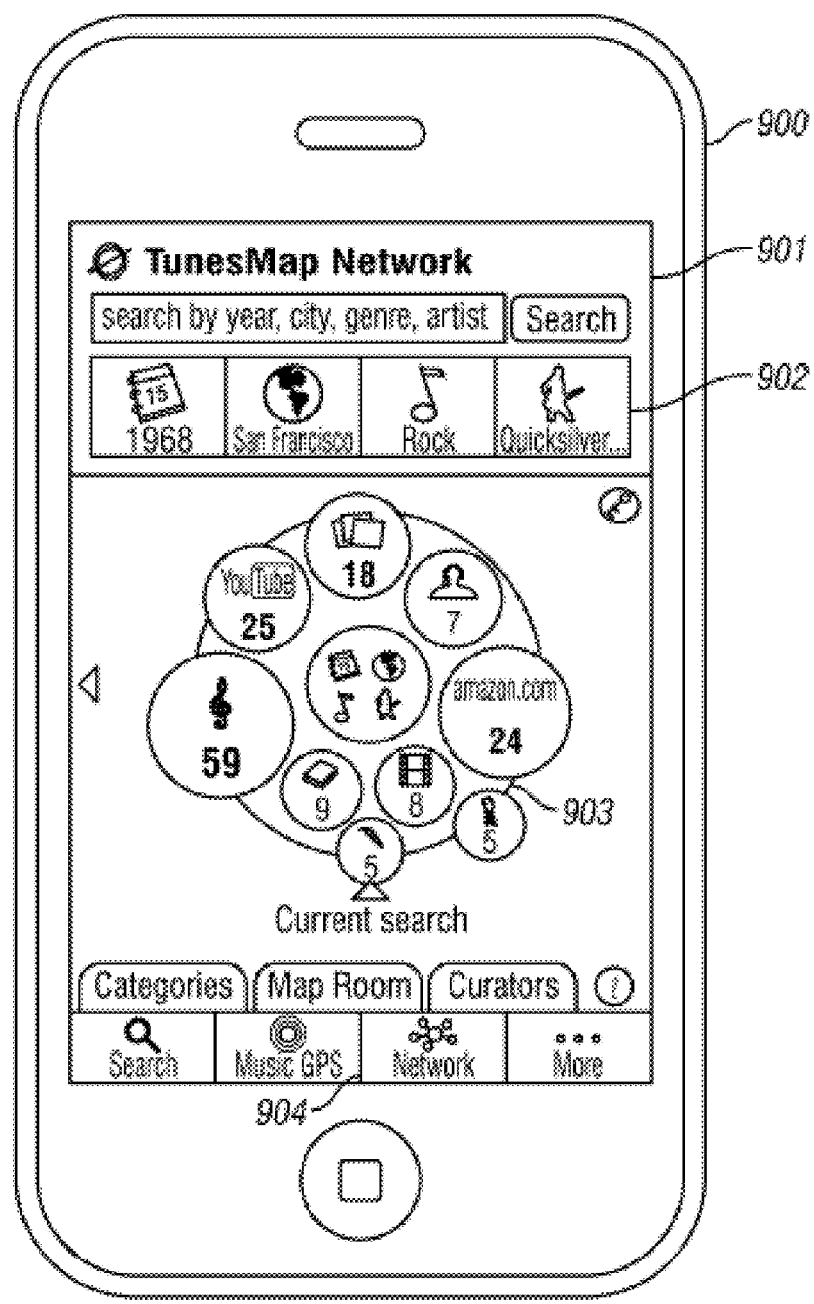
FIGS. 12A-12D illustrate the integration of a user interface with a hand held Internet-enabled telecommunications computing device with GPS according to the invention.
Figure 12B:
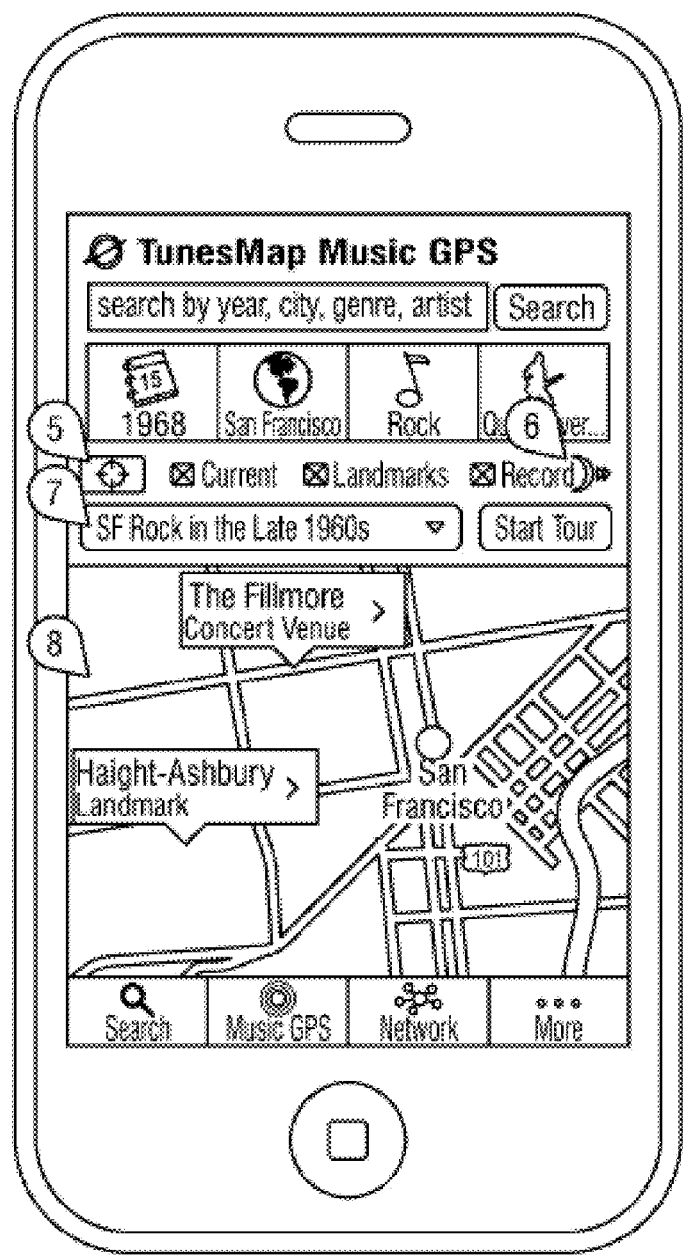
Figure 12C:
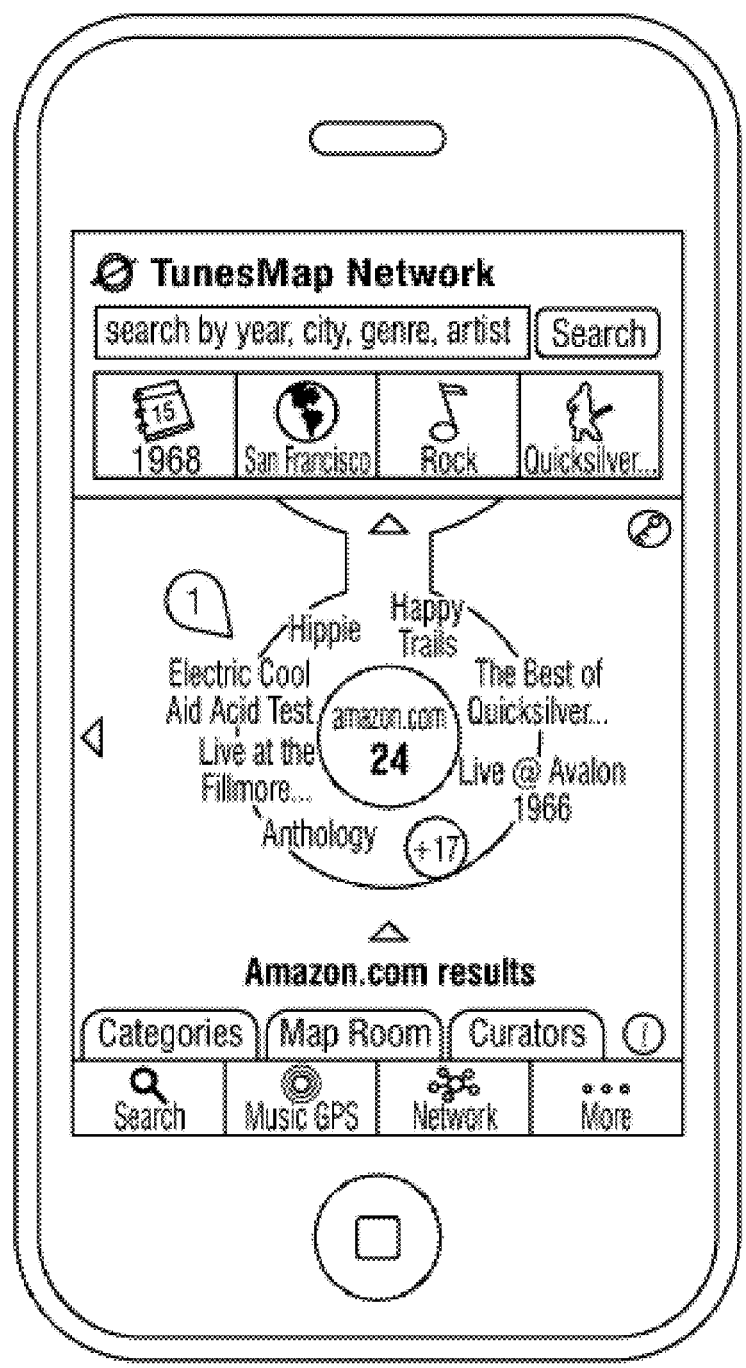

In FIG. 12A, the Search mode of the Map iPhone application allows the user to perform searches and retrieve the same results that would appear in the filter bar on the main website.

1. Search field. Allows the user to perform searches and retrieve the same results that would appear in the filter bar on the main website 2. Search components. These icons are populated with elements derived from the user's text searches, just as on the Map website. Clicking on an icon displays a pop-up widget for changing its contents similar to those found on the site, i.e. timeline, location search, genre pull-down, artist search. Note that the location search pop-up widget has a current location option that makes use of GPS to identify the user's position and add it to the search.

3. Search results. Results of the most recent search are shown here in a scrollable list. Entries correspond to the various results categories in the Web site filter bar. Touching a category causes the list to scroll to the left, displaying related results.

4. Tab bar. Allows the user to switch between application modes. The Local mode of the Map iPhone application shows geographic results derived from the user's search (see FIG. 12B).

5. GPS locator. Uses GPS to center the map on the user's current location, updating the Location search component to match.

6. Map layer selector. This selection of map layers can be scrolled left and right by touching and dragging, and individual layers can be turned on and off by tapping.

7. Tour selector. By choosing a tour and clicking "Start tour," the user can browse through a curator-authored step-by-step guide to a particular location from a musical perspective.

8. Interactive map. Shows results matching the user's search criteria in the chosen location. Users can toggle the display of specific map layers on and off.

The Network mode of the Map mobile device application (see FIG. 12C) allows the user to browse an interactive diagram of the Map database, including links created by curators, community, and the user.

1. Network View. Interactive diagram of items in the Map database. Touch gestures including "pinch in" and "pinch out" allow the user to scale the map up and down and navigate from node to node.

2. Key. Tapping this button superimposes text labels that identify all icons in the diagram.

3. Preferences option. Allows the user to customize the display of the diagram.

4. Categories tab. Here, the user has opened the Categories tab, which includes a toggle between the standard Map categories and user-created categories, and is about to drag the Amazon.com icon into the Network view to display related results.

Having dragged the Amazon.com category in to the Network view, related results are now shown.

Amazon.com results. Tapping on the Amazon.com bubble has centered and expanded it to display its results. The original search is still available by tapping the up arrow at the top of the view.

Result pop-up. Tapping on a result brings up a pop-up that provides a brief description of the item, and relevant links. Because this is an Amazon product, the user is shown a purchase button that opens Amazon.com in the Safari browser when clicked.

Below the product information is a panel of Network View options that allow the user to manipulate how the item appears in the Network View.

Figure 12D:
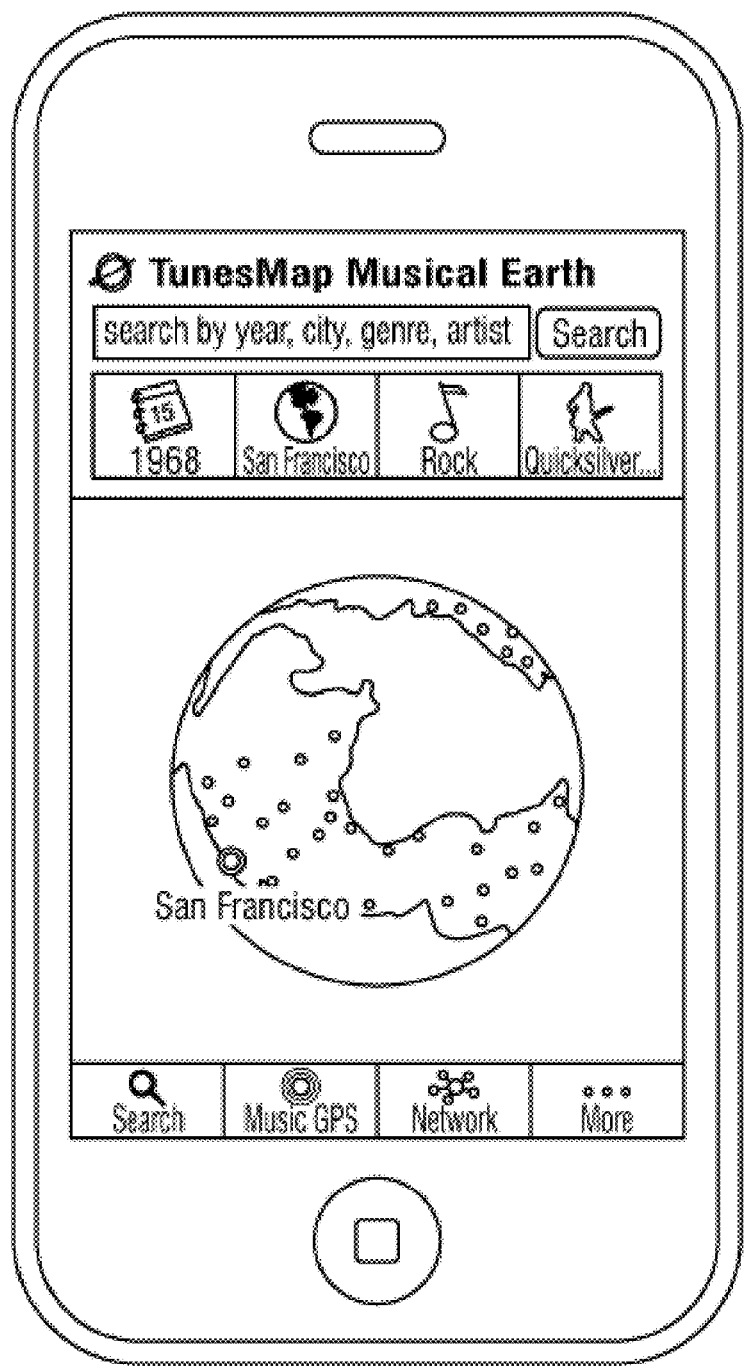

The Musical Earth mode of the Map mobile device application allows the user to browse an interactive 3D globe dotted with geographic markers relevant to the current search (see FIG. 12D).

Game Console Integration

Figure 13:
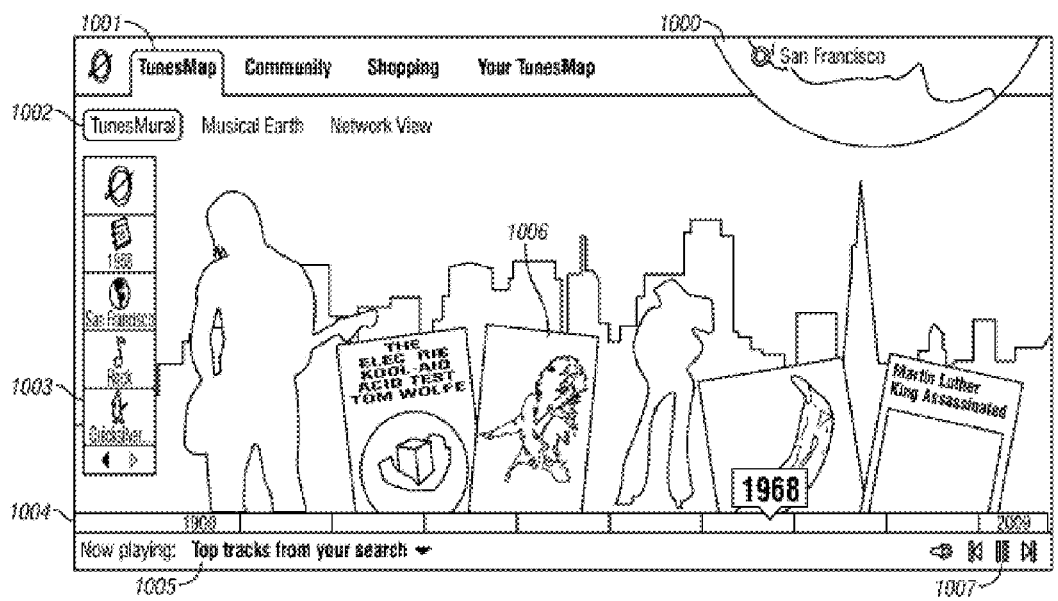
FIG. 13 illustrates the integration of a user interface with a general purpose Internet-enabled gaming console computing device according to the invention.

Access through other popular web enabled graphic interfaces, such as Sony Xbox 300 for example, is shown in FIG. 13. Illustrated are user interface abstractions and facilities of the invention including a filter bar 1003, media player 1007, time line interface 1004, media selection 1005, and the Mural 1006.

Game console application. This implementation of the Map on a game console such as the PlayStation 3 or Xbox 360 shows the interface reformatted for an HD television screen, including tabs at the top for accessing the primary page and content types.

Game Play Element

The user may be provided with various music-related games on such a game console or any other device. The user plays such game in real time with other users or solo using the tools herein disclosed to make a media culture map, gaining points and rewards along the way. Such games can be based upon the user's knowledge of music and music-related culture or can be skill based, such as a demonstration of musical ability. The users who are successful at such games can also gain in status to become a curator who is recognized and regarded by the community.

While the interface primarily makes use of layers of two-dimensional elements, embodiments of the invention comprise a three-dimensional interface that provide much more of an exploratory, game-like feel to the experience.

The user begins by selecting an avatar for themselves, which is then dropped as a 3D character into a surreal desert landscape. If the user begins playing a song, or performs a search, the environment around them transforms as the music begins to play. For example, if the user selected a song from a contemporary Los Angeles-based artist, the desert sand is replaced by asphalt, ghostly freeways sprout from the ground, and notable LA music landmarks pop up, all flickering and fading in and out of view.

This is not a literal geography of LA. Rather, it is a musical geography, one that brings together clubs and recording studios, concert venues and garages in a visual mash-up of the musical culture of the city. Other characters, similarly ethereal in appearance, but dressed in the fashions of the day, appear in the world, some controlled by the computer, and others representing networked players who are currently exploring the same time and place in the history of music.

The player's current search is visualized beneath the feet of their avatar as a glowing disc, labeled with their current location, e.g. "Los Angeles Rock 2014." Everything in the world appears somewhat ghostly, flickering in and out of view, until the player steps off of this disc, signifying their entry into the world proper. Now everything becomes solid, and the player can walk their character around the environment, talking to the other characters and getting a sense of the local flavor. The things the other characters in the world say and the places they go help to evoke the scene. As the player walks towards a particular club, a menu of videos might appear over the view, offering clips of great performances from the venue. This embodiment of the invention conjures the time and place impressionistically through strategic use of stylized 3D models as an interface to cultural artifacts and media, without having to model endless assets.

Stepping back on the disc allows the user to pivot on the time, place, genre, or artist of their current search and arrive at a new destination. This new destination is visualized as a second glowing disc, connected to the first by a thin line. To retrace their steps of exploration through TunesMap, the user need only hop from one disc to another and then step off into the 3D world conjured by each.

There is no way to "win" this experience, instead the goal is to explore and enjoy the feeling of being a time traveler in a world spinning around the axis of music.

Example

Imagine you are Columbus, or Magellan—exploring the world, charting new routes, making new discoveries; but instead of charting geography, imagine your objective is to explore, chart, and discover the world of music and to share your findings with a community.

An embodiment of the invention gives each user interactive curatorial tools, and access to myriad multimedia assets through content/archive partnerships. In this way, the user can share music knowledge with the community at large. In this example, users have two goals:
1. Chart the musical world; and
2. Rise in rank based on the number of followers and/or other users who like the user's page.

Initially, the music GPS feature of the invention, also referred to as the digital music atlas, serves as the playing board and is seeded by a board of editors with particular knowledge of a certain genre, time, or place in music history. This gives the playing board a baseline of areas to explore. Thereafter, it is up to the community to seed the rest of the playing board, i.e. the digital music atlas or music GPS, with knowledge of certain genres, times, or places in music history, i.e. no curator has yet introduced a page on Madagascar, but someone then starts to curate a page associated with that geographical location. Eventually someone else comes and stakes a claim to that area of world music, and the two curators are then in competition with one another for curator control of that portion of the world. The community decides who is a more trusted source on the subject by ranking the more trusted curator higher than the other curator.

How are they Ranked?

Users, who are also referred to as Curators or Explorers, are judged by the community based on several different factors, including but not limited to:
a.) Their community approval rating and/or number of followers;
b.) Their depth of knowledge;
c.) Their diversity of knowledge;
d.) Their curatorial skills;
e.) The number and diversity of multimedia assets they incorporate into their pages, and maps;
f.) The number of pages or maps that are repurposed or quoted by other users;
g.) The number of recommends they receive;
h.) The number of intellectual contributions they make;
i.) The number of archive materials they contribute to the community;
j.) The number of articles published;
k.) The amount of commerce driven from their page, etc.

In the same way that Foursquare users are ranked based on their frequency of visits to a particular place or number of places in a neighborhood by being made mayor of that place, users of this embodiment of the invention are ranked based on their intellectual knowledge and contributions to the community, and the community's approval or disapproval of those contributions.

A game challenge can take the following form when presented to the community: Tunesmap: charting the Music World and changing the way we experience music online, at home, and on-the-go. WANTED: anyone who thinks that they know something about music history, and who wants to compete in a race to chart the Music World. Tunesmap gives you the tools to share your knowledge and match-up against the experts. The community decides who rules the Music World.

External Application Integration

Figure 14:
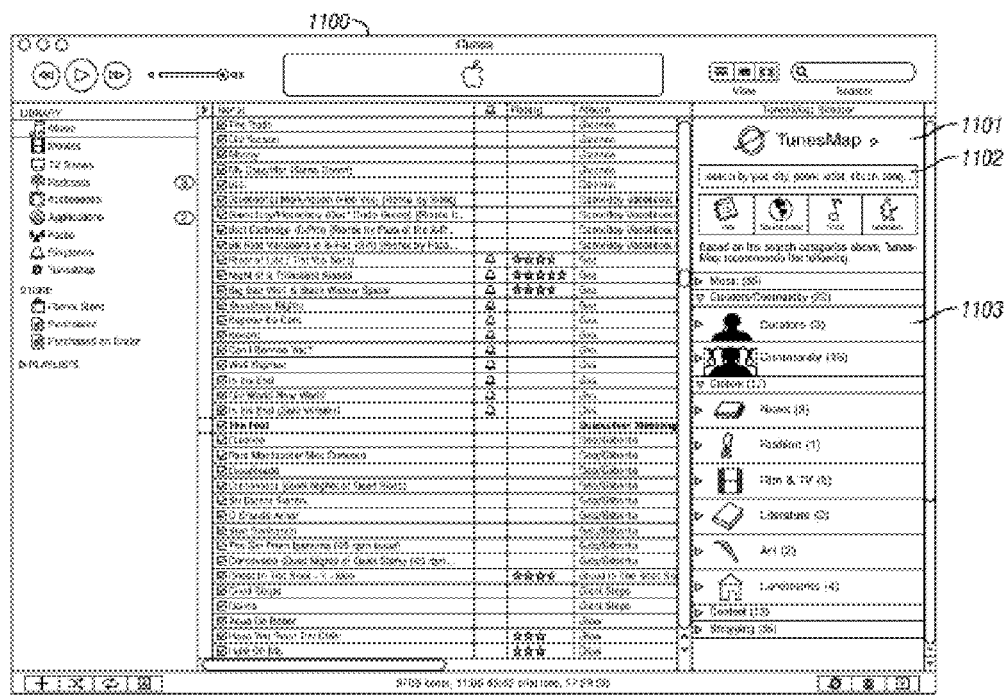
FIG. 14 illustrates integration of a user interface with a general purpose Internet-based music service according to the invention.

Integration of the invention with a popular procurement service, such as Apple iTunes is shown in FIG. 14. The unique experience provided by the presently preferred embodiment of the invention proposes to inspire and motivate the user though the synergistic effect of combining artist, time, location, and genre in the presentation of related items of culture, many of which are or can be made available for purchase. To encourage this inspired and motivated behavior on the part of the user the procurement service user interface is extended with the Map interface 1101. The fundamental relationship of music 1102 provides a search filter, with items of interest available under their respective primary categories and supporting elements 1103.

A profound result of this synergy is to increase the probability of procurement of music and music related items available through both the external and internal services, such as the external service shown in FIG. 14, as well as the primary category internal shopping element 306 of FIG. 5 that provides access to additional external procurement services.

Computer Implementation

Figure 15:
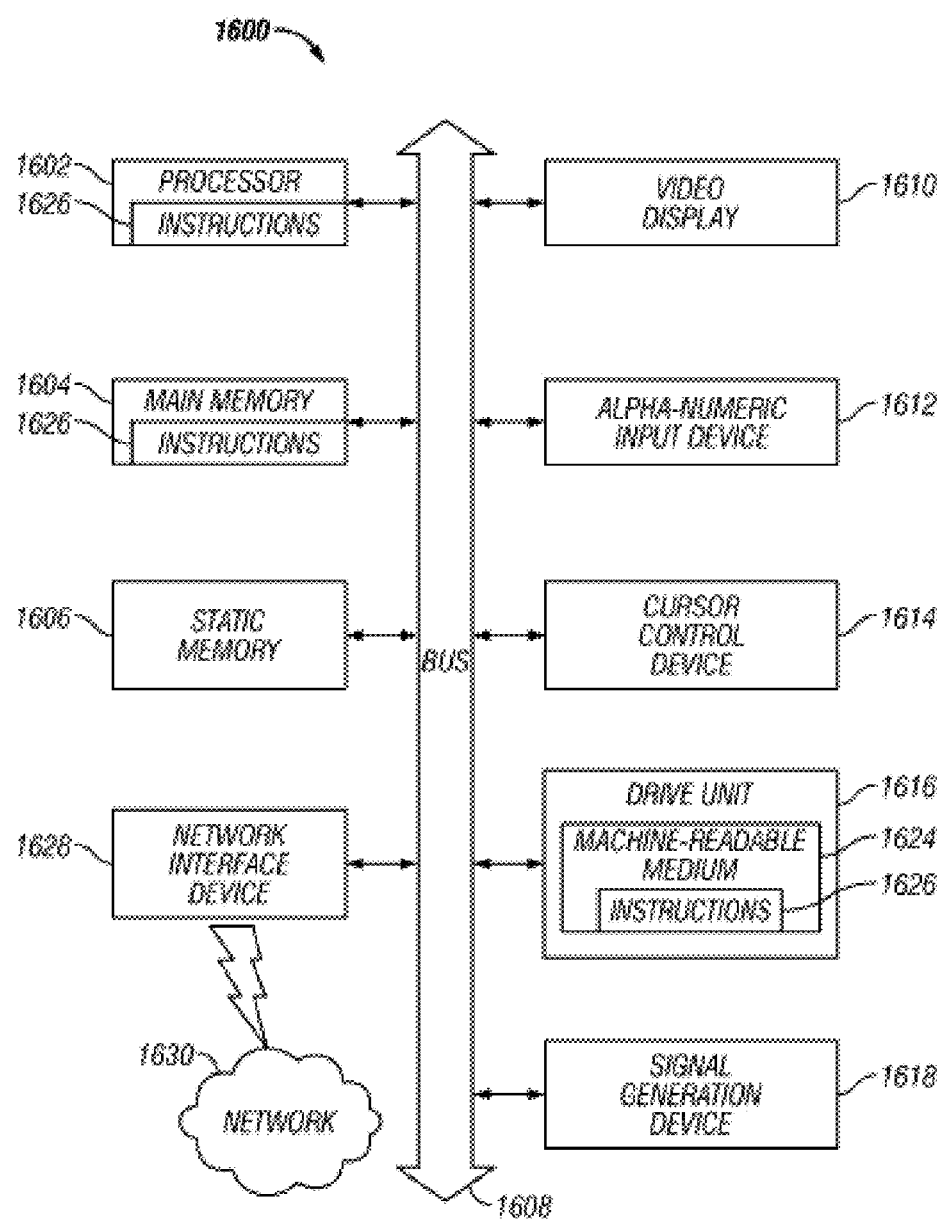
FIG. 15 is a block schematic diagram of a machine in the exemplary form of a computer system within which a set of instructions for causing the machine to perform any one of the herein disclosed methodologies may be executed.

FIG. 15 is a block schematic diagram of a machine in the exemplary form of a computer system 1600 within which a set of instructions for causing the machine to perform any one of the foregoing methodologies may be executed. In alternative embodiments, the machine may comprise or include a network router, a network switch, a network bridge, personal digital assistant (PDA), a cellular telephone, a Web appliance or any machine capable of executing or transmitting a sequence of instructions that specify actions to be taken.

The computer system 1600 includes a processor 1602, a main memory 1604 and a static memory 1606, which communicate with each other via a bus 1608. The computer system 1600 may further include a display unit 1610, for example, a liquid crystal display (LCD) or a cathode ray tube (CRT). The computer system 1600 also includes an alphanumeric input device 1612, for example, a keyboard; a cursor control device 1614, for example, a mouse; a disk drive unit 1616, a signal generation device 1618, for example, a speaker, and a network interface device 1628.

The disk drive unit 1616 includes a machine-readable medium 1624 on which is stored a set of executable instructions, i.e. software, 1626 embodying any one, or all, of the methodologies described herein below. The software 1626 is also shown to reside, completely or at least partially, within the main memory 1604 and/or within the processor 1602. The software 1626 may further be transmitted or received over a network 1630 by means of a network interface device 1628.

In contrast to the system 1600 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with complementary metal oxide semiconductor (CMOS), transistor-transistor logic (TTL), very large systems integration (VLSI), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a machine or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Although the invention is described herein with reference to the preferred embodiment, one skilled in the art will readily appreciate that other applications may be substituted for those set forth herein without departing from the spirit and scope of the present invention. For example, although an embodiment of the invention disclosed herein is concerned with music, those skilled in the art will appreciate that the invention is readily applicable to, for example, but not by way of limitation, fashion, film, art, news, comedy, books, healthcare, politics, government, corporate and other human enterprises, and the environment. Accordingly, the invention should only be limited by the Claims included below.

The invention claimed is:

1. A computer implemented method for temporal and geographic presentation and navigation of linked cultural, artistic, and historic content, comprising:

capturing a song fragment;

providing a facility that determines an acoustic fingerprint for said song fragment;

using said acoustic fingerprint to access a music database to identify a song that corresponds to the captured fragment;

receiving from said music database music identification information for said song;

providing said music identification information as a user selection query to a navigation facility;

providing a processor configured to register collections of music and music-related information in a database and to make said collections of music and music-related information available to users, wherein said collections of music and music-related information are classified in said database by all of time, location, genre, and artist; and said processor configured to provide a navigation facility for user selection of a combination of all of time, location, genre, and artist in connection with said collections of music and said music-related information, and for generating and presenting to said user in response to said user selection a corresponding map that includes independent images of all of music, its history, and culture with regard to said collections of music and music-related information;

wherein said culture presented on said map in response to said user selection comprises results that include independent images of all of fashion, film, literature, music, and news;

wherein said processor is configured to generate and present to said user at least one animated mural comprising said images and that depicts a fundamental combination of time, place, genre, artist, and culture in connection with said music-related information;

wherein said animated mural comprises a dynamically animated selection of said images derived from the user's current selection; and wherein said images further comprise any of regions, cities, artists, news items, fashion trends, movies, books, and genres of art.

2. The method of claim 1, wherein said map incorporates links to external Web sites.

3. The method of claim 1, wherein said map is defined by both expert and regular individual curators and is subject to sharing and group evaluation and ranking.

4. The method of claim 1, wherein said processor is configured to provide a facility for storing to, and retrieving from, said database community ranked curator and community commentary and recommendations, cultural events and elements, and media content in connection with said music-related information.

5. The method of claim 1, wherein said processor is configured to provide a commerce facility for user procurement of materials related to said music-related information.

6. The method of claim 1, wherein said mural further comprises a user interface for navigation of music, its history, and culture.

7. The method of claim 6, wherein said mural comprises any of film, fashion, art, literature, books, news, and comedy.

8. The method of claim 1, wherein said processor is configured to interact with, and is embedded within, a handheld GPS-enabled device.

9. The method of claim 8, wherein said processor is configured to provide a user of said device with a facility to query said database in connection with music and current and historical events relative to said user's present location to enable discovery of music history points of interest in both a virtual world of media content displayed by a said device and in a physical world by guiding said user to actual places of interest.

10. The method of claim 1 wherein said processor is configured to transform the vocabulary used by curators into a predicate namespace of semantic music ontology for indexing of external resources.

11. The method of claim 1, wherein said processor is configured to provide a navigable relationship network view of users, curators, communities, and elements of the map database.

12. The method of claim 11, wherein said processor is configured to present clusters of icon images to a user to depict the map generated in response to said music identification information for said song.

13. The method of claim 11, wherein said processor is configured to provide an iconic filter constructer for dynamically grouping related results into a plurality of categories.

14. The method of claim 1, wherein said processor is configured to present maps of the world in a musical context.

15. The method of claim 1, wherein said processor is configured to provide a location element for a fundamental relationship of music within a map interface;
    wherein said map is annotated with music related items of interest according to a selection category; and
    wherein items displayed are subject to a user's current filter settings.

16. The method of claim 1, wherein said map is published to a social networking facility.

17. The method of claim 1, further comprising:
    said processor configured to provide a game element for user interaction pursuant to a game play application, wherein game play relates to a user media culture map, and wherein said user gains any of points and rewards for successful game play.

18. The method of claim 1, wherein said processor is configured to take as input any of said music identification information for said song to define the time, place, genre, artist, and context of said configuration.

19. The method of claim 18, wherein a play list of songs captured by the user animates the cultural context of said configuration.

20. The method of claim 1, wherein said processor is configured to receive an input that pivots an artist from said collections of music and music-related information to another field.

21. The method of claim 20, wherein said other field comprises any of film, art, literature, news, photography, fashion, and comedy.

22. The method of claim 21, wherein said artist comprises any of a director, painter, author, photographer, designer, and comedian.

23. The method of claim 22, wherein said map context reflects said other field.

24. A map index for conceptual, navigational, and physical organization of music-related materials, comprising:
    a processor configured as a registry for maintaining a fundamental relationship between a plurality of core elements and for registering a plurality of data objects comprising descriptions of music, its history, and culture with said core elements;
    wherein said core elements comprise any of time, location, genre, and artist;
    wherein each of said core elements has a unique numeric id, maintained by said registry in an underlying relational database management system;
    wherein said unique numeric id comprises a foreign key for referencing said map index and for relating said corresponding core elements;
    wherein each combination of one numeric id from each of said core elements corresponds to a unique map_id of said map index;
    wherein assignment of a single unique numeric id to each combination of core elements optimizes a mapping of higher level abstractions to a subject relationship with reduction of many-to-one a number of required index operations; and
    wherein partition of said map index into a plurality of core elements provides a plurality of core filters for data object search and retrieval; and
    capturing a song fragment;
    providing a facility that determines an acoustic fingerprint for said song fragment;
    using said acoustic fingerprint to access a music database to identify a song that corresponds to the captured fragment;
    receiving from said music database music identification information for said song;
    providing said music identification information as a user selection to a navigation facility; and
    said processor configured to provide a navigation facility for user selection of a combination of all of said core elements in connection with collections of music and said music-related information, and for generating and presenting to said user in response to said user selection a corresponding map that includes independent images of all of music, its history, and culture with regard to said collections of music and music-related information;
    wherein said culture presented on said map in response to said user selection comprises results that include independent images of all of fashion, film, literature, music, and news;
    wherein said processor is configured to generate and present to said user at least one animated mural comprising said images and that depicts a fundamental combination of time, place, genre, artist, and culture in connection with said music-related information;
    wherein said animated mural comprises a dynamically animated selection of said images derived from the user's current selection; and
    wherein said images further comprise represent any of regions, cities, artists, news items, fashion trends, movies, books, and genres of art.

25. The map index of claim 24, said registry further comprising:
    a set of primary elements for establishing a next higher level of abstraction for classification and organization of music, its history, and culture;
    wherein each data object in said registry is related to one of plurality of primary category types, each having a primary type id;
    wherein said primary category types comprise any of curator, community, culture, content, and shopping;
    wherein a primary type id is combinable with a map_id to establish a primary element;
    wherein said primary elements define a collection of music related data objects as associated with a specific time, location, genre, and artist by way of said map_id;
    wherein said primary elements enable selection of all primary types available for a given map_id, or all map_ids available for a given primary type;
    wherein said primary elements further enable selection of all map_ids for a specific instance of any one of said primary categories; and
    wherein said type_id of said primary categories comprises an enumerated constant of an implementing class that comprises a foreign key for a category type in said primary element id.

26. The map index of claim 24, further comprising:
a physical storage for data objects representing music, its history, and culture;
wherein data object representations are implemented by supporting elements related to primary elements many-to-one; and
wherein each primary element, relates any number of supporting elements to a fundamental relationship of music through association with a primary element.

* * * * *